US012620110B2

(12) United States Patent
Shibusawa et al.

(10) Patent No.: US 12,620,110 B2
(45) Date of Patent: May 5, 2026

(54) IMAGE PROCESSING DEVICE, STEREO CAMERA DEVICE, MOBILE OBJECT, DISPARITY CALCULATING METHOD, AND IMAGE PROCESSING METHOD

(71) Applicant: KYOCERA Corporation, Kyoto (JP)

(72) Inventors: Eijiro Shibusawa, Yokohama (JP); Hiromichi Sotodate, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 478 days.

(21) Appl. No.: 18/007,299

(22) PCT Filed: Jul. 15, 2021

(86) PCT No.: PCT/JP2021/026692
§ 371 (c)(1),
(2) Date: Jan. 27, 2023

(87) PCT Pub. No.: WO2022/024793
PCT Pub. Date: Feb. 3, 2022

(65) Prior Publication Data
US 2023/0267630 A1 Aug. 24, 2023

(30) Foreign Application Priority Data

Jul. 28, 2020 (JP) ................................. 2020-127696
Aug. 24, 2020 (JP) ................................. 2020-141243
(Continued)

(51) Int. Cl.
*G06T 7/593* (2017.01)
*G06V 10/75* (2022.01)
(Continued)

(52) U.S. Cl.
CPC ............ *G06T 7/593* (2017.01); *G06V 10/751* (2022.01); *H04N 13/207* (2018.05); *G06T 2207/20228* (2013.01); *H04N 2013/0081* (2013.01)

(58) Field of Classification Search
CPC ........... G06T 7/593; G06T 2207/20228; G06T 2207/10012; G06V 10/751; H04N 13/207; H04N 2013/0081; G01C 11/06
(Continued)

(56) References Cited

U.S. PATENT DOCUMENTS 6,215,898 B1 * 4/2001 Woodfill .............. G06V 10/757
348/E13.016
7,599,512 B2 * 10/2009 Shimizu ................. G06V 10/40
382/100
(Continued)

FOREIGN PATENT DOCUMENTS

CN 110895821 A 3/2020
JP 2000-207695 A 7/2000
(Continued)

OTHER PUBLICATIONS

Heiko Hirschmüller, "Stereo Processing by Semiglobal Matching and Mutual Information," IEEE Transactions on Pattern Analysis and Machine Intelligence, Feb. 2008, pp. 328-341, vol. 30, No. 2.

*Primary Examiner* — Kathleen Y Dulaney
(74) *Attorney, Agent, or Firm* — Studebaker Brackett PLLC

(57) ABSTRACT
An image processing device 20 includes a communication unit 21 and a controller 22 (processor). The communication unit 21 acquires a standard image and a reference image captured by a stereo camera 10. The controller 22 calculates a disparity based on the standard image and the reference image. The controller 22 calculates, at each pixel position, a cost value representing a degree of difference for each pixel
(Continued)

position between the standard image and each of multiple images obtained by displacing the reference image by multiple different deviation amounts in a direction corresponding to a baseline length direction of the stereo camera 10. The processor aggregates the cost values using dynamic programming and calculates a disparity for each pixel position based on the aggregated cost values for each different deviation amount. The multiple different deviation amounts are discrete values at uneven intervals.

12 Claims, 32 Drawing Sheets

(30) Foreign Application Priority Data

| | | | |
|---|---|---|---|
| Aug. 24, 2020 | (JP) | ................................ | 2020-141244 |
| Oct. 19, 2020 | (JP) | ................................ | 2020-175540 |

(51) Int. Cl.
*H04N 13/00* (2018.01)
*H04N 13/207* (2018.01)

(58) Field of Classification Search
USPC ................................................. 382/154, 106
See application file for complete search history.

(56) References Cited

U.S. PATENT DOCUMENTS

| | | | | |
|---|---|---|---|---|
| 10,977,816 | B2 * | 4/2021 | Sano | ........................ G06T 5/92 |
| 2012/0194652 | A1 * | 8/2012 | Myokan | .................... G06T 7/85 |
| | | | | 348/E13.074 |
| 2014/0002605 | A1 * | 1/2014 | Liao | ..................... H04N 13/128 |
| | | | | 348/46 |
| 2014/0009577 | A1 * | 1/2014 | Wakabayashi | .......... G06T 7/593 |
| | | | | 348/43 |
| 2014/0321712 | A1 | 10/2014 | Ciurea et al. | |
| 2015/0248594 | A1 * | 9/2015 | Zhong | ..................... G06T 7/593 |
| | | | | 901/46 |
| 2015/0248769 | A1 * | 9/2015 | Ukil | ........................ G06T 7/593 |
| | | | | 382/154 |
| 2016/0301912 | A1 * | 10/2016 | Saitoh | ..................... G06T 7/593 |
| 2016/0364875 | A1 * | 12/2016 | Seki | ...................... G06T 19/006 |
| 2017/0069072 | A1 * | 3/2017 | Sano | .................... H04N 13/246 |
| 2018/0091798 | A1 * | 3/2018 | Chang | ..................... G06T 7/593 |
| 2019/0213746 | A1 * | 7/2019 | Azuma | ................. G01B 11/00 |
| 2020/0082556 | A1 * | 3/2020 | Sano | ..................... G06T 3/4007 |
| 2020/0300984 | A1 * | 9/2020 | Matsuura | ................ G01S 17/86 |

FOREIGN PATENT DOCUMENTS

| | | |
|---|---|---|
| JP | 2000-283753 A | 10/2000 |
| JP | 2015-159397 A | 9/2015 |
| JP | 2020-042661 A | 3/2020 |
| WO | 2004/063991 A1 | 7/2004 |

* cited by examiner

Figure 20:
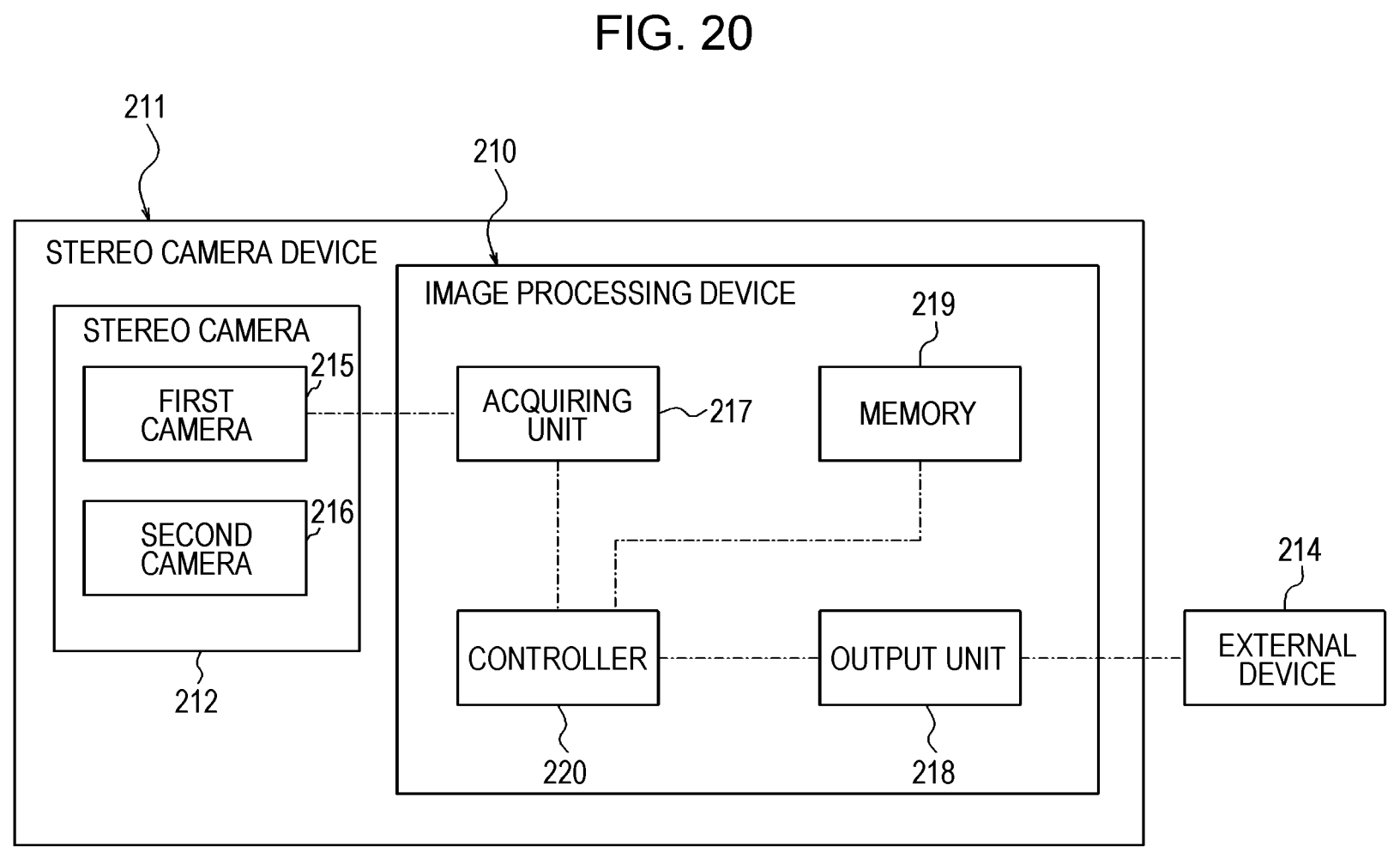

EXTERNAL DEVICE 214

IMAGE PROCESSING DEVICE 210

MEMORY 219

OUTPUT UNIT 218

ACQUIRING UNIT 217

CONTROLLER 220

STEREO CAMERA DEVICE 211

STEREO CAMERA 212

FIRST CAMERA 215

SECOND CAMERA 216

BASELINE LENGTH
DIRECTION

BASELINE LENGTH
DIRECTION

SINGLE-PIXEL COLUMN ADJACENT TO
AND ONE PIXEL AWAY FROM BOUNDARY

SINGLE-PIXEL COLUMN ADJACENT TO BOUNDARY

Figure 29:
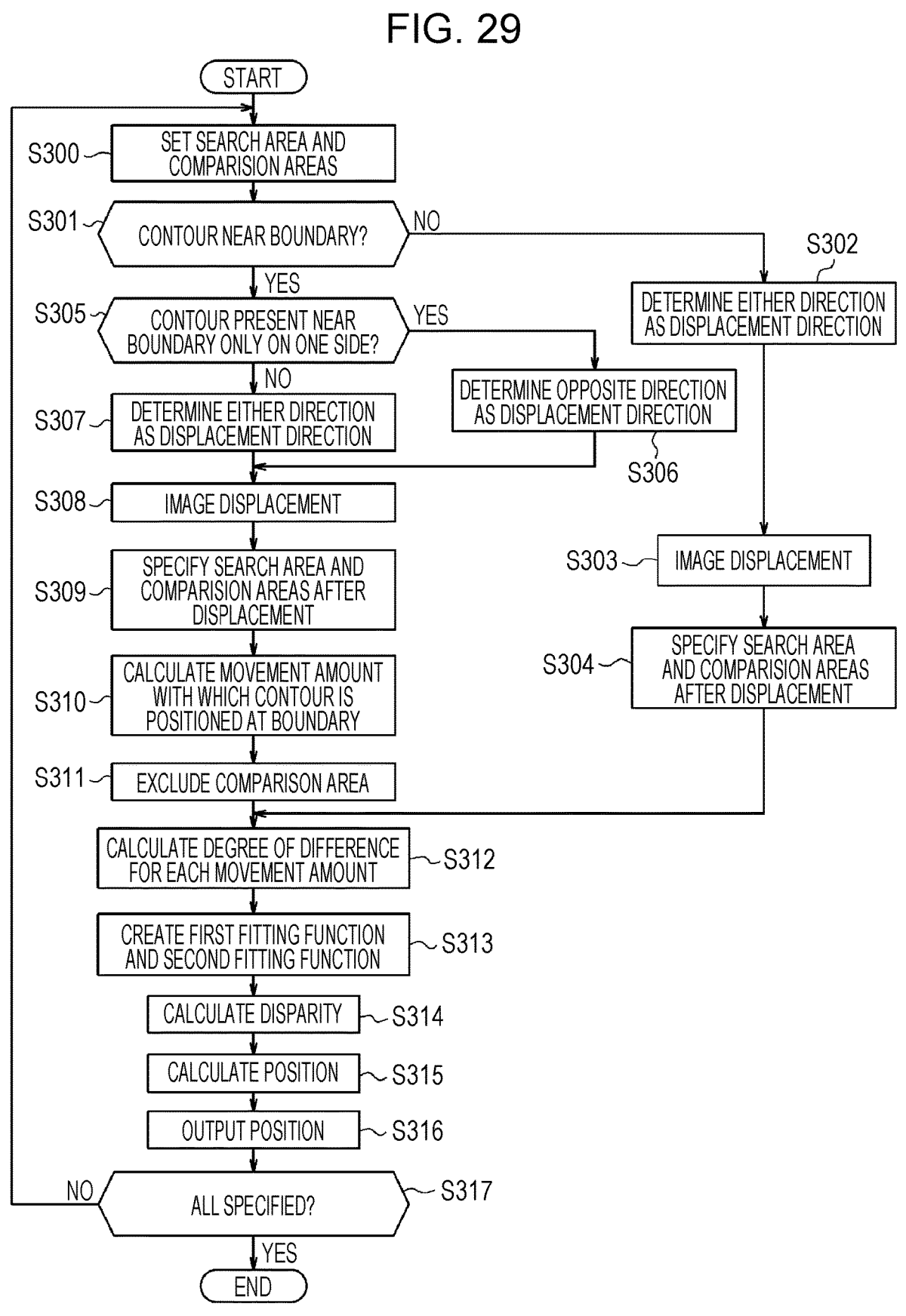

```
                            START

S300 ──    SET SEARCH AREA AND
           COMPARISION AREAS

S301 ──  CONTOUR NEAR BOUNDARY?  ──NO────────────────┐
                                                      │    S302
                 YES                                  ▼
                                           DETERMINE EITHER DIRECTION
S305 ──  CONTOUR PRESENT NEAR  ──YES──┐    AS DISPLACEMENT DIRECTION
         BOUNDARY ONLY ON ONE SIDE?   │
                 NO                   ▼
                            DETERMINE OPPOSITE DIRECTION
S307 ──  DETERMINE EITHER    AS DISPLACEMENT DIRECTION
         DIRECTION
         AS DISPLACEMENT DIRECTION          S306

S308 ──  IMAGE DISPLACEMENT

S309 ──  SPECIFY SEARCH AREA AND          S303 ──  IMAGE DISPLACEMENT
         COMPARISION AREAS AFTER
         DISPLACEMENT
                                          S304 ──  SPECIFY SEARCH AREA
S310 ──  CALCULATE MOVEMENT AMOUNT                 AND COMPARISION AREAS
         WITH WHICH CONTOUR IS                     AFTER DISPLACEMENT
         POSITIONED AT BOUNDARY

S311 ──  EXCLUDE COMPARISON AREA

CALCULATE DEGREE OF DIFFERENCE  ── S312
         FOR EACH MOVEMENT AMOUNT

CREATE FIRST FITTING FUNCTION   ── S313
         AND SECOND FITTING FUNCTION

CALCULATE DISPARITY             ── S314

CALCULATE POSITION              ── S315

OUTPUT POSITION                 ── S316

NO ──    ALL SPECIFIED?                  ── S317

YES
                 END
```

FIG. 30

IMAGE PROCESSING DEVICE, STEREO CAMERA DEVICE, MOBILE OBJECT, DISPARITY CALCULATING METHOD, AND IMAGE PROCESSING METHOD

CROSS-REFERENCE TO RELATED APPLICATIONS

This application claims priority of Japanese Patent Application No. 2020-127696, Japanese Patent Application No. 2020-141243, Japanese Patent Application No. 2020-141244, and Japanese Patent Application No. 2020-175540 respectively filed in Japan on Jul. 28, 2020, Aug. 24, 2020, Aug. 24, 2020, and Oct. 19, 2020, and the entire disclosures of these applications are hereby incorporated by reference.

TECHNICAL FIELD

The present disclosure relates to an image processing device, a stereo camera device, a mobile object, a disparity calculating method, and an image processing method.

BACKGROUND OF INVENTION

Heretofore, in a known method, the distance to a subject is calculated by calculating a disparity from two images captured by a stereo camera. A known method for obtaining the disparity of positions on two captured images is a block matching method (refer to, for example, Patent Literature 1). In the block matching method, a small region (block) of a standard image is displaced in a direction corresponding to a baseline length direction relative to a reference image and a degree of difference is evaluated. The disparity is the deviation amount of pixels having the smallest degree of difference. For example, the sum of absolute difference (SAD) of the brightnesses of pixels is used to evaluate the degree of difference.

However, it may not be possible to extract image features from regions where the texture of the captured image is comparatively low (regions having low differences in luminance) and it may be difficult to calculate disparity using only a method based on block matching. Therefore, disparity estimation methods based on dynamic programming methods such as the semiglobal matching method (SGM method) have been proposed, which can be used to calculate disparity even in regions having comparatively low textures (refer to, for example, Patent Literature 1).

In distance measurement using a stereo camera, a reference image is compared with a standard image in units of pixels, but when the object to be measured is at a long distance, the resolution of distance measurement is reduced. Therefore, a method has been proposed in which the distance is calculated by interpolating the disparity in units of less than one pixel, while assuming that the distribution of differences is symmetrical around a minimum point (refer to, for example, Patent Literature 2).

In a digital stereo camera, a position in an image is recognized in units of pixels, and therefore a real-space position corresponding to a disparity of less than one pixel cannot be calculated. Use of sub-pixel estimation for estimating disparities of less than one pixel is known, but systematic errors called pixel locking can be caused by sub-pixel estimation. Accordingly, a method has been proposed for reducing systematic errors, such as the EEC method, which uses an interpolated image obtained by displacing one out of a pair of images by a distance of 0.5 pixels (refer to, for example, Patent Literature 3).

CITATION LIST

Patent Literature

Patent Literature 1: Japanese Unexamined Patent Application Publication No. 2000-207695
Patent Literature 2: Japanese Unexamined Patent Application Publication No. 2000-283753
Patent Literature 3: International Publication No. 2004/063991

Non Patent Literature

Non Patent Literature 1: H. Hirschmuller, Stereo Processing by Semiglobal Matching and Mutual Information, IEEE Transactions on Pattern Analysis and Machine Intelligence, 30(2), 328-341, February 2008

SUMMARY

In a First Aspect of the present disclosure, an image processing device includes an acquiring unit and a processor. The acquiring unit is configured to acquire a standard image and a reference image captured by a stereo camera. The processor is configured to calculate a disparity based on the standard image and the reference image. The processor is configured to calculate, for each pixel position, a cost value representing a degree of difference for each pixel position between the standard image and each of multiple images obtained by displacing the reference image by multiple different deviation amounts in a direction corresponding to a baseline length direction of the stereo camera. The processor is configured to aggregate the cost values using dynamic programming and calculate a disparity for each pixel position based on the aggregated cost values for each different deviation amount. The multiple different deviation amounts are discrete values at uneven intervals.

In a Second Aspect of the present disclosure, an image processing device includes an acquiring unit and a processor. The acquiring unit is configured to acquire a standard image and a reference image captured by a stereo camera. The processor is configured to calculate a disparity based on the standard image and the reference image. The processor is configured to calculate, for each pixel position, a first cost value representing a degree of difference for each pixel position between the standard image and each of multiple images obtained by displacing the reference image by multiple different deviation amounts, in units of pixels, in a first direction corresponding to a baseline length direction of the stereo camera. The processor is configured to calculate, for each pixel position, a second cost value representing a degree of difference for each pixel position between the standard image and each of multiple images obtained by displacing the standard image by multiple different deviation amounts in the first direction. The processor is configured to calculate a disparity for each pixel position by estimating a deviation amount that minimizes the first cost value down to units of less than one pixel using the second cost values.

In a Third Aspect of the present disclosure, an image processing device includes an acquiring unit and a controller.

The acquiring unit is configured to acquire a standard image and a reference image captured by a stereo camera.

The controller is configured to, based on multiple degrees of difference between a search area within the standard image and a comparison area within the reference image displaced along a baseline length direction of the stereo camera in units of pixels, create a first fitting function representing a relationship between degrees of difference between the search area and the comparison area, and movement amounts of the comparison area displaced along the baseline length direction, configured to, based on multiple degrees of difference between the search area of the standard image and the comparison area of the reference image displaced along the baseline length direction in units of pixels in a state where one out of the standard image and the reference image is displaced by 0.5 pixels in the baseline length direction, create a second fitting function representing a relationship between degrees of difference between the search area and the comparison area, and movement amounts of the comparison area displaced along the baseline length direction, and configured to calculate a disparity of a subject image in the search area based on the first fitting function and the second fitting function.

When a contour of a subject image that intersects the baseline length direction is present near a boundary of the search area on a side in the baseline length direction within the standard image, the controller creates the first fitting function by excluding a degree of difference of the comparison area at a movement amount to a position where the contour is present.

When a contour of a subject image that intersects the baseline length direction exists near a boundary of the search area within the standard image on a side in the baseline length direction in a state where one out of the standard image and the reference image has been displaced by 0.5 pixels in the baseline length direction, the image processing device creates the second fitting function by excluding a degree of difference of the comparison area at a movement amount to a position where the contour exists.

In a Fourth Aspect of the present disclosure, an image processing device includes an acquiring unit and a controller.

The acquiring unit is configured to acquire a standard image and a reference image captured by a stereo camera.

The controller is configured to, based on multiple degrees of difference between a search area within the standard image and a comparison area within the reference image displaced along a baseline length direction of the stereo camera in units of pixels, create a first fitting function representing a relationship between degrees of difference between the search area and the comparison area, and movement amounts of the comparison area displaced along the baseline length direction, and configured to, based on at least one out of an extreme value of the first fitting function and a slope near the extreme value, select either of a disparity calculated based on the first fitting function and a disparity calculating using dynamic programming as a disparity of a subject image within the search area.

In a Fifth Aspect of the present disclosure, a stereo camera device includes a stereo camera and a processor. The stereo camera includes a first camera and a second camera. The first camera is configured to capture a standard image. The second camera is configured to capture a reference image. The processor is configured to calculate a disparity based on the standard image and the reference image. The processor is configured to calculate, for each pixel position, a cost value representing a degree of difference for each pixel position between the standard image and each of multiple images obtained by displacing the reference image by multiple different deviation amounts in a direction corresponding to a baseline length direction of the stereo camera. The processor is configured to aggregate the cost values using dynamic programming and calculate a disparity for each pixel position based on the aggregated cost values for each different deviation amount. The multiple different deviation amounts are discrete values at uneven intervals.

In a Sixth Aspect of the present disclosure, a stereo camera device includes a stereo camera and a processor. The stereo camera includes a first camera configured to capture a standard image and a second camera configured to capture a reference image. The processor is configured to calculate a disparity based on the standard image and the reference image. The processor is configured to calculate, for each pixel position, a first cost value representing a degree of difference for each pixel position between the standard image and each of multiple images obtained by displacing the reference image by multiple different deviation amounts, in units of pixels, in a first direction corresponding to a baseline length direction of the stereo camera. The processor is configured to calculate, for each pixel position, a second cost value representing a degree of difference for each pixel position between the standard image and each of multiple images obtained by displacing the standard image by multiple different deviation amounts in the first direction. The processor is configured to calculate a disparity for each pixel position by estimating a deviation amount that minimizes the first cost value down to units of less than one pixel using the second cost values.

In a Seventh Aspect of the present disclosure, a stereo camera device includes a stereo camera and an image processing device. The stereo camera is configured to capture a standard image and a reference image. The image processing device is configured to, based on multiple degrees of difference between a search area within the standard image and a comparison area within the reference image displaced along a baseline length direction of the stereo camera in units of pixels, create a first fitting function representing a relationship between degrees of difference between the search area and the comparison area, and movement amounts of the comparison area displaced along the baseline length direction, configured to, based on multiple degrees of difference between the search area of the standard image and the comparison area of the reference image displaced along the baseline length direction in units of pixels in a state where one out of the standard image and the reference image is displaced by 0.5 pixels in the baseline length direction, create a second fitting function representing a relationship between degrees of difference between the search area and the comparison area, and movement amounts of the comparison area displaced along the baseline length direction, and configured to calculate a disparity of a subject image in the search area based on the first fitting function and the second fitting function.

When a contour of a subject image that intersects the baseline length direction is present near a boundary of the search area on a side in the baseline length direction within the standard image, the image processing device creates the first fitting function by excluding a degree of difference of the comparison area at a movement amount to a position where the contour is present.

When a contour of a subject image that intersects the baseline length direction exists near a boundary of the search area within the standard image on a side in the baseline length direction in a state where one out of the standard image and the reference image has been displaced by 0.5 pixels in the baseline length direction, the image processing device creates the second fitting function by excluding a degree of difference of the comparison area at a movement amount to a position where the contour exists.

In an Eighth Aspect of the present disclosure, a stereo camera device includes a stereo camera and an image processing device. The stereo camera is configured to capture a standard image and a reference image.

The image processing device is configured to, based on multiple degrees of difference between a search area within the standard image and a comparison area within the reference image displaced along a baseline length direction of the stereo camera in units of pixels, create a first fitting function representing a relationship between degrees of difference between the search area and the comparison area, and movement amounts of the comparison area displaced along the baseline length direction, and configured to, based on at least one out of an extreme value of the first fitting function and a slope near the extreme value, select either of a disparity calculated based on the first fitting function and a disparity calculating using dynamic programming as a disparity of a subject image within the search area.

In a Ninth Aspect of the present disclosure, a mobile object includes a stereo camera device. The stereo camera device includes a stereo camera and a processor. The stereo camera includes a first camera configured to capture a standard image and a second camera configured to capture a reference image. The processor is configured to calculate a disparity based on the standard image and the reference image. The processor is configured to calculate, for each pixel position, a cost value representing a degree of difference for each pixel position between the standard image and each of multiple images obtained by displacing the reference image by multiple different deviation amounts in a direction corresponding to a baseline length direction of the stereo camera. The processor is configured to aggregate the cost values using dynamic programming and calculate a disparity for each pixel position based on the aggregated cost values for each different deviation amount. The multiple different deviation amounts are discrete values at uneven intervals.

In a Tenth Aspect of the present disclosure, a mobile object includes a stereo camera device. The stereo camera device includes a stereo camera and a processor. The stereo camera includes a first camera configured to capture a standard image and a second camera configured to capture a reference image. The processor is configured to calculate a disparity based on the standard image and the reference image. The processor is configured to calculate, for each pixel position, a first cost value representing a degree of difference for each pixel position between the standard image and each of multiple images obtained by displacing the reference image by multiple different deviation amounts, in units of pixels, in a first direction corresponding to a baseline length direction of the stereo camera. The processor is configured to calculate, for each pixel position, a second cost value representing a degree of difference for each pixel position between the standard image and each of multiple images obtained by displacing the standard image by multiple different deviation amounts in the first direction. The processor is configured to calculate a disparity for each pixel position by estimating a deviation amount that minimizes the first cost value down to units of less than one pixel using the second cost values.

In an Eleventh Aspect of the present disclosure, a mobile object includes a stereo camera device. The stereo camera device includes a stereo camera and an image processing device. The stereo camera is configured to capture a standard image and a reference image. The image processing device is configured to, based on multiple degrees of difference between a search area within the standard image and a comparison area within the reference image displaced along a baseline length direction of the stereo camera in units of pixels, create a first fitting function representing a relationship between degrees of difference between the search area and the comparison area, and movement amounts of the comparison area displaced along the baseline length direction, configured to, based on multiple degrees of difference between the search area of the standard image and the comparison area of the reference image displaced along the baseline length direction in units of pixels in a state where one out of the standard image and the reference image is displaced by 0.5 pixels in the baseline length direction, create a second fitting function representing a relationship between degrees of difference between the search area and the comparison area, and movement amounts of the comparison area displaced along the baseline length direction, and configured to calculate a disparity of a subject image in the search area based on the first fitting function and the second fitting function.

When a contour of a subject image that intersects the baseline length direction is present near a boundary of the search area on a side in the baseline length direction within the standard image, the image processing device creates the first fitting function by excluding a degree of difference of the comparison area at a movement amount to a position where the contour is present.

When a contour of a subject image that intersects the baseline length direction exists near a boundary of the search area within the standard image on a side in the baseline length direction in a state where one out of the standard image and the reference image has been displaced by 0.5 pixels in the baseline length direction, the image processing device creates the second fitting function by excluding a degree of difference of the comparison area at a movement amount to a position where the contour exists.

In a Twelfth Aspect of the present disclosure, a mobile object includes a stereo camera device. The stereo camera device includes a stereo camera and an image processing device. The stereo camera is configured to capture a standard image and a reference image. The image processing device is configured to, based on multiple degrees of difference between a search area within the standard image and a comparison area within the reference image displaced along a baseline length direction of the stereo camera in units of pixels, create a first fitting function representing a relationship between degrees of difference between the search area and the comparison area, and movement amounts of the comparison area displaced along the baseline length direction, and configured to, based on at least one out of an extreme value of the first fitting function and a slope near the extreme value, select either of a disparity calculated based on the first fitting function and a disparity calculating using dynamic programming as a disparity of a subject image within the search area.

In a Thirteenth Aspect of the present disclosure, a disparity calculating method is executed by a processor. The disparity calculating method includes acquiring a standard image and a reference image captured by a stereo camera. The disparity calculating method includes calculating, for each pixel position, a cost value representing a degree of difference for each pixel position between the standard image and each of multiple images obtained by displacing the reference image by multiple different deviation amounts in a direction corresponding to a baseline length direction of the stereo camera. The disparity calculating method includes aggregating the cost values using dynamic programming. The disparity calculating method includes calculating a disparity for each pixel position based on the aggregated cost values for each different deviation amount. The multiple different deviation amounts are discrete values at uneven intervals.

In a Fourteenth Aspect of the present disclosure, a disparity calculating method is executed by a processor. The disparity calculating method includes acquiring a standard image and a reference image captured by a stereo camera. The disparity calculating method includes calculating, for each pixel position, a first cost value representing a degree of difference for each pixel position between the standard image and each of multiple images obtained by displacing the reference image by multiple different deviation amounts, in units of pixels, in a first direction corresponding to a baseline length direction of the stereo camera. The disparity calculating method includes calculating, for each pixel position, a second cost value representing a degree of difference for each pixel position between the standard image and each of multiple images obtained by displacing the standard image by multiple different deviation amounts in the first direction. The disparity calculating method includes calculating a disparity for each pixel position by estimating a deviation amount that minimizes the first cost value down to units of less than one pixel using the second cost values.

In a Fifteenth Aspect of the present disclosure, an image processing method includes causing a stereo camera to capture a standard image and a reference image, when a contour of a subject image that intersects a baseline length direction of the stereo camera is present near a boundary of a search area within the standard image on a side in the baseline length direction, excluding a degree of difference of a comparison area within the reference image with a movement amount to a position where the contour is present from multiple degrees of difference between the search area within the standard image and the comparison area within the reference image displaced in units of pixels along the baseline length direction, creating a first fitting function representing a relationship between degrees of difference between the search area and the comparison area, and movement amounts of the comparison area displaced along the baseline length direction based on the excluded degree of difference, when a contour of a subject image that intersects the baseline length direction is present near a boundary of the search area within the standard image on a side in the baseline length direction, excluding a degree of difference of a comparison area within the reference image with a movement amount to a position where the contour is present from multiple degrees of difference between the search area within the standard image and the comparison area within the reference image displaced in units of pixels along the baseline length direction in a state where one out of the standard image and the reference image has been displaced by 0.5 pixels in the baseline length direction, creating a second fitting function representing a relationship between degrees of difference between the search area and the comparison area, and movement amounts of the comparison area displaced along the baseline length direction based on the excluded degree of difference, and calculating a disparity of a subject image within the search area based on the first fitting function and the second fitting function.

In a Sixteenth Aspect of the present disclosure, an image processing method includes causing a stereo camera to capture a standard image and a reference image, based on multiple degrees of difference between a search area within the standard image and a comparison area within the reference image displaced along a baseline length direction of the stereo camera in units of pixels, creating a first fitting function representing a relationship between degrees of difference between the search area and the comparison area, and movement amounts of the comparison area displaced along the baseline length direction, and selecting either a disparity calculated based on the first fitting function or a disparity calculated using dynamic programming as a disparity of a subject image within the search area based on at least one out of an extreme value of the first fitting function and a slope near the extreme value.

BRIEF DESCRIPTION OF THE DRAWINGS

FIG. 5 is a diagram for explaining a method for generating difference images.

FIG. 7 is a diagram for explaining aggregation of cost values using dynamic programming.

FIG. 8 is a diagram for explaining a method used to determine estimated disparity.

FIG. 14 is a diagram for explaining a method for generating difference images.

FIG. 15 is a diagram for explaining a method used to determine estimated disparity.

FIG. 20 is a block diagram illustrating the schematic configuration of a stereo camera device including an image processing device according to a Third Embodiment.

FIG. 29 is a flowchart for describing position calculation processing executed by a controller in FIG. 20.

FIG. 30 is a block diagram illustrating the schematic configuration of a stereo camera device including an image processing device according to a Fourth Embodiment.

DESCRIPTION OF EMBODIMENTS

Figure 1:
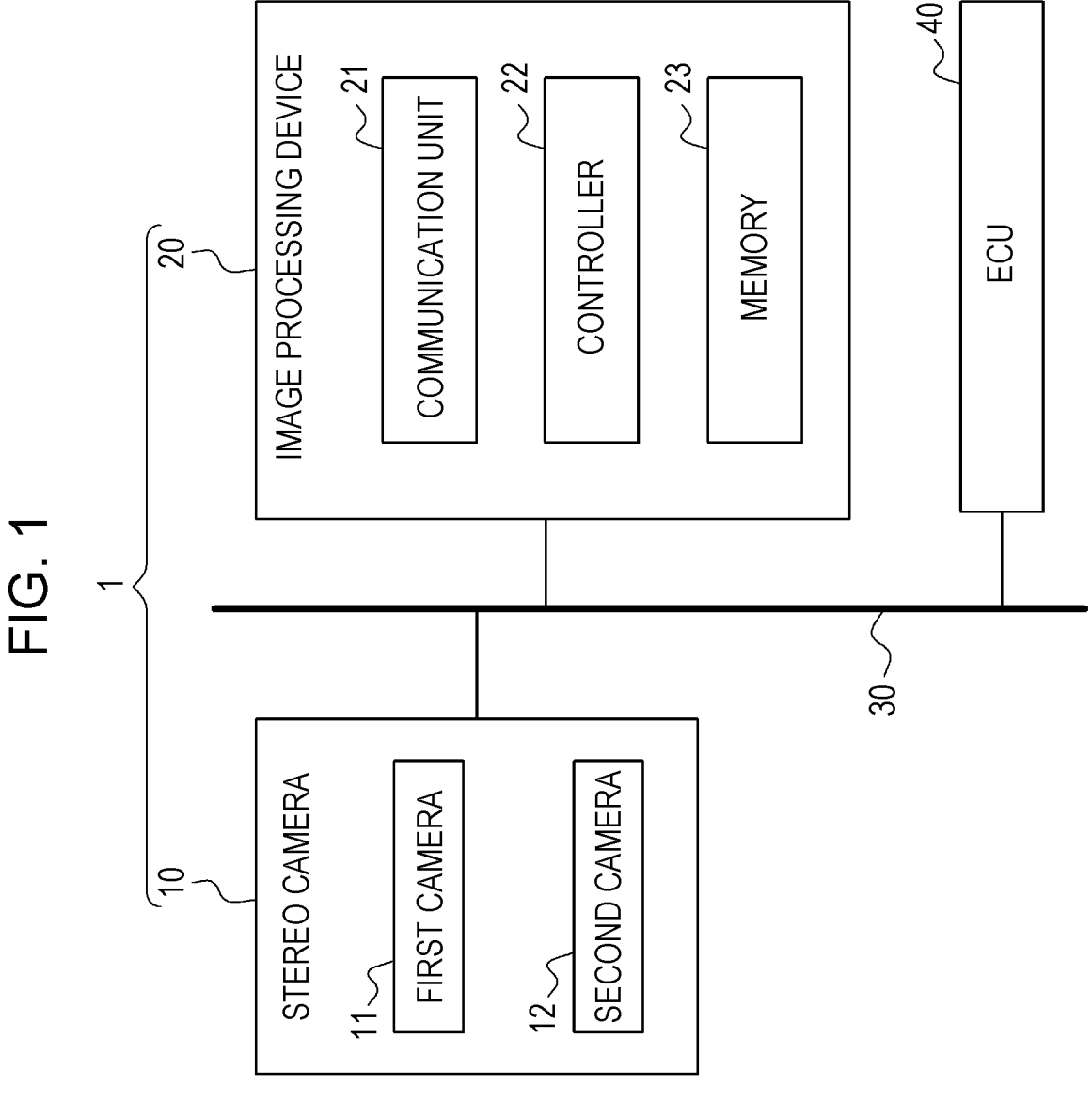
FIG. 1 is a block diagram illustrating the schematic configuration of a stereo camera system according to a First Embodiment.

Embodiments of the present disclosure are described below while referring to the drawings. The drawings used in the following description are schematic drawings. The dimensional proportions and so on in the drawings do not necessarily match the actual dimensional proportions and so on.

(Overall Configuration of Stereo Camera System)

As illustrated in FIG. 1, in a First Embodiment, a stereo camera system 1 includes a stereo camera 10 and an image processing device 20. The stereo camera 10 and the image processing device 20 can communicate with each other via a wired or wireless network 30. The network 30 may include a network for vehicles such as a controller area network (CAN) when the stereo camera system 1 is installed in a vehicle. The stereo camera 10 and the image processing device 20 may be integrated with each other and housed in the same housing. A device in which the stereo camera 10 and the image processing device 20 are housed in the same housing may be referred to as a stereo camera device. The stereo camera 10 and the image processing device 20 may be installed in a mobile object 50 (refer to FIGS. 2 and 3) and be capable of communicating with an electronic control unit (ECU) 40 inside the mobile object 50. The ECU 40 inside the mobile object 50 includes a processor, a memory, and so forth and realizes the functions of each part of the mobile object. The ECU 40 may include an ECU for object recognition, an ECU for collision avoidance control, and an ECU for auto cruise control.

(Configuration of Stereo Camera)

The term "stereo camera" refers to multiple cameras that have a disparity therebetween and cooperate with each other. A stereo camera includes at least two or more cameras. A stereo camera can capture images of an object from multiple directions by making multiple cameras work together. Stereo cameras include those that can capture images of an object simultaneously by multiple cameras working together. "Simultaneously" capture images is not limited to meaning at exactly the same time. For example, (1) multiple cameras capturing images at the same time, (2) multiple cameras capturing images based on the same signal, and (3) multiple cameras capturing images at the same time according to their respective internal clocks are included in the meaning of "simultaneously" capturing images in the present disclosure. Examples of a time standard for image capture include a start time of image capture, an end time of image capture, a transmission time of a captured image signal, and the time when an image signal is received by another device. The stereo camera does not have to consist of multiple cameras that are independent of each other. For example, a camera including an optical mechanism that directs light incident at two separate locations to a single light-receiving element can be employed as the stereo camera. In the present disclosure, multiple images of the same subject captured from different viewpoints may be referred to as "stereo images".

The stereo camera 10 includes a first camera 11 and a second camera 12. The first camera 11 and the second camera 12 each include an optical system defining the optical axis of the camera and an imaging element. The first camera 11 and the second camera 12 have different optical axes from each other. The optical systems of the first camera 11 and the second camera 12 each include an imaging lens. The distance between the center of the imaging lens of the first camera 11 and the center of the imaging lens of the second camera 12 is called a "baseline length". A direction along which the center of the imaging lens of the first camera 11 and the center of the imaging lens of the second camera 12 are connected to each other is called a "baseline length direction".

Examples of imaging elements include charge-coupled device (CCD) image sensors and complementary MOS (CMOS) image sensors. The first camera 11 and the second camera 12 generate image signals representing images captured by the imaging elements. The first camera 11 and the second camera 12 may perform any suitable processing on the captured images, such as distortion correction, brightness adjustment, contrast adjustment, gamma correction, and so on.

The first camera 11 and the second camera 12 capture images of a subject at a prescribed frame rate (for example, 30 fps).

The optical axes of the first camera 11 and the second camera 12 are oriented in directions that allow the cameras to capture images of the same subject as each other. The optical axes and positions of the first camera 11 and second camera 12 are decided upon so that the images captured thereby each contain at least part of the same subject. The optical axes of the first camera 11 and the second camera 12 are oriented so as to be parallel to each other. "Parallel" is not limited to meaning perfectly parallel and misalignments occurring during assembly, misalignments occurring during installation, and misalignments occurring over time are permitted. The optical axes of the first camera 11 and the second camera 12 are not limited to being parallel to each other, and may instead extend in different directions from each other. The image processing device 20, which will be described below, may perform processing in order to correct misalignment of the optical axes of image signals from the first camera 11 and the second camera 12.

Due to the different positions of the first camera 11 and the second camera 12, the corresponding positions of a subject in the two images captured by the cameras are different from each other. A first image output from the first camera 11 and a second image output from the second camera 12 are stereo images captured from different viewpoints. The magnitude of the shift between the positions of pixels corresponding to the same subject in the first and second images, expressed in units of pixels, is called the disparity or deviation amount.

Figure 2:
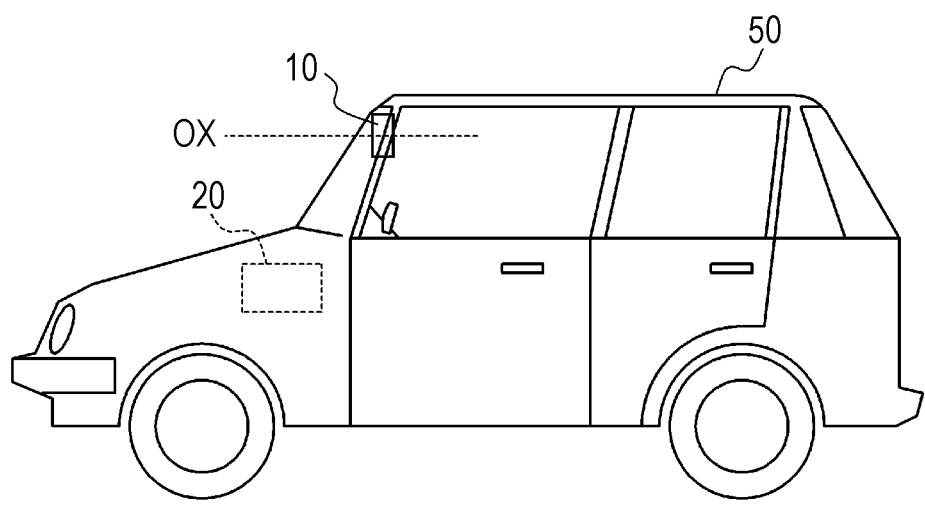
FIG. 2 is a side view schematically illustrating a mobile object equipped with the stereo camera system in FIG. 1.
Figure 3:
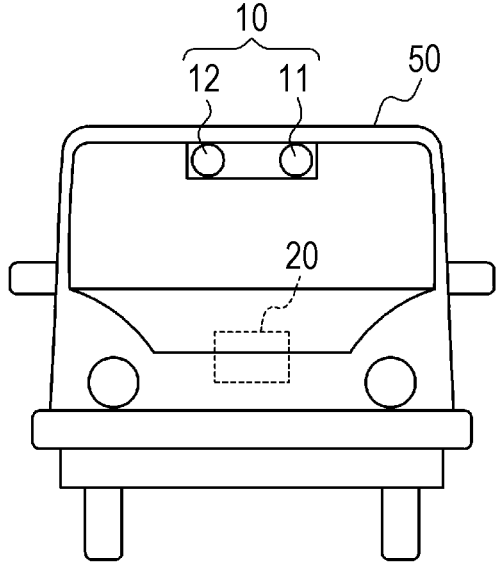
FIG. 3 is a front view schematically illustrating the mobile object equipped with the stereo camera system in FIG. 1.

As illustrated in FIGS. 2 and 3, the stereo camera system 1 in FIG. 1 can be installed in the mobile object 50, which is, for example, a vehicle. As illustrated in the side view in FIG. 2, the stereo camera 10 may be disposed so that the optical axes OX of the optical systems of the first camera 11 and the second camera 12 are substantially parallel to a forward direction relative to the mobile object 50 in order to capture images of the region ahead of the mobile object 50. In this embodiment, "forward direction" means the direction of travel of the mobile object 50 when the mobile object 50 is moving forward, and "right" and "left" mean right and left when facing forward. A height direction is an upward direction perpendicular to the road surface.

In the present disclosure, examples of "a mobile object" may include vehicles, aircraft, ships, and drones. Examples of vehicles may include automobiles, industrial vehicles, rail vehicles, motorhomes, and so on. Examples of aircraft may include fixed-wing aircraft and rotary-wing aircraft.

In one embodiment out of multiple embodiments, the first camera 11 and second camera 12 are positioned so as to be separated from each other in a left-right direction of the mobile object 50. The first camera 11 is positioned to the right of the second camera 12 when facing the front. The second camera 12 is positioned to the left of the first camera 11 when facing the front. The baseline length direction of the stereo camera 10 can be taken to be a horizontal direction. The arrangement of the first camera 11 and the second camera 12 is not limited to this arrangement. The first camera 11 may be positioned to the left of the second camera 12. The second camera 12 may be positioned to the right of the first camera 11. The first camera 11 and the second camera 12 can also be disposed side by side in the vertical direction.

In one embodiment among multiple embodiments, the first camera 11 and second camera 12 can be disposed inside the cabin of the mobile object 50, which is a vehicle, and can image the region outside the mobile object 50 through the windshield of the mobile object 50. In another embodiment among multiple embodiments, the first camera 11 and the second camera 12 may be fixed to any one out of the front bumper, a fender grill, a side fender, a light module, and a hood of the vehicle. In yet another embodiments, the direction in which the first camera 11 and second camera 12 of the stereo camera 10 capture images is not limited to a forward direction, and may instead be another direction such as a backward direction.

(Configuration of Image Processing Device)

The image processing device 20 includes a communication unit 21, a controller 22, and a memory 23. The communication unit 21 is an acquiring unit. The image processing device 20 can be disposed at any suitable position inside the mobile object 50. For example, the image processing device 20 can be disposed inside the dashboard of the mobile object 50, which is a vehicle.

The communication unit 21 is an input interface for the image processing device 20, which acquires image signals from the stereo camera 10. The communication unit 21 acquires image signals from the stereo camera 10 using a wired or wireless communication method. The communication unit 21 can acquire image signals of images captured by the first camera 11 and the second camera 12 via the network 30. The communication unit 21 passes the acquiring image signals to the controller 22. The communication unit 21 may support the transmission method of the image signals of stereo camera 10. The communication unit 21 may function as an output interface of the image processing device 20. The communication unit 21 may transmit the results of distance measurement performed by the image processing device 20 to a device such as the ECU 40.

The controller 22 includes one or multiple processors. Such processors include general-purpose processors into which specific programs are loaded to perform specific functions, and dedicated processors dedicated to specific processing. Dedicated processors include application specific integrated circuits (ASICs). Dedicated processors include programmable logic devices (PLDs). PLDs may include field-programmable gate arrays (FPGAs). The controller 22 may be either a system-on-a-chip (SoC) or a system in a package (SiP), in which one or more processors work together. The processing performed by the controller 22 may also be referred to as the processing performed by a processor.

The controller 22 calculates the disparities of pixels corresponding to the same subject included in the first image and the second image based on the first image captured by the first camera 11 and the second image captured by the second camera 12. The disparity of a subject corresponds to the distance to the subject. Hereinafter, the first image captured by the first camera 11 is referred to as a standard image and the second image captured by the second camera 12 is referred to as a reference image. The controller 22 searches for disparity by displacing a pixel or a block consisting of multiple pixels included in the standard image in a direction corresponding to the baseline length direction and searching for the deviation amount of the pixel or block having the smallest degree of difference. In the first image and the second image, a direction corresponding to the baseline length is hereinafter referred to as a horizontal direction, and a direction perpendicular to the horizontal direction is hereinafter referred to as a vertical direction. In the first image and the second image, the horizontal direction and the vertical direction are the directions in which the pixels are arrayed. The positions of the pixels in the horizontal and vertical directions are respectively represented by an x coordinate and a y coordinate. Pixel positions in the first image and the second image can be represented using coordinates (x, y).

The memory 23 stores various information such as programs for various types of processing and information generated during disparity calculation operations. The memory 23 may be configured using one or more of any out of a semiconductor memory, a magnetic memory, and an optical memory, for example. Examples of the memory 23 include volatile memories and nonvolatile memories.

(Functional Blocks of Controller)

Figure 4:
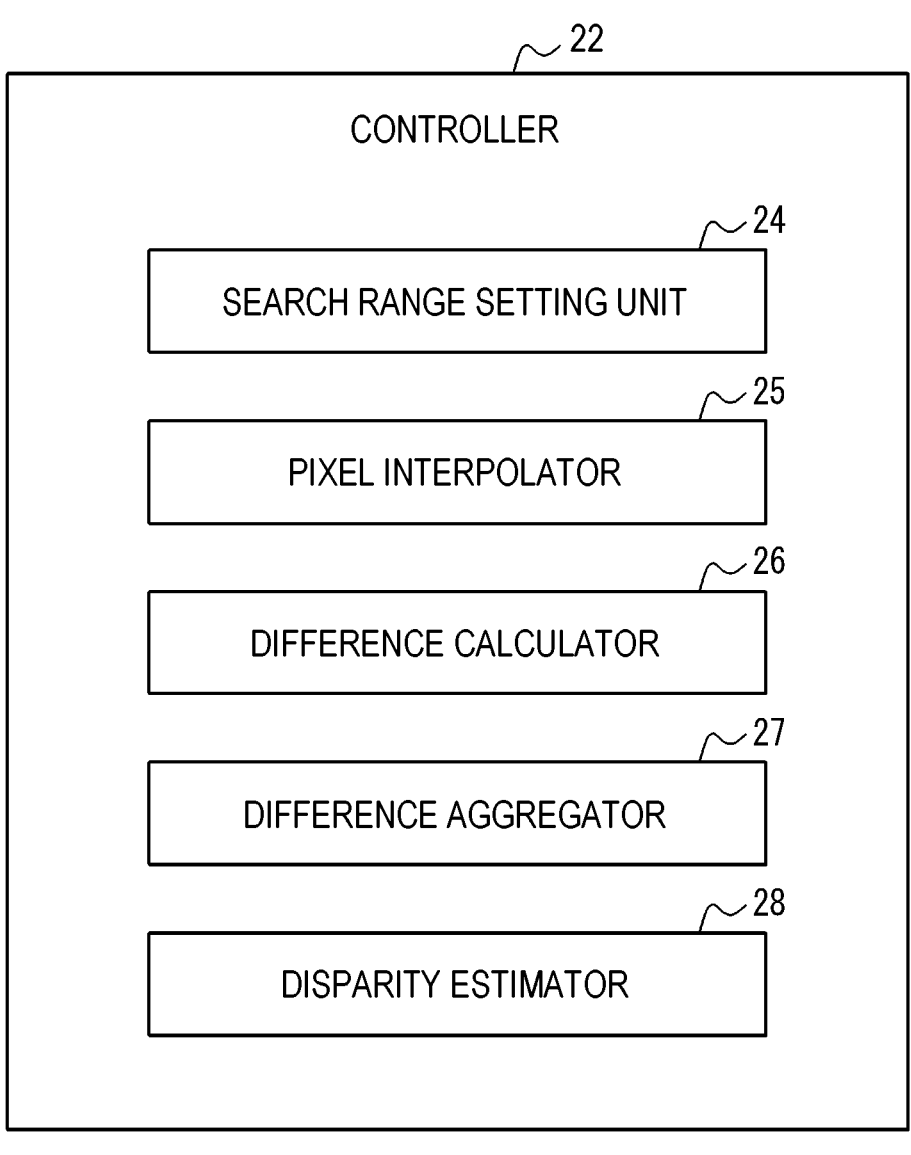
FIG. 4 is a functional block diagram illustrating the configuration of a controller in FIG. 1.

As illustrated in FIG. 4, in order to calculate the disparity of each pixel of the first image, the controller 22 includes the following functional blocks: a search range setting unit 24, a pixel interpolator 25, a difference calculator 26, a difference aggregator 27, and a disparity estimator 28. Each functional block of the controller 22 may be a hardware module or a software module. The processing performed by each functional block may also be referred to as processing performed by the controller 22.

The search range setting unit 24 is configured to set the search range of pixels in accordance with the distance measurement accuracy. The search range includes information on individual deviation amounts d of the pixels to be searched. Hereafter, first, setting of a search range in a technique of the related art will be described, and then setting of a search range by the search range setting unit 24 will be described.

In disparity estimation using stereo images of the related art, a method called cost volume filtering is known. In this method, cost values C (x, y, d) are calculated. Each cost value C (x, y, d) represents the degree of difference between a pixel in an image, which is obtained by displacing the standard image by, for example, zero pixels to the number of pixels corresponding to the maximum disparity in increments of one pixel in a direction corresponding to the baseline length direction, and the pixel at the corresponding position in the reference image. A cost value C (x, y, d) is calculated for each pixel position in the standard image and for each deviation amount between the standard image and the reference image. For example, the difference in luminance value at each pixel can be used as a cost value C (x, y, d). Alternatively, a value of SAD, sum of squared difference (SSD), zero-mean sum of square difference (ZSSD), or the like for a block of 3×3 pixels in the vertical and horizontal directions centered on the pixel for which disparity is being calculated may be used as a cost value C (x, y, d). A 3×3 pixel block is merely an example and blocks having other numbers of pixels in the vertical and horizontal directions may instead be used. From these calculation results, a three-dimensional tensor called a cost volume is generated.

Figure 5:
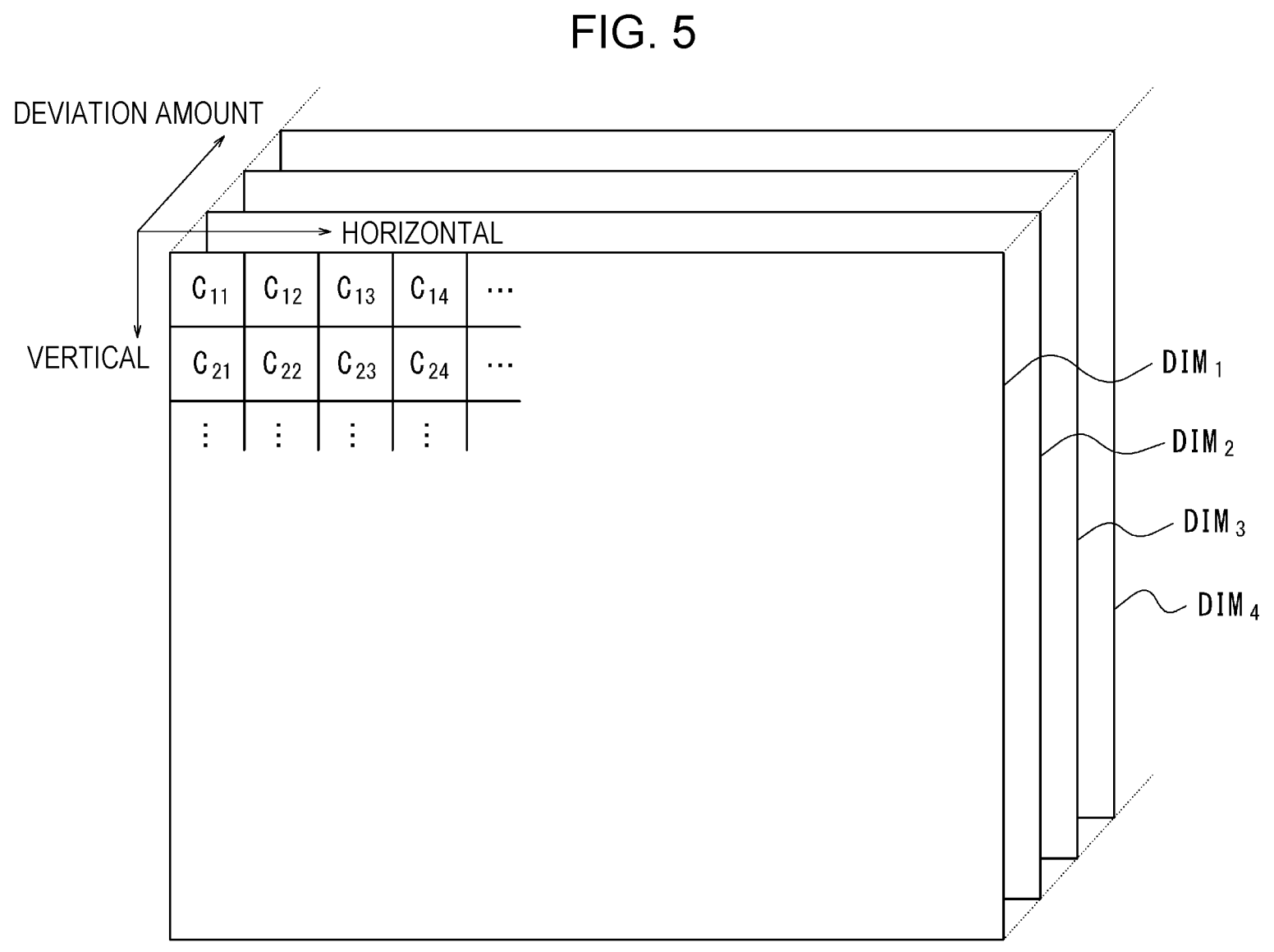

A cost volume generated by typical disparity estimation includes multiple difference images $DIM_k$ having cost values C (x, y, d) corresponding to the positions of the individual pixels, as illustrated in FIG. 5. (In FIG. 5, the cost values C (x, y, d) contained in each difference image $DIM_k$ are denoted as $C_{xy}$.) Each difference image $DIM_k$ contains a number of cost values C (x, y, d) corresponding to the number of pixels in the first image and the second image. For example, if the number of pixels in the horizontal direction is W and the number of pixels in the vertical direction is H, each difference image $DIM_k$ will include W×H cost values C (x, y, d). The cost volume can include $d_{max}+1$ difference images DIM, which are each displaced in increments of one pixel from zero pixels up to a disparity deviation amount $d_{max}$ corresponding to the maximum disparity.

In stereo images, a distance z to a subject in front is inversely proportional to disparity. Therefore, a distance corresponding to a deviation of one pixel is longer for long distances and shorter for short distances. Therefore, the generation of cost volume requires a greater amount of computation to calculate disparities for short distances and distance measurement is less accurate for long distances. Therefore, unlike in the method of the related art, in the image processing device 20 of the present disclosure, the search range setting unit 24 sets the disparity deviation amount to discrete values at uneven intervals, rather than to an interval of a single pixel.

Figure 6:
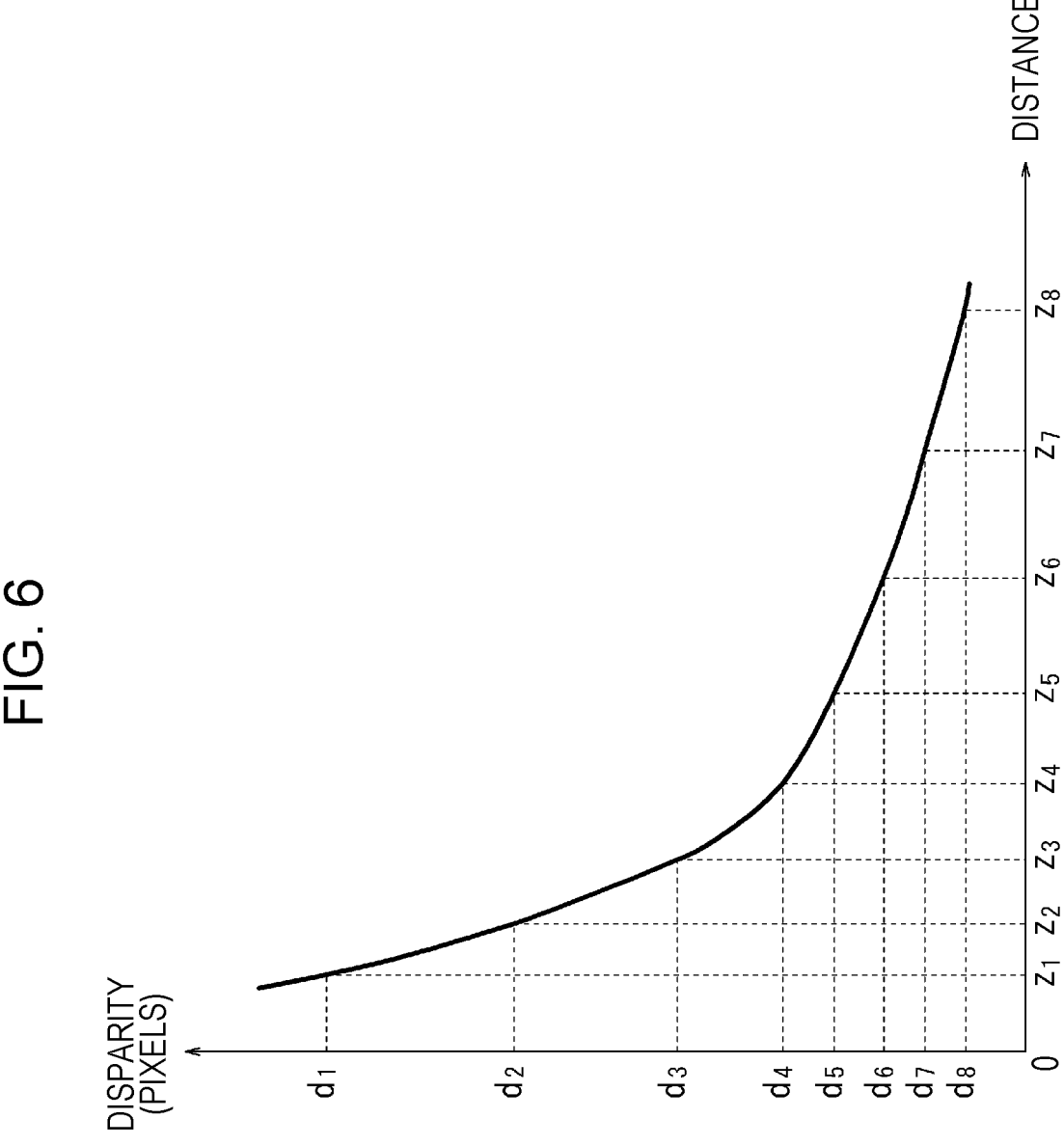
FIG. 6 is a diagram for explaining the relationship between distance and disparity deviation amount.

FIG. 6 is a diagram for simply explaining the relationship between measurement distance z and pixel disparity (deviation amount d) in the image processing device 20 of the present disclosure. $z_1$ to $z_8$ along the horizontal axis indicate the measurement distance. In this case, $z_1$ is the shortest distance at which distance measurement is performed. $z_8$ is the longest distance at which distance measurement is performed. $d_1$ to $d_8$ along the vertical axis indicate disparities corresponding to the distances $z_1$ to $z_8$. The product of a distance and a disparity (deviation amount d) corresponding to that distance is constant. Disparities $d_1$ to $d_8$ correspond to deviation amounts d of the cost volume in FIG. 5.

In the image processing device 20 of the present disclosure, the search range setting unit 24 first determines the range of a distance search. Next, the search range setting unit 24 divides the range of the distance search into multiple ranges. For example, in FIG. 6, when the range from distance $z_1$ to distance $z_8$ is adopted as the search range, the search range setting unit 24 divides the range from the distance $z_1$ to the distance $z_8$ into a prescribed number of segments in order to determine the distances $z_1$ to $z_8$ to be measured.

Distances to be measured can be set in accordance with a distance measurement error. For example, if an error of ±e % is permitted in distance measurement based on the disparity of the stereo camera 10, a distance $z_k$ (k=1 to 8) can be determined sequentially from k=1 so that the kth distance $z_k$ is (1+2e/100) times the k-1th distance $z_{k-1}$.

Once the distances $z_1$ to $z_8$ to be measured have been determined, the corresponding disparities $d_1$ to $d_8$ are calculated using a simple calculation since the product of $z_k$ and $d_k$ is constant. Among the disparities $d_1$ to $d_8$, the larger disparities are more sparsely distributed than the smaller disparities. The calculated disparities $d_1$ to $d_8$ correspond to deviation amounts d obtained when the cost volume is generated. Therefore, the deviation amounts d used when calculating the cost values C (x, y, d) are more sparsely distributed for larger deviation amounts d than for smaller deviation amounts d.

The disparities $d_1$ to $d_8$ are not rounded to the nearest whole number or otherwise processed and are therefore not integers. In other words, the deviation amounts d used when calculating the cost values C (x, y, d) contain non-integer multiples of the width of the pixels in the horizontal direction in the first and second images. The accuracy of distance measurement for long distances can be improved by the deviation amounts d including fractional portions.

The search range setting unit 24 may set the distances so that the disparity is less than one pixel for the furthest distance. In this case, the deviation amounts d of pixels used when calculating the cost values C (x, y, d) include deviation amounts d smaller than the size of the pixels in the horizontal direction of the first and second images. In this way, distances up to long distances corresponding to disparities of less than one pixel can be estimated.

Table 1 illustrates an example of the set values of distance and disparity set by the search range setting unit 24. In this example, the product of distance (meters) and disparity (pixels) is 114.1333. In this example, the distance measurement range in the forward direction is set to a range of 1 to 100 m. In addition, the permitted measurement error is set to a range of ±5%. Thus, the distances in Table 1 increase sequentially by around 10%. This allows the entire distance range of 1 m to 100 m to be covered with a permitted error of 10%.

TABLE 1

| DISPARITY [PIXELS] | DISTANCE [m] |
| --- | --- |
| 114.1333 | 1 |
| 103.2685 | 1.10521 |
| 93.437889 | 1.221489 |
| 84.54312 | 1.350001 |
| 76.49508 | 1.492035 |
| 69.21318 | 1.649012 |
| 62.62447 | 1.822504 |
| 56.66297 | 2.014249 |
| 41.97252 | 2.719239 |
| 37.97697 | 3.00533 |
| 34.36177 | 3.32152 |
| 31.09072 | 3.670977 |
| 28.13106 | 4.0572 |
| 25.45314 | 4.484057 |
| 23.03014 | 4.955824 |
| 20.8378 | 5.477226 |
| 18.85416 | 6.053484 |
| 17.05935 | 6.69037 |
| 15.43539 | 7.394262 |
| 13.96603 | 8.172212 |
| 12.63654 | 9.032009 |
| 11.43361 | 9.982265 |
| 10.34519 | 11.0325 |
| 9.36039 | 12.19322 |
| 8.469333 | 13.47607 |
| 7.663099 | 14.89389 |
| 6.933615 | 16.46087 |
| 6.273573 | 18.19272 |
| 5.676364 | 20.10677 |
| 5.136005 | 22.2222 |
| 4.647086 | 24.56019 |
| 4.204709 | 27.14417 |
| 3.804444 | 30 |
| 3.493948 | 32.66601 |
| 3.208793 | 35.56893 |
| 2.94691 | 38.72983 |
| 2.706401 | 42.17163 |
| 2.48552 | 45.9193 |
| 2.282667 | 50 |
| 2.067465 | 55.20448 |
| 1.872552 | 60.95068 |
| 1.696015 | 67.29501 |
| 1.536121 | 74.29971 |
| 1.391301 | 82.03354 |
| 1.260134 | 90.57237 |
| 1.141333 | 100 |

In Table 1, the number of distances to an object to be measured is 44. Therefore, when generating the cost volume, the number of disparity deviation amounts d used to generate the difference images DIM is also 44. This is much smaller than the number of difference images DIM, i.e., 115, that would be generated by displacing pixels in increments of one pixel from zero pixels to 114 pixels. Therefore, the search range setting unit 24 is able to significantly reduce the amount of calculations required for cost volume generation processing in a later stage of processing. In Table 1, the difference between adjacent disparities is less than one pixel for long distances, and therefore the accuracy of distance searching can improved compared to a case where distance searching is performed using units of one pixel.

The search range setting unit 24 does not have to set the deviation amounts d to be used when performing searching each time distance measurement is performed using the stereo camera 10. The disparity deviation amounts d for calculating the difference images DIM may be stored in the memory 23 in the image processing device 20 in advance. The search range setting unit 24 may set the deviation amounts d stored in the memory 23 as a search range.

The pixel interpolator 25 is configured to generate images by displacing the second image by deviation amounts d corresponding to respective disparities in accordance with the respective disparities $d_1$ to $d_{max}$ set by the search range setting unit 24. Since the disparities $d_1$ to $d_{max}$ include fractional parts, the image interpolator 25 generates images in which pixels are interpolated by performing interpolation processing. Any suitable known technique, such as linear interpolation, can be used for the interpolation processing.

The difference calculator 26 is configured to calculate the cost value C (x, y, d) for each pixel between a first image and second images, the second images having been displaced by deviation amounts d corresponding to disparities $d_1$ to $d_{max}$ by the pixel interpolator 25. For example, a cost value C (x, y, d) is the absolute value of the difference in luminance value between a first image and a second image. The difference calculator 26 can generate a cost volume, as illustrated in FIG. 5, containing the difference images $DIM_1$ to $DIM_{max}$ having the cost values C (x, y, d) as the pixel values of the individual pixels.

Normally, in cost volume calculation processing for stereo camera devices using an SGM method, difference images are generated by displacing the standard image and the reference image relative to each other in units of one pixel. The image processing device 20 of the present disclosure differs in that difference images are generated by interpolating a reference image having fractional portions in the deviation amounts d.

The difference aggregator 27 performs aggregation processing on each cost value C (x, y, d) of the cost volume generated by the difference calculator 26 based on dynamic programming.

In a typical SGM method, aggregation of cost values C (x, y, d) is performed using the cost values C (x, y, d) at points located on one-dimensional paths in eight directions displaced by 45° from each other in the vertical, horizontal, and diagonal directions relative to the pixel of interest, from the edges of the image to the pixel of interest. For example, if the aggregation processing of a cost value C (x, y, d) is performed on a diagonal path along which x and y increase with respect to the horizontal axis (x-axis) and the vertical (y-axis) axis, a cost value L (x, y, d) modified by the aggregation can be calculated using the following formula.

$$L(x,y,d)=C(x,y,d)+\min\{L(x-1,y-1,d),L(x-1,y-1,d-1)+P_1,L(x-1,y-1,d+1)+P_1,L(x-1,y-1,i)+P_2\}$$

Here, L (x, y, d) is a modified cost value. C (x, y, d) is a cost value C (x, y, d) before modification. A cost value C (x, y, d) calculated using a SAD method or another method is used as the initial value of a cost value C (x, y, d). x, y, and d are the x-axis coordinate, the y-axis coordinate, and the deviation amount, respectively. i is an arbitrary deviation amount. $P_1$ and $P_2$ are penalty terms given by the difference between deviation amounts d, where $P_1<P_2$. By performing such calculations, cost curves (Cost Curves), which represent changes in the deviation amount direction of the modified cost values L (x, y, d) between neighboring pixels, are modified so as to be more similar to each other. Aggregation processing used in a SGM method is well known, and is therefore not described in detail here.

Using an SGM method has the effect of smoothing the cost volume. Therefore, disparities can be calculated even in areas of low texture. In block matching in which an SMG method is not used, a search window of at least 3×3 pixels is used to smooth the cost values, whereas it is known that, stable disparities can be calculated by searching for cost values using 1×1 pixels in the SGM method. Since disparity estimation can be performed on a pixel-by-pixel basis with the SGM method, the amount of computation can be reduced compared with disparity searching using block matching without the SGM method.

In a typical method of aggregating cost values C (x, y, d) using the SGM method, the above-described calculations are performed in all eight directions or a plurality of directions out of the eight directions in order to optimize the stereo matching processing for the entire image. However, in this method, the image processing device 20 needs to continuously store data of cost values (x, y, d) and modified cost values L (x, y, d) of different deviation amounts for all pixel positions for the arithmetic processing. Therefore, memory usage is increased for aggregation processing using the SGM method.

Figure 7:
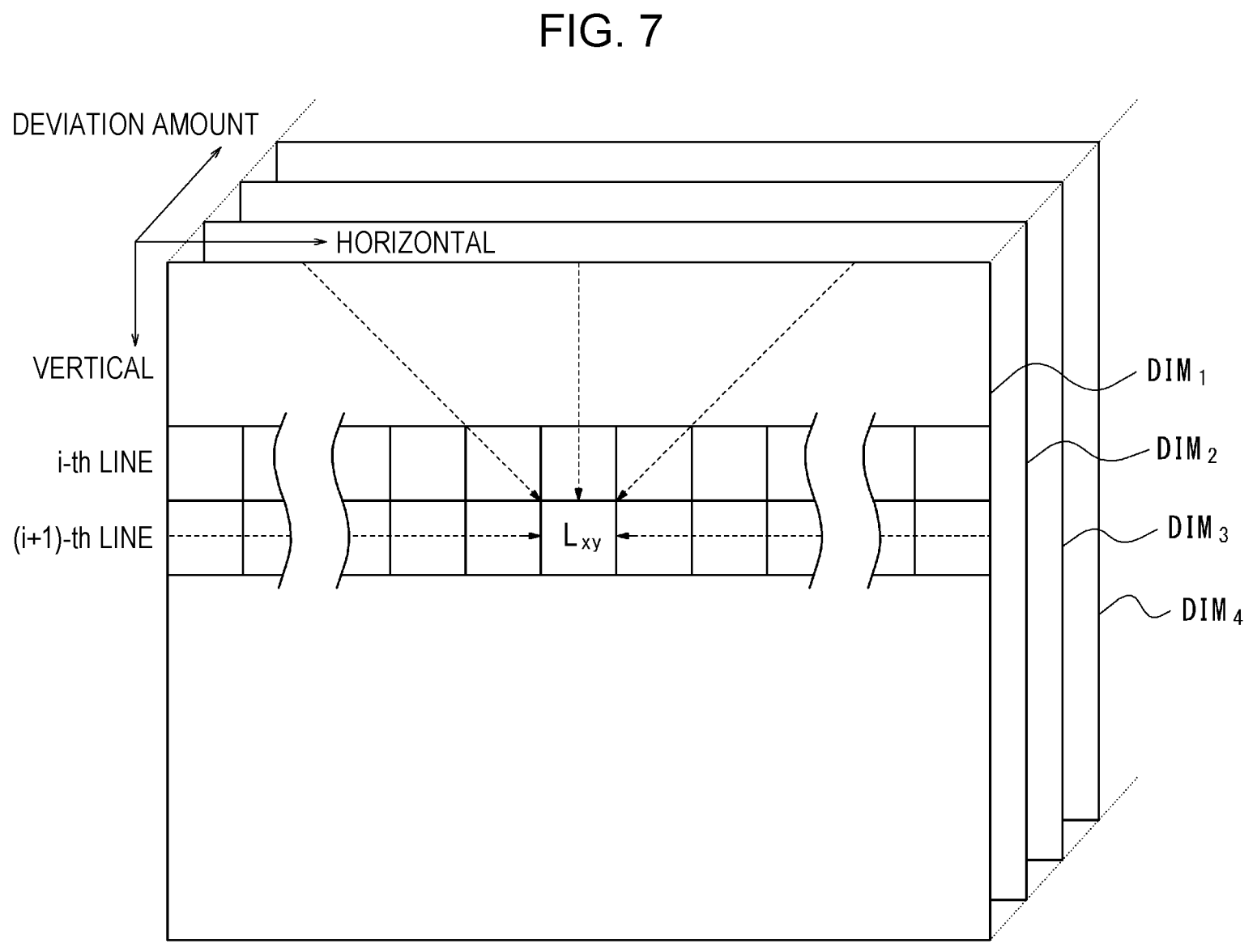

The difference aggregator 27 of the image processing device 20 of the present disclosure limits the directions of paths along which aggregation processing is performed. The difference aggregator 27 does not perform aggregation processing using paths from both the upper side and the lower side relative to the horizontal direction. The difference aggregator 27 performs the aggregation processing using only paths from either above or below the lines, which are arrayed horizontally and vertically. For example, as illustrated in FIG. 7, the image processing device 20 performs aggregation processing of cost values C (x, y, d) using paths selected from five paths consisting of two paths in the horizontal direction, a path in a direction perpendicular to the horizontal direction from above in the vertical direction, and two paths from above in diagonal directions relative to the horizontal direction.

In order to perform aggregation processing, the image processing device 20 may be equipped with a line buffer capable of storing two lines of cost values C (x, y, d), which are arrayed in a direction corresponding to the baseline length direction, of each difference image $DIM_k$. The line buffer may be included in the processor constituting the controller 22. The line buffer may be included in the memory 23 provided for image processing. The line buffer may store the cost values C (x, y, d) of $W \times d_{max}$ pixels.

The difference aggregator 27 can perform aggregation of cost values C (x, y, d) by storing the cost values C (x, y, d) of an i-th line and an (i+1)-th line, which are sequential lines, in the line buffer. The line buffer initially stores the cost values C (x, y, d) of the uppermost first line and the subsequent second line in order to start the aggregation processing of the cost values C (x, y, d). Aggregation of the cost values C (x, y, d) of a horizontal path can be performed within the same line. Aggregation of cost values C (x, y, d) for paths oriented in vertical and diagonal directions from top to bottom can be performed by modifying the cost values C (x, y, d) for the next (i+1)-th line using the modified cost values L (x, y, d) of the i-th line. Once the cost values C (x, y, d) of the (i+1)-th line have been modified to the cost values L (x, y, d), the disparity estimator 28, which is described later, determines the deviation amount for each pixel in the (i+1)-th line.

Once the cost values C (x, y, d) of (i+1)-th line have been modified to the cost values L (x, y, d), the information in the line buffer storing the cost values L (x, y, d) of the i-th line can be discarded and the line buffer can be used for the next (i+2)-th line in the aggregation processing. Thus, the difference aggregator 27 can sequentially modify the cost values C (x, y, d) in two line buffers, starting from the i-th line and working down to the lowermost line, which is a line H, and calculate the modified cost values L (x, y, d).

As described above, the image processing device 20 according to an embodiment of the present disclosure limits the paths where aggregation of cost values C (x, y, d) is performed using dynamic programming to paths not including paths from both sides of each line in the horizontal direction among the eight paths in the SGM method. As a result, aggregation of cost values C (x, y, d) can be performed using a line buffer that stores the cost values C (x, y, d) for two lines of the cost volume. Therefore, the image processing device 20 of the present disclosure can reduce the amount of memory required for the arithmetic processing for aggregating the cost values C while using dynamic programming.

Figure 8:
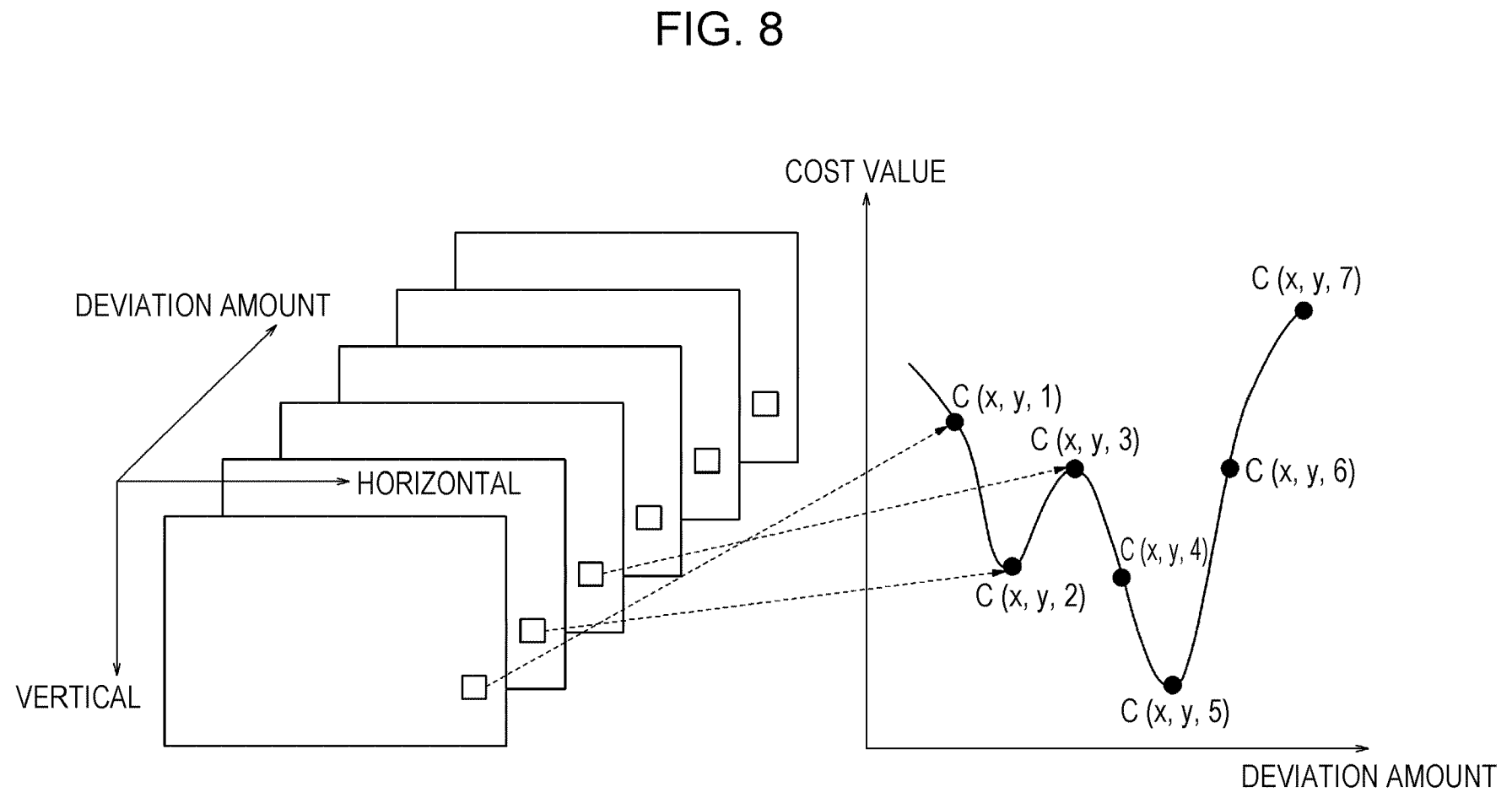

The disparity estimator 28 is configured to determine the deviation amount d that minimizes the cost values L (x, y, d) in the search range based on the cost values L (x, y, d) in each line obtained by the difference aggregator 27 aggregating the cost values C (x, y, d). When the difference aggregator 27 performs the aggregation processing of each line from the first line to the H-th line of a difference image $DIM_k$, the disparity estimator 28 is able to search for changes in the cost values C (x, y, d) with respect to the deviation amounts d, as illustrated in FIG. 8. This enables the disparity estimator 28 to determine the deviation amount d that minimizes the cost value L (x, y, d) at each pixel position (x, y) in the line. The determined deviation amount is taken to be an estimated value of disparity.

In this way, the image processing device 20 is able to calculate the disparity for each pixel position in the first image, which is used as the standard image. When the image processing device 20 is configured to be able to recognize subject images within an image, the image processing device 20 can calculate the disparity for a subject image located at each pixel position. This enables the image processing device 20 to calculate the distance to a subject in included the first image and the second image.

The image processing device 20 can transmit information regarding the distance to a subject to the ECU 40 inside the mobile object 50. The ECU 40 may control each part of the mobile object 50. For example, the ECU 40 may adjust the traveling speed of the mobile object 50 based on information regarding the distance to a subject received from the image processing device 20. The ECU 40 may control braking, steering, and so on based on information regarding the distance to a subject. The ECU 40 may present a warning, via images or sounds, to the user driving the mobile object 50 based on object detection information and information regarding the distance to the object.

(Disparity Calculation Processing Flow)

Figure 9:
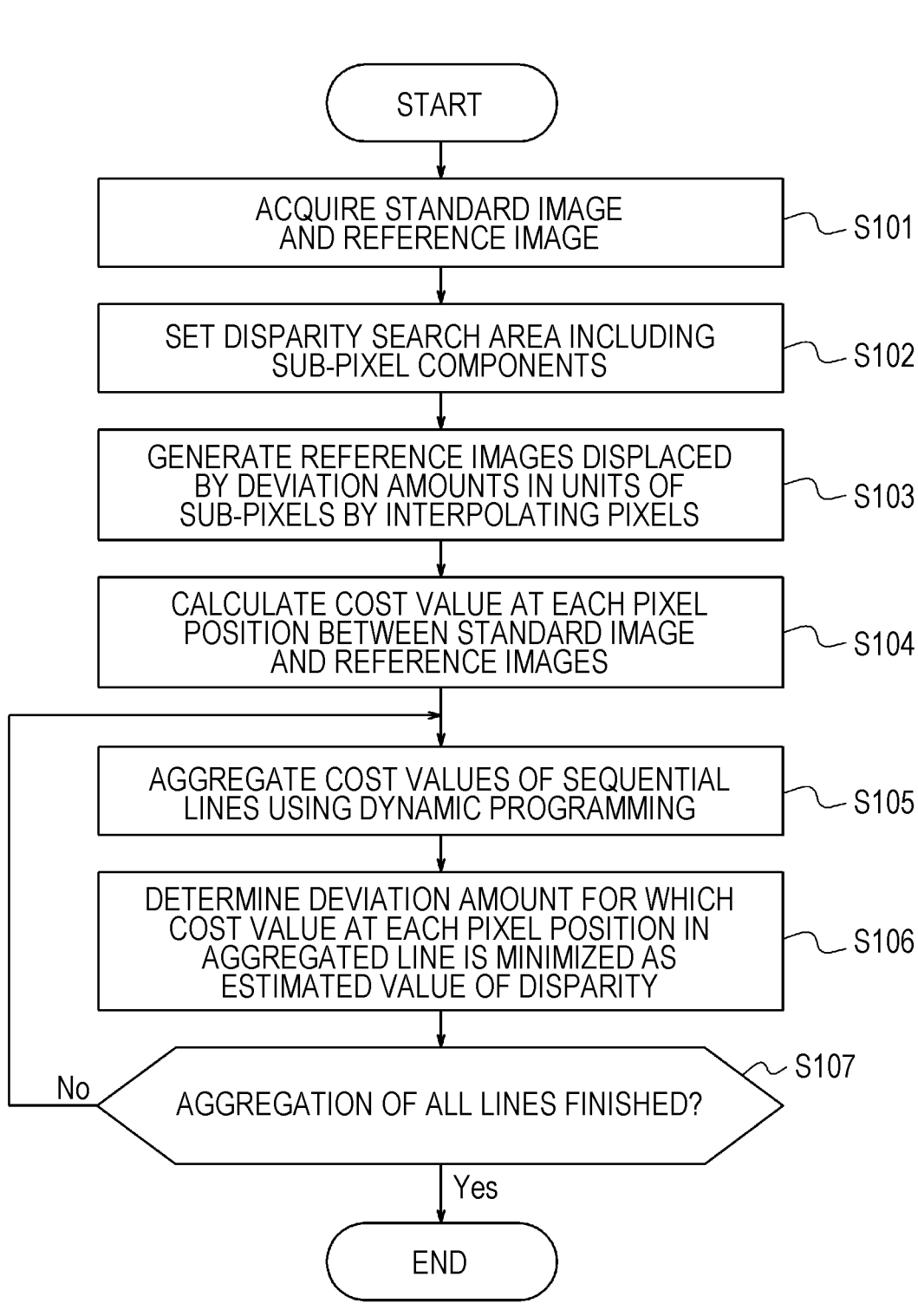
FIG. 9 is a flowchart of disparity calculation processing executed by the controller in FIG. 1.

Next, the processing flow of the disparity calculating method performed by the controller 22 of the image processing device 20 of the present disclosure will be described while referring to FIG. 9.

The image processing device 20 may be configured to implement the processing performed by the controller 22 described below by reading a program recorded on a non-transitory computer-readable medium. Non-transitory computer readable media include, but are not limited to, magnetic storage media, optical storage media, magneto-optical storage media, and semiconductor storage media. Magnetic storage media include magnetic disks, hard disks, and magnetic tapes. Optical storage media include optical discs such as compact discs (CDs), DVDs, and Blu-ray Discs (registered trademark). Semiconductor storage media include read only memories (ROMs), electrically erasable programmable read-only memories (EEPROMs), and flash memories.

First, the controller 22 acquires a first image, which is a standard image, and a second image, which is a reference image, captured by the stereo camera 10 via the communication unit 21 (Step S101).

The controller 22 sets the search range for disparity including sub-pixel components (Step S102). The controller 22 sets multiple different deviation amounts at uneven intervals as the deviation amounts by which the second image is displaced in the horizontal direction in order to perform disparity calculation. Step S102 is processing performed by the search range setting unit 24 of the controller 22.

The controller 22 generates multiple reference images by interpolating pixels. The reference images are obtained by displacing the second image by multiple deviation amounts d including deviation amounts in units of sub-pixels (Step S103). Step S103 is performed by the pixel interpolator 25 of the controller 22.

The controller 22 calculates the cost value C (x, y, d) at each pixel position between the standard image and the multiple reference images with different deviation amounts d generated by the interpolation processing (Step S104). Step S104 is processing performed by the difference calculator 26 of the controller 22.

The controller 22 aggregates the cost values C (x, y, d) calculated in Step S104 using dynamic programming (Step S105). The controller 22 sequentially stores the cost values C (x, y, d) for two lines of the cost volume in a line buffer. Starting with the first line, the controller 22 aggregates the cost values C (x, y, d) of sequential lines and calculates the aggregated cost values L (x, y, d). Step S105 is performed by the difference aggregator 27.

Once the aggregation of cost values C (x, y, d) for each row is complete, the controller 22 searches the aggregated cost values L (x, y, d) in the deviation amount d direction in order to find the deviation amount d for which the cost value L (x, y, d) is minimized at each pixel position (x, y) so as to determine the estimated value of disparity (Step S106). Step S106 is performed by the disparity estimator 28.

When the controller 22 has not yet finished aggregating all the lines of all the difference images DIM$_k$ in the cost volume (Step S107: No), the controller 22 returns to Step S105 and aggregates the cost values C (x, y, d) of the next row. When the aggregation of all the difference images DIM$_k$ included in the cost volume has been completed (Step S107: Yes), the controller 22 ends the processing.

As described above, the disparity estimating method used by the image processing device 20 of the First Embodiment enables estimated values of disparity to be calculated for each pixel position (x, y). With this method, since the deviation amount d used to search for disparity is set to discrete values at uneven intervals based on the measurement distance, the number of deviation amounts d used when performing calculations can be significantly reduced compared to a case where a deviation amount d is set for each pixel in the direction corresponding to the baseline length direction. Consequently, the amount of computation involved in calculating disparity can be significantly reduced. In particular, the deviation amounts d are more sparsely distributed for larger deviation amounts than for smaller deviation amounts, and therefore the accuracy of distance measurement for long distances can be ensured while reducing the amount of calculation.

The image processing device 20 of the First Embodiment is configured to include deviation amounts d for performing disparity searching that are non-integer multiples of the size of the pixels in a direction corresponding to the baseline length direction. In particular, as a deviation amount d for long distances, a deviation amount d of less than the width of the pixels in the direction corresponding to the baseline length direction can be set. This makes it possible to take highly accurate distance measurements at long distances. Since the deviation amounts d used in disparity searching are set based on measurement errors, the image processing device 20 of the present disclosure can make measurements that satisfy permitted error conditions.

Furthermore, in the image processing device 20 of the First Embodiment, the directions of the multiple paths along which aggregation processing of the cost values C (x, y, d) is performed by dynamic programming are limited so as not to include paths from both sides with respect to the baseline length direction. This makes it possible to perform aggregation of cost values C (x, y, d) using only line buffers that can store cost values C (x, y, d) of two lines arrayed in a direction corresponding to the baseline length direction. As a result, the amount of memory required to perform calculation of the aggregation of the cost values C can be significantly reduced.

(Overall Configuration of Stereo Camera System)

Figure 10:
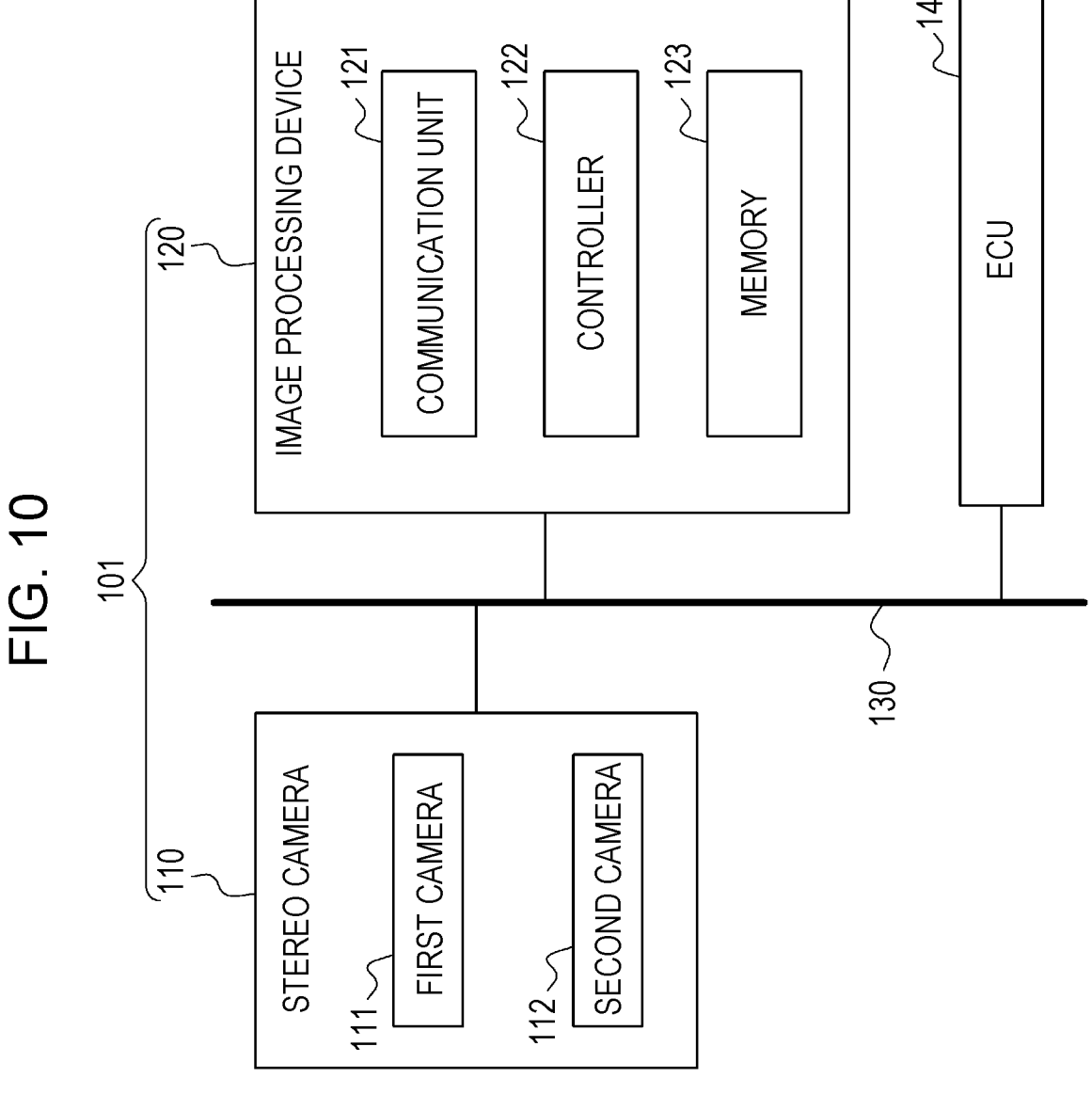
FIG. 10 is a block diagram illustrating the schematic configuration of a stereo camera system according to a Second Embodiment.

As illustrated in FIG. 10, a stereo camera system 101 of a Second Embodiment includes a stereo camera 110 and an image processing device 120. The stereo camera 110 and the image processing device 120 can communicate with each other via a wired or wireless network 130. The network 130 may include a network for vehicles such as controller area network (CAN) when the stereo camera system 101 is installed in a vehicle. The stereo camera 110 and the image processing device 120 may be integrated with each other and housed in the same housing. A device in which the stereo camera 110 and the image processing device 120 are housed in the same housing may be referred to as a stereo camera device. The stereo camera 110 and the image processing device 120 may be installed in a mobile object 150 (refer to FIGS. 11 and 12) and be capable of communicating with an electronic control unit (ECU) 140 inside the mobile object 150. The ECU 140 inside the mobile object 150 includes a processor, a memory, and so on and realizes the functions of each part of the mobile object 50150. The ECU 140 may include an ECU for object recognition, an ECU for collision avoidance control, and an ECU for auto cruise control.

(Configuration of Stereo Camera)

The term "stereo camera" refers to multiple cameras that have a disparity therebetween and cooperate with each other. A stereo camera includes at least two or more cameras. A stereo camera can capture images of an object from multiple directions by making multiple cameras work together. Stereo cameras include those that can capture images of an object simultaneously by multiple cameras working together. "Simultaneously" capture images is not limited to meaning at exactly the same time. For example, (1) multiple cameras capturing images at the same time, (2) multiple cameras capturing images based on the same signal, and (3) multiple cameras capturing images at the same time according to their respective internal clocks are included in the meaning of "simultaneously" capturing images in the present disclosure. Examples of a time standard for image capture include a start time of image capture, an end time of image capture, a transmission time of a captured image signal, and the time when an image signal is received by another device. The stereo camera does not have to consist of multiple cameras that are independent of each other. For example, a camera including an optical mechanism that directs light incident at two separate locations to a single light-receiving element can be employed as the stereo camera. In the present disclosure, multiple images of the same subject captured from different viewpoints may be referred to as "stereo images".

The stereo camera 110 includes a first camera 111 and a second camera 112. The first camera 111 and the second camera 112 each include an optical system that defines the optical axis and an imaging element. The first camera 111 and the second camera 112 have different optical axes from each other. The optical systems of the first camera 111 and the second camera 112 each include an imaging lens. The distance between the center of the imaging lens of the first camera 111 and the center of the imaging lens of the second camera 112 is called a "baseline length". The direction along which the center of the imaging lens of the first camera 111 and the center of the imaging lens of the second camera 112 are connected to each other is called a "baseline length direction".

Examples of imaging elements include charge-coupled device (CCD) image sensors and complementary MOS (CMOS) image sensors. The first camera 111 and the second camera 112 generate image signals representing the images captured by their respective imaging elements. The first camera 111 and the second camera 112 may perform any suitable processing on the captured images, such as distortion correction, brightness adjustment, contrast adjustment, gamma correction, and so on.

The first camera 111 and the second camera 112 capture the subject at a prescribed frame rate (for example, 30 fps).

The optical axes of the first camera 111 and the second camera 112 are oriented in directions that allow the cameras to capture images of the same subject as each other. The optical axes and positions of the first camera 111 and second camera 112 are determined so that the captured images each contain at least part of the same subject. The optical axes of the first camera 111 and the second camera 112 are oriented so as to be parallel to each other. "Parallel" is not limited to meaning perfectly parallel and misalignments occurring during assembly, misalignments occurring during installation, and misalignments occurring over time are permitted. The optical axes of the first camera 111 and the second camera 112 are not limited to being parallel to each other, and may instead extend in different directions from each other. The image processing device 120, which will be described below, may perform processing on the image signals from the first camera 111 and the second camera 112 in order to compensate for misalignment of the optical axes.

Due to the different positions of the first camera 111 and the second camera 112, the corresponding positions of a subject in the two images captured by the cameras are different from each other. A first image output from the first camera 111 and a second image output from the second camera 112 are stereo images captured from different viewpoints. The magnitude of the shift between the positions of pixels corresponding to the same subject in the first and second images, expressed in units of pixels, is called the disparity or deviation amount.

Figure 11:
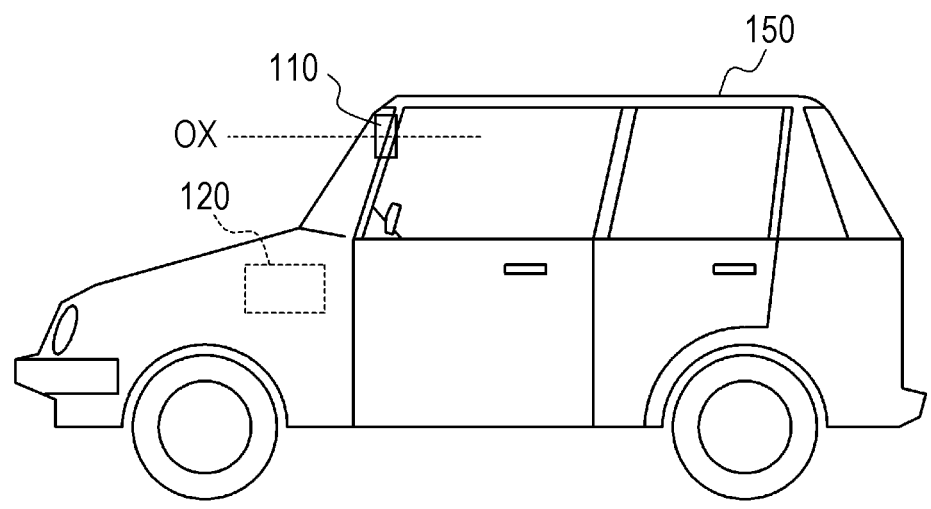
FIG. 11 is a side view schematically illustrating a mobile object equipped with the stereo camera system in FIG. 10.
Figure 12:
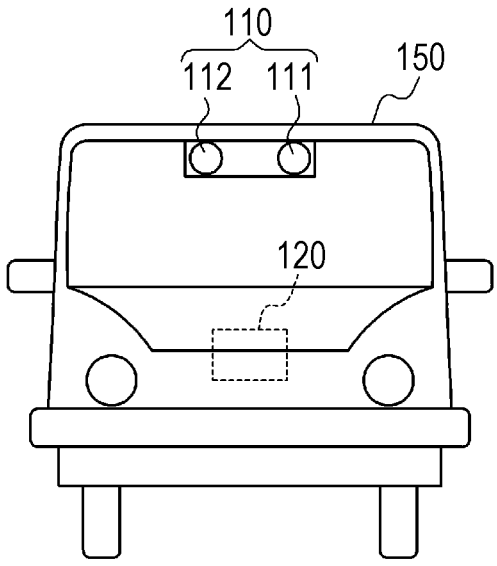
FIG. 12 is a front view schematically illustrating a mobile object equipped with the stereo camera system in FIG. 10.

As illustrated in FIGS. 11 and 12, the stereo camera system 101 in FIG. 10 can be installed in the mobile object 150, which is, for example, a vehicle. As illustrated in the side view in FIG. 11, the stereo camera 110 may be disposed so that the optical axes OX of the optical systems of the first camera 111 and the second camera 112 are substantially parallel to a forward direction relative to the mobile object 150 in order to capture images of the region ahead of the mobile object 150. In this embodiment, "forward direction" means the direction of travel of the mobile object 150 when moving forward, and "right" and "left" mean right and left when facing the front of the mobile object 150. A height direction is an upward direction perpendicular to the road surface.

In the present disclosure, examples of "a mobile object" may include vehicles, aircraft, ships, and drones. Examples of vehicles may include automobiles, industrial vehicles, rail vehicles, motorhomes, and so on. Examples of aircraft may include fixed-wing aircraft and rotary-wing aircraft.

In one embodiment out of multiple embodiments, the first camera 111 and second camera 112 are positioned so as to be separated from each other in a left-right direction of the mobile object 150. The first camera 111 is positioned to the right of the second camera 112 when facing the front. The second camera 112 is positioned to the left of the first camera 111 when facing the front. The baseline length direction of the stereo camera 110 can be taken to be a horizontal direction. The arrangement of the first camera 111 and the second camera 112 is not limited to this arrangement. The first camera 111 may be positioned to the left of the second camera 112. The second camera 112 may be positioned to the right of the first camera 111. The first camera 111 and the second camera 112 can also be disposed side by side in the vertical direction.

In one embodiment among multiple embodiments, the first camera 111 and second camera 112 can be disposed inside the cabin of the mobile object 150, which is a vehicle, and can image the region outside the mobile object 150 through the windshield of the mobile object 150. In another embodiment among multiple embodiments, the first camera 111 and the second camera 112 may be fixed to any one of the front bumper, a fender grill, a side fender, a light module, and a hood of the vehicle. In yet another embodiments, the direction in which the first camera 111 and second camera 112 of the stereo camera 110 capture images is not limited to a forward direction, and may instead be another direction such as a backward direction.

(Configuration of Image Processing Device)

The image processing device 120 includes a communication unit 121, a controller 122, and a memory 123. The communication unit 121 is an acquiring unit. The image processing device 120 can be disposed at any suitable position inside the mobile object 150. For example, the image processing device 120 can be disposed inside the dashboard of the mobile object 150, which is a vehicle.

The communication unit 121 is an input interface for the image processing device 120, which acquires image signals from the stereo camera 110. The communication unit 121 acquires image signals from the stereo camera 110 using a wired or wireless communication method. The communication unit 121 can acquire image signals of images captured by the first camera 111 and the second camera 112 via the network 130. The communication unit 121 passes the acquiring image signals to the controller 122. The communication unit 121 may support the transmission method of the image signals of stereo camera 110. The communication unit 121 may function as an output interface of the image processing device 120. The communication unit 121 may transmit the results of distance measurement performed by the image processing device 120 to a device such as the ECU 140.

The controller 122 includes one or multiple processors. Such processors include general-purpose processors into which specific programs are loaded to perform specific functions, and dedicated processors dedicated to specific processing. Dedicated processors include application specific integrated circuits (ASICs). Dedicated processors include programmable logic devices (PLDs). PLDs may include field-programmable gate arrays (FPGAs). The controller 122 may be either a system-on-a-chip (SoC) or a system in a package (SiP), in which one or more processors work together. The processing performed by the controller 122 may also be referred to as the processing performed by the processor.

The controller 122 calculates the disparities of pixels corresponding to the same subject included in the first image and the second image based on the first image captured by the first camera 111 and the second image captured by second camera 112. The disparity of a subject corresponds to the distance to the subject. Hereinafter, the first image captured by the first camera 111 is regarded as a standard image and the second image captured by the second camera 112 is regarded as a reference image. The controller 122 searches for disparity by displacing a pixel or a block consisting of multiple pixels included in the standard image in a direction corresponding to the baseline length direction and searching for the deviation amount d of the pixel or block having the smallest degree of difference. In the first image and the second image, a direction corresponding to the baseline length is hereinafter referred to as a horizontal direction, and a direction perpendicular to the horizontal direction is hereinafter referred to as a vertical direction. In the first image and the second image, the horizontal direction and the vertical direction are the directions in which the pixels are arrayed. The positions of the pixels in the horizontal and vertical directions are respectively represented by a u coordinate and a v coordinate. Pixel positions in the first image and the second image can be represented using coordinates (u, v). In this embodiment, the horizontal direction is a first direction.

The memory 123 stores various information such as programs for various types of processing and information generated during disparity calculation operations. The memory 123 may be configured using one or more of any out of a semiconductor memory, a magnetic memory, and an optical memory, for example. Examples of the memory 123 include volatile memories and nonvolatile memories.
(Functional Blocks of Controller)

Figure 13:
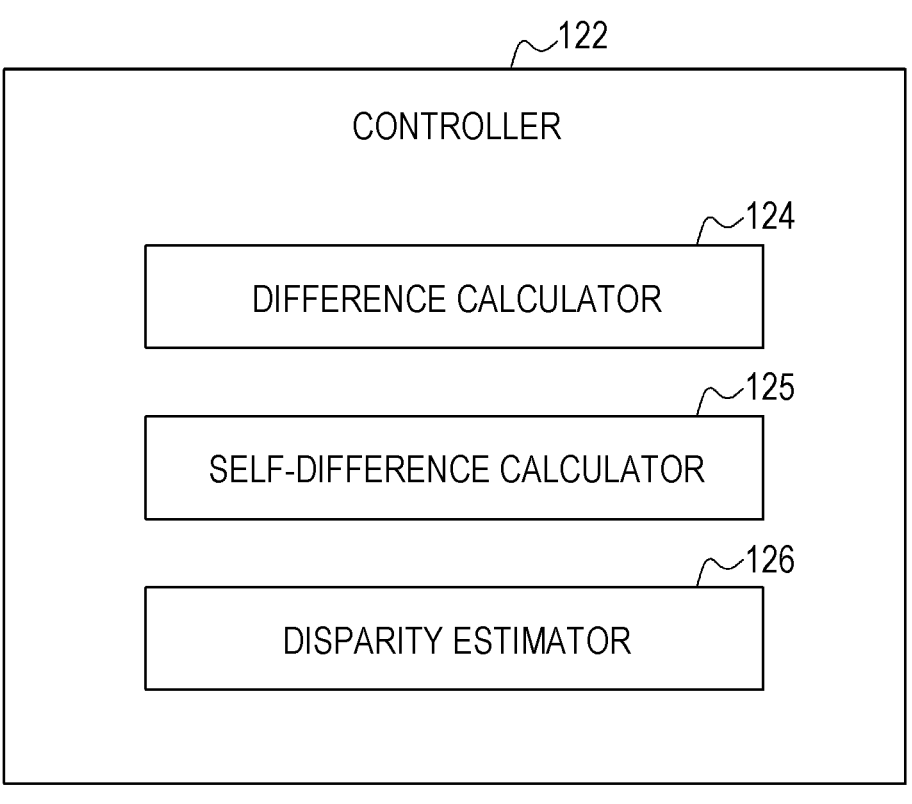
FIG. 13 is a functional block diagram illustrating the configuration of a controller in FIG. 10.

As illustrated in FIG. 13, the controller 122 includes functional blocks made up of a difference calculator 124, a self-difference calculator 125, and a disparity estimator 126 in order to calculate the disparity of each pixel in the first image. Each functional block of the controller 122 may be a hardware module or a software module. The processing performed by each functional block may also be referred to as processing performed by the controller 122.

The difference calculator 124 calculates a first cost value $C_1$ (u, v, d) representing the degree of difference between the first image and each of multiple images obtained by displacing the second image by multiple different deviation amounts d, on a pixel-by-pixel basis, in the horizontal direction. The difference calculator 124 calculates a first cost value $C_1$ (u, v, d) for each pixel position (u, v) in the first image. The difference calculator 124 may calculate the first cost values $C_1$ (u, v, d) for all pixel positions in the first image. The difference calculator 124 may calculate the first cost values $C_1$ (u, v, d) for only the pixel positions of some pixels of interest in the first image. Multiple different deviation amounts d can be set at every other pixel from zero pixels to the number of pixels that provides the maximum disparity.

For example, the difference in luminance value at each pixel can be used as the first cost value $C_1$ (u, v, d). Alternatively, a value of SAD, sum of squared difference (SSD), zero-mean sum of square difference (ZSSD), or the like for a block of 3×3 pixels in the vertical and horizontal directions centered on the pixel for which disparity is being calculated may be used as a first cost value $C_1$ (u, v, d). A 3×3 pixel block is merely an example and blocks having other numbers of pixels in the vertical and horizontal directions may instead be used. The difference calculator 124 may generate a three-dimensional tensor, which is called a cost volume, from the results of these calculations.

Figure 14:
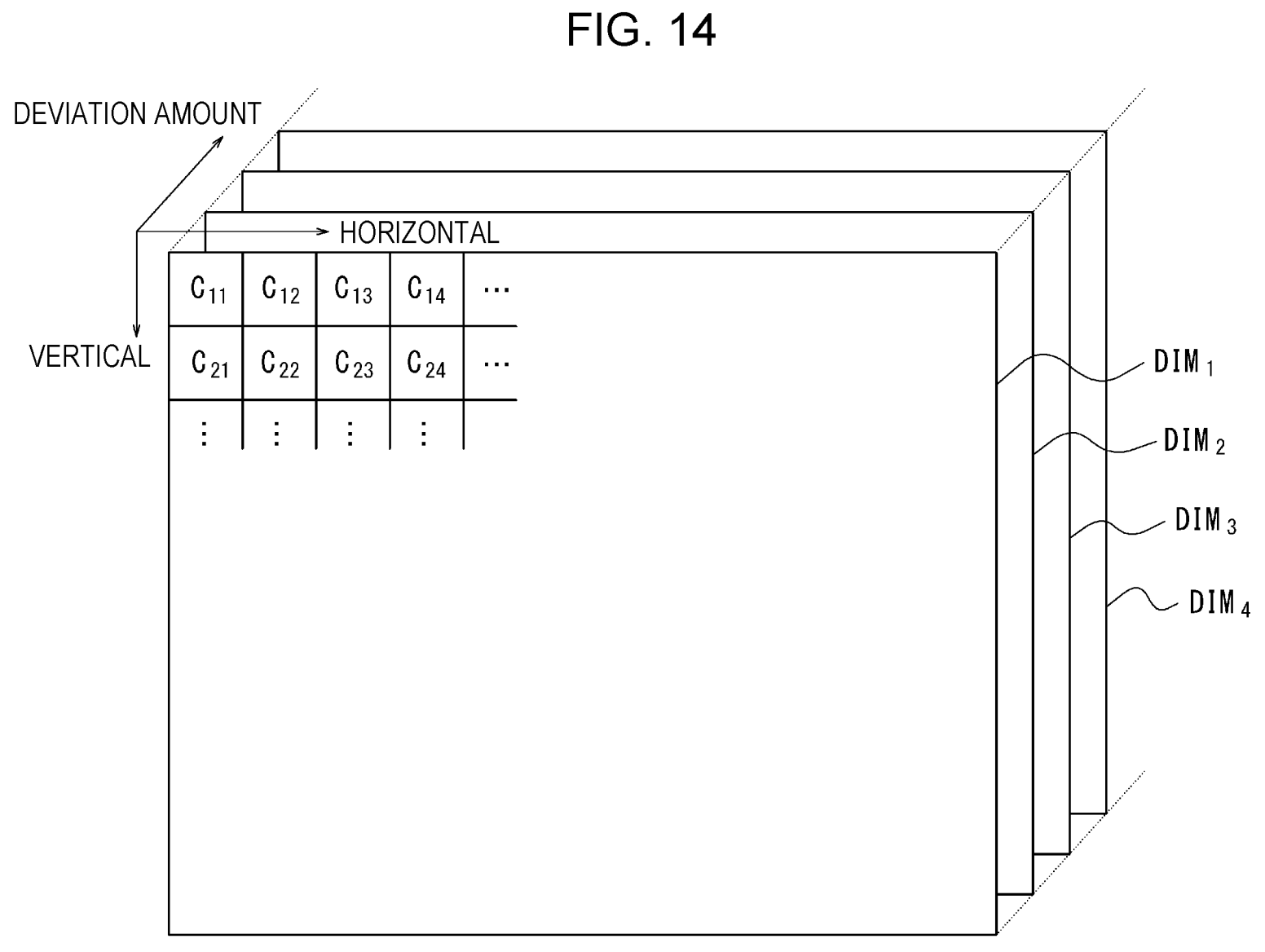

As illustrated in FIG. 14, the cost volume contains multiple difference images $DIM_k$ having cost values $C_1$ (u, v, d) corresponding to the positions of the individual pixels. (In FIG. 14, the first cost values $C_1$ (u, v, d) contained in each difference image $DIM_k$ are denoted as $C_{uv}$) In this embodiment, each difference image $DIM_k$ contains a number of first cost values $C_1$ (u, v, d) corresponding to the number of pixels in the first image and the second image. For example, if the number of pixels in the horizontal direction is W and the number of pixels in the vertical direction is H, each difference image $DIM_k$ has W×H first cost values $C_1$ (u, v, d). The cost volume can include $d_{max}+1$ difference images $DIM_k$, which are each displaced in increments of one pixel from zero pixels up to the disparity deviation amount $d_{max}$ corresponding to the maximum disparity.

Generation of a tensor of the first cost values $C_1$ (u, v, d) for the whole image as described above in order to calculate the disparity at each pixel position is not essential. The controller 122 can calculate disparity by sequentially calculating the first cost value $C_1$ (u, v, d), for the deviation amount d, between the first image and the second image for each pixel position of a pixel of interest and performing the processing described below.

Figure 15:
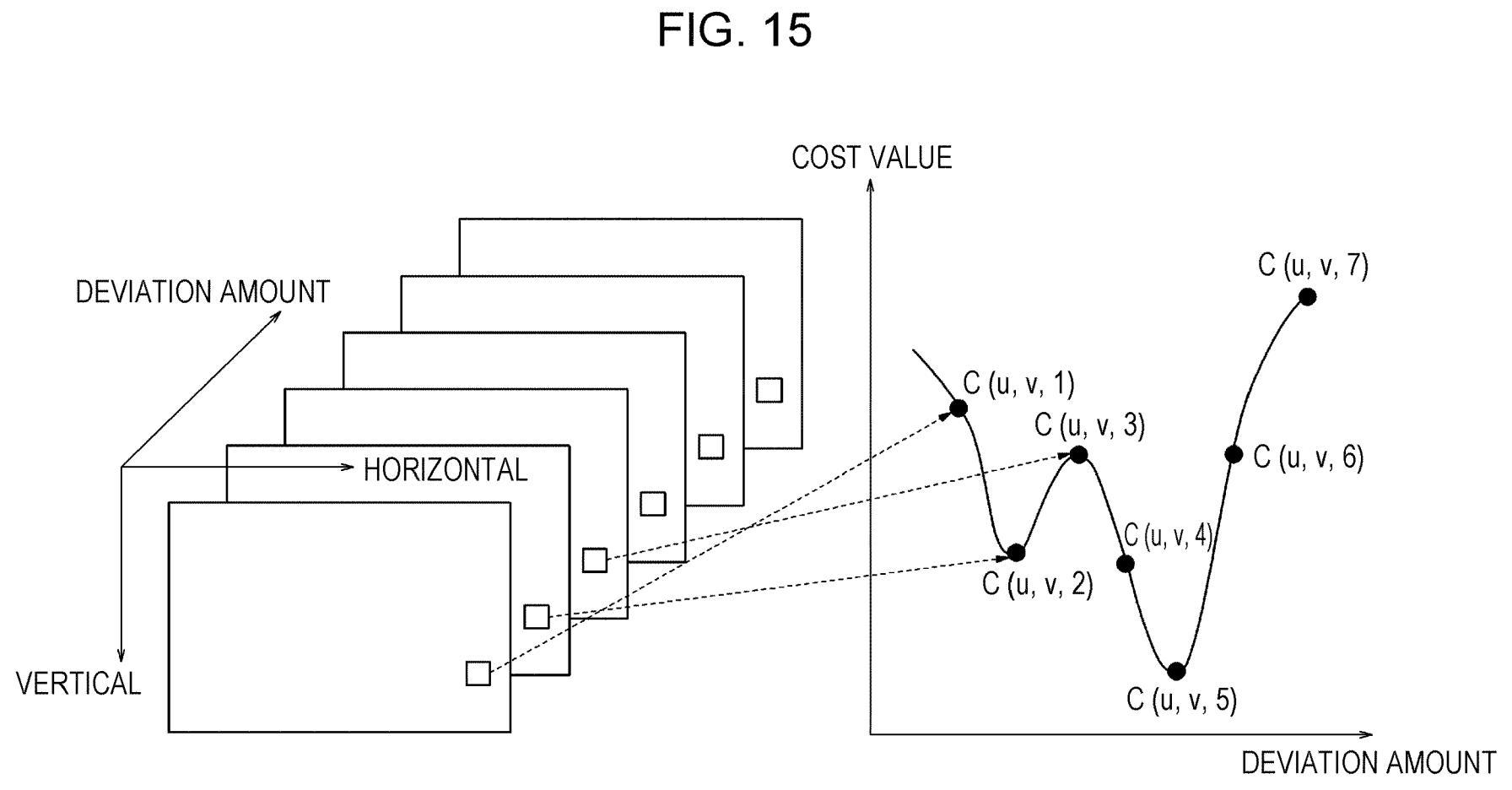

When the subject for which distance is to be measured is located at a short to medium distance, the deviation amount d that gives the smallest first cost value $C_1$ (u, v, d) in the direction of the deviation amount is taken as the estimated value of disparity at those coordinates (u, v), as illustrated in FIG. 15. However, in stereo images, the distance to a subject in front and disparity have an inversely proportional relationship with each other. Therefore, the range of distances corresponding to a shift of one pixel is wider for long distances. As a result, the resolution of distance measurement of the subject is reduced at long distances. Therefore, the self-difference calculator 125 and the disparity estimator 126 of the controller 122 estimate the deviation amount d that minimizes the first cost value $C_1$ (u, v, d) for the coordinates (u, v) of each pixel position down to units of less than one pixel, by using the method described below.

Figure 16:
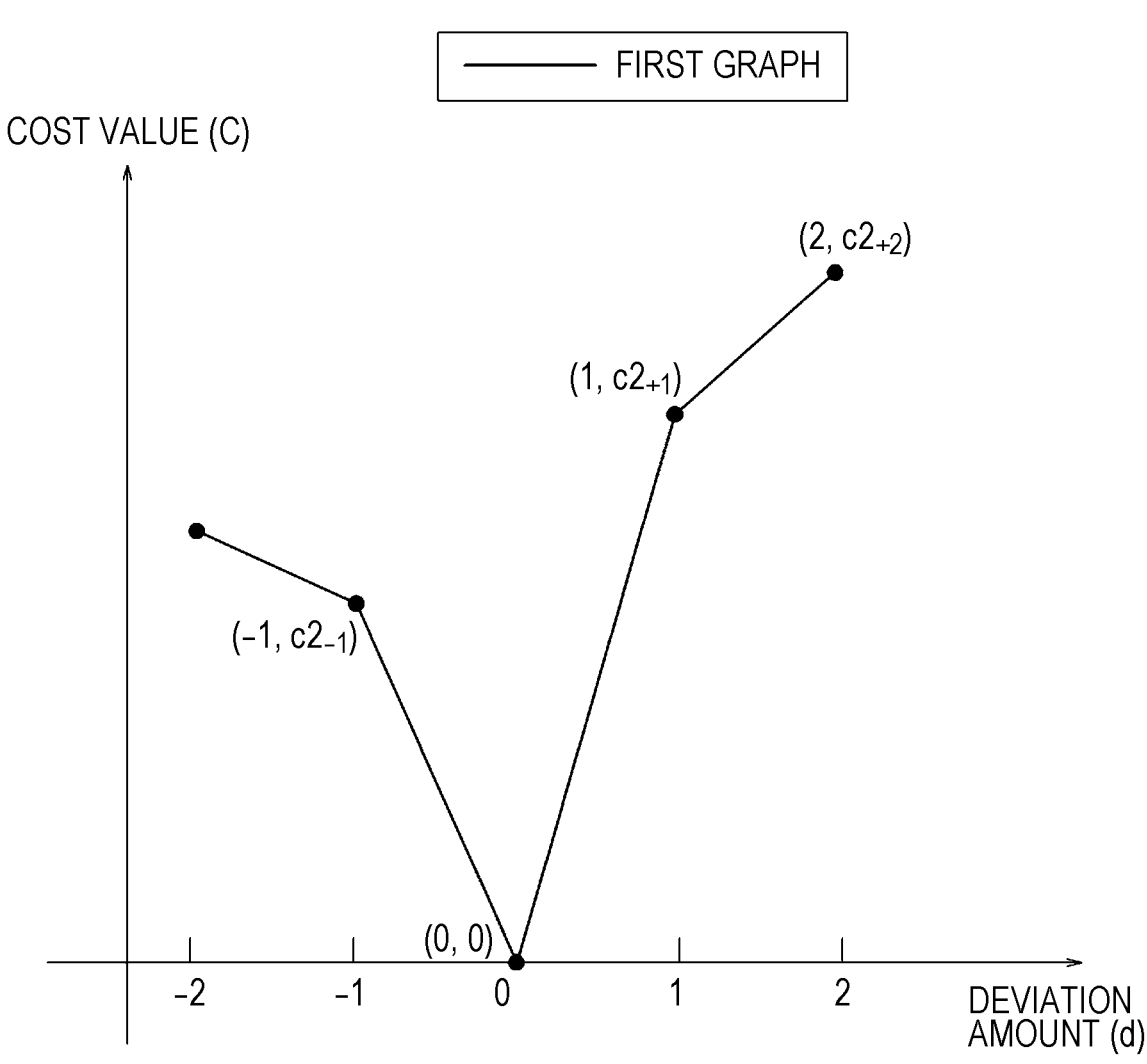
FIG. 16 is a diagram illustrating an example of a self-difference distribution calculated based on the degrees of difference between a standard image and images obtained by displacing the standard image in units of pixels.

As illustrated in FIG. 16, the self-difference calculator 125 calculates the distribution of second cost values $C_2$ (u, v, d) representing the degrees of difference between the first image and each of multiple images obtained by displacing the first image by multiple different deviation amounts d in the horizontal direction. The horizontal axis of the graph in FIG. 16 represents the deviation amount d. The vertical axis of the graph in FIG. 16 represents the second cost value $C_2$ (u, v, d) at the coordinates (u, v) of the pixel position of a pixel of interest. The self-difference calculator $125$ calculates the second cost value $C_2$ (u, v, d) for each pixel position (u, v) of interest. The self-difference calculator $125$ calculates the second cost values $C_2$ (u, v, d) using the same calculation method as used for the first cost values $C_1$ (u, v, d). In other words, the self-difference calculator $125$ can calculate a second cost value $C_2$ (u, v, d) from the difference between the luminance values of the pixel of interest in the first image and the pixel of interest in an image obtained by displacing the first image in the horizontal direction. The same calculation method as that used to calculate the first cost values $C_1$ (u, v, d), such as SAD, SSD, or ZSSD, is used to calculate the second cost values $C_2$ v, d).

The multiple different deviation amounts d by which the first image is displaced are, for example, integers in the vicinity of 0, including 0, with the width of a pixel in the horizontal direction serving as a unit. In the example in FIG. $16$, a first graph illustrates the second cost values $C_2$ (u, v, d), for the coordinates (u, v) of the pixel positions of interest, calculated by displacing the deviation amount d by one pixel from $-2$ pixels to $+2$ pixels. In FIG. $16$, the deviation amount d in units of pixels and the second cost value $C_2$ (u, v, d) are represented on the horizontal and vertical axes, respectively. When the deviation amount d is 0, there is no difference between the first images and therefore the second cost value $C_2$ (u, v, 0) is 0. In FIG. $16$, the second cost values $C_2$ (u, v, d) when the deviation amounts d are $-2$, $-1$, 1, and 2 are represented as $c2_{-2}$, $c2_{-1}$, $c2_{+1}$, and $c2_{+2}$, respectively.

In a function representing the second cost value $C_2$ (u, v, d) with respect to the deviation amount d, the parts of the deviation amounts d that are less than one pixel can be interpolated using a prescribed function. Examples of such a prescribed function may include linear functions and polynomial functions. Polynomial functions include parabolic functions. The first graph in FIG. $16$ is interpolated using a linear function. The linear function interpolates a second cost value $C_2$ (u, v, d) when the deviation amount d has a non-integer value by connecting points where the deviation amounts d are integer multiples of one pixel using successive straight lines. The image processing device $120$ can reflect asymmetry of the self-difference distribution in the estimation of disparity by using a function that realizes interpolation using a linear function. The prescribed function may include an asymmetric function without an axis of symmetry in the horizontal direction, such as an asymmetric parabolic function, instead of a linear function.

As illustrated in FIG. $16$, the distribution of the second cost values $C_2$ (u, v, d), which are obtained by displacing the first image, which is the standard image, in the horizontal direction and evaluating the degrees of difference between the first images at the pixel positions of the pixels of interest, is called a self-difference distribution. As illustrated in FIG. $16$, the self-difference distribution is not necessarily axially symmetrical about a deviation amount d=0.

The disparity estimator $126$ uses the second cost values $C_2$ (u, v, d) to estimate the deviation amounts d that minimize the first cost values $C_1$ (u, v, d) down to units of less than one pixel. The self-difference distribution function illustrated as the first graph, which is calculated and interpolated by the self-difference calculator $125$, can be used as the second cost values $C_2$ (u, v, d). Hereafter, an example of a method for estimating the deviation amount d that minimizes the first cost values $C_1$ (u, v, d) down to units of less than one pixel using the second cost values $C_2$ (u, v, d) is described.

The first camera $111$ and the second camera $112$ capture images, from substantially the same direction, of a subject located in a distant region where the disparity is in a range from zero pixels to several pixels. Therefore, the first image and the second image are substantially identical except for a small disparity in the vicinity of a pixel of interest of a subject located at a long distance. Therefore, when the subject is located at a long distance, the distribution in the direction of the deviation amount d of the degree of difference between the first image and the second image at a pixel of interest centered on the deviation amount d that gives the true value of disparity including units of less than one pixel can be assumed to match the self-difference distribution of the pixel of interest. In other words, if the deviation amount d can be set in units of less than one pixel, the distribution of the first cost values $C_1$ (u, v, d) centered on the true value of disparity can be assumed to match the distribution of the second cost values $C_2$ (u, v, d) centered on the deviation amount d=0.

In FIG. $17$, the second graph, illustrated as a dashed line, is obtained by displacing the first graph illustrating the distribution of the second cost values $C_2$ (u, v, d) by a comparatively small deviation amount $d_{sub}$ of less than one pixel in the positive direction along the horizontal axis. The third graph is obtained by connecting points $P_{-1}$, $P_0$, $P_1$, and $P_2$, at which the deviation amounts d have integer values of $-1$, 0, 1, and 2, respectively, in the second graph, with straight lines. By carrying out a simple operation, the coordinates of $P_{-1}$, $P_0$, $P_1$, and $P_2$ become $P_{-1}$ $(-1, c2_{-2}+(1-d_{sub})$ $c2_{-1})$, $P_0(0, c2_{-1}-d_{sub})$, $P_1(1, (1-d_{sub})$ $c2_{+1})$, and $P_2(2, d_{sub}c2_{+1}+(1-d_{sub})$ $C2_{+2})$, respectively. In the example in FIG. $17$, the cost value $c2_{-1}\cdot d_{sub}$ of point $P_0$ is the smallest among the multiple points $P_{-1}$ to $P_2$.

Let a first deviation amount $d_{min}$ be a deviation d having an integer value that gives the smallest value of the first cost value $C_1$ (u, v, d) calculated by the difference calculator $124$, and assume a case where there is a difference of deviation amount $d_{sub}$ of less than one pixel between the first deviation amount $d_{min}$ and the true disparity. In FIG. $17$, the cost value C at the point $P_0$ corresponding to deviation amount d=0 corresponds to the first cost value $C_1$ (u, v, d) at the first deviation amount d=$d_{min}$. Similarly, the cost values C at the points $P_{-1}$, $P_1$, and $P_2$ in FIG. $17$ correspond to the first cost values $C_1$ (u, v, d) at deviation amounts d=$d_{min-1}$, $d_{min}+1$, and $d_{min}+2$. Thus, the third graph, which is obtained from the distribution of the second cost values $C_2$ (u, v, d) and in which a deviation amount $d_{sub}$ of less than or equal to one pixel is assumed, can be mapped to the first cost values $C_1$ (u, v, d) when there is a deviation amount $d_{sub}$ of less than one pixel.

FIG. $18$ illustrates a case where the deviation amount $d_{sub}$ is larger in a range of less than one pixel compared to the graph in FIG. $17$. In this case as well, the second graph and the third graph can be generated based on a graph illustrating the distribution of the second cost values $C_2$ (u, v, d). In the example in FIG. $18$, the cost value of the point $P_1$ corresponding to a deviation amount d=1 is smaller than the cost value of the point $P_0$ corresponding to a deviation amount d=0. In other words, $c2_{-1}\cdot d_{sub}>(1-d_{sub})$ $c2_{+1}$. Therefore, in this case, if $d_{min}$ is the deviation amount d having an integer value that gives the minimum value of the first cost value $C_1$ (u, v, d) calculated by the difference calculator $124$, then the cost value C of point $P_1$ corresponds to the first cost value $C_1$ (u, v, d) at a deviation amount d=$d_{min}$. Similarly, the cost values C of points $P_{-1}$, $P_0$, and $P_2$ in FIG. $18$ correspond to the first cost values $C_1$ (u, v, d) at deviation amounts d=$d_{min}-2$, $d_{min-1}$, and $d_{min+1}$.

The disparity estimator $126$ can estimate disparity down to units of less than one pixel by using the relationship between a first cost value $C_1$ (u, v, d) and a second cost value $C_2$ (u, v, d), as described above. The disparity estimator 126 performs disparity estimation by selecting first cost values $C_1$ (u, v, d) corresponding to the first deviation amount $d_{min}$ and one or more deviation amounts in the vicinity of the first deviation amount $d_{min}$. A number of methods for estimating disparity will be described next.

<Disparity Calculating Method (1)>

The disparity estimator 126 estimates a deviation amount d using multiple first cost values $C_1$ (u, v, d) corresponding to multiple deviation amounts d that are integer multiples of the size of the pixels in the horizontal direction. The disparity estimator 126 estimates a deviation amount $d_{sub}$ of less than one pixel corresponding to a disparity of less than one pixel by solving simultaneous equations consisting of multiple equations in which multiple first cost values $C_1$ (u, v, d) are each represented by an equation containing a deviation amount $d_{sub}$ of less than one pixel.

In the following, a first cost value corresponding to a first deviation amount $d_{min}$ for each pixel position (u, v) is denoted as $c1_{min}$. A first cost value calculated for a deviation amount $d_{min-1}$, which is one pixel smaller than the first deviation amount $d_{min}$, is denoted as $c1_{min-1}$. A first cost value calculated for a deviation amount $d_{min}+1$, which is one pixel larger than the first deviation amount $d_{min}$, is denoted as $c1_{min+1}$. In other words, the first cost values $C_1$ (u, v, d) are denoted as $C_1$ (u, v, $d_{min}$)=$c1_{min}$, $C_1$ (u, v, $d_{min-1}$)= $c1_{min-1}$, and $C_1$ (u, v, $d_{min+1}$)=$c1_{min+1}$.

Figure 17:
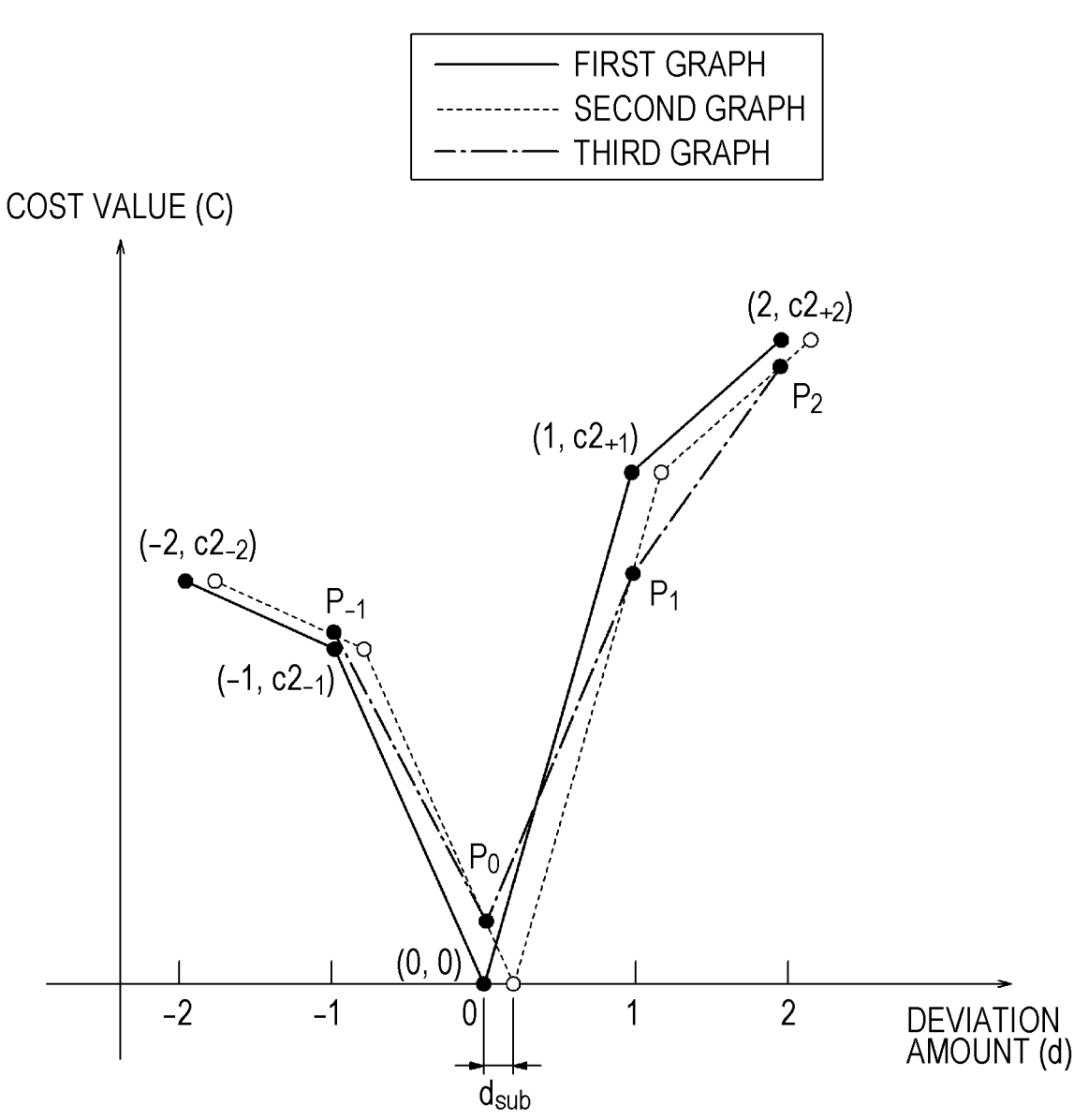
FIG. 17 is a diagram illustrating an example in which the distribution of first cost values, when there is a deviation amount $d_{sub}$ of less than one pixel, is estimated based on a self-difference distribution.

As illustrated in FIG. 17, when c1 min, which is the minimum first cost value $C_1$ (u, v, d), corresponds to the cost value C=c2−1·$d_{sub}$ at point $P_0$, the following Equations (1) and (2) can be assumed to hold true.

$$c1_{min} = c2_{-1} \cdot d_{sub} + \varepsilon_1 \qquad (1)$$

$$c1_{min+1} = (1 - d_{sub})c2_{+1} + \varepsilon_1 \qquad (2)$$

where $\varepsilon_1$ is a uniform correction term in Equation (1) and Equation (2) representing a systematic error. In this case, the disparity estimator 126 assumes that noise of the same magnitude is added to Equations (1) and (2). Equation (3) is obtained by solving Equations (1) and (2) for a deviation amount $d_{sub}$ of less than one pixel.

$$d_{sub} = (c1_{min} - c1_{min+1} + c2_{+1})(c2_{-1} + c2_{+1})^{-1} \qquad (3)$$

Figure 18:
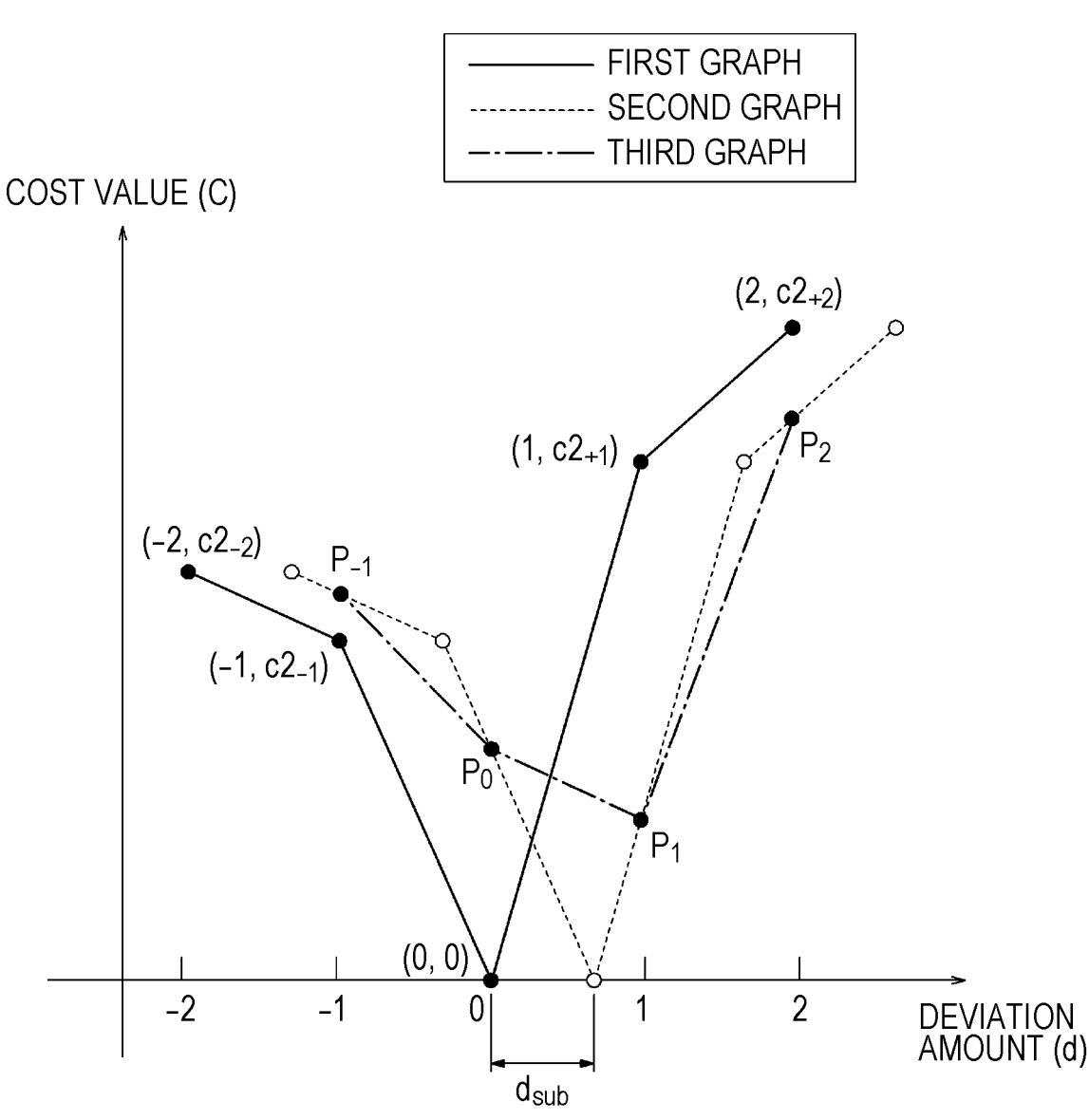
FIG. 18 is a diagram illustrating another example in which the distribution of first cost values, when there is a deviation amount $d_{sub}$ of less than one pixel, is estimated based on a self-difference distribution.

On the other hand, as illustrated in FIG. 18, when $c1_{min}$, which is the minimum first cost value $C_1$ (u, v, d), corresponds to the cost value C=(1−$d_{sub}$)c2$_{+1}$ at the point $P_1$, the following Equations (4) and (5) can be assumed to hold true.

$$c1_{min-1} = c2_{-1} \cdot d_{sub} - \varepsilon_2 \qquad (4)$$

$$c1_{min} = (1 - d_{sub})c2_{+1} + \varepsilon_2 \qquad (5)$$

where $\varepsilon_2$ is a correction value representing a uniform systematic error in Equations (4) and (5) similarly to $\varepsilon_1$. Solving Equations (4) and (5) for a deviation amount $d_{sub}$ of less than one pixel gives Equation (6).

$$d_{sub} = (c1_{min-1} - c1_{min} + c2_{+1})(c2_{-1} + c2_{+1})^{-1} \qquad (6)$$

As described above, the disparity estimator 126 can calculate a deviation amount $d_{sub}$ of less than one pixel based on Equation (3) or Equation (6). The disparity estimator 126 determines the appropriate deviation amount $d_{sub}$ out of the two deviation amounts $d_{sub}$ of less than one pixel calculated using Equations (3) and (6). The disparity estimator 126 can, for example, determine that the deviation amount $d_{sub}$, for which the correction term $\varepsilon_1$ or $\varepsilon_2$ is smaller, is the correct less-than-one-pixel deviation amount $d_{sub}$. In this example, in both cases, the first cost values $C_1$ (u, v, d)

corresponding to the smallest deviation amount $d_{min}$ and the neighboring deviation amount $d_{min-1}$ or $d_{min+1}$ are used to calculate a deviation amount $d_{sub}$ of less than one pixel.

The disparity estimator 126 may compare the absolute value of the corresponding correction term $\varepsilon_1$ or $\varepsilon_2$ with a prescribed first threshold for the equation, out of Equations (3) and (6), determined to calculate the correct less-than-one-pixel deviation amount $d_{sub}$. If the absolute value of the correction term $\varepsilon_1$ or $\varepsilon_2$ is greater than the first threshold, the disparity estimator 126 may determine that estimation of a deviation amount $d_{sub}$ of less than one pixel has failed. As the first threshold, a suitable value for determining failure of estimating a deviation amount $d_{sub}$ of less than one pixel is set in advance. The disparity estimator 126 may determine that the estimation has failed when the absolute value of the estimated deviation amount $d_{sub}$ of less than one pixel is larger than the size of one pixel in the horizontal direction.

In this calculation method, a deviation amount $d_{sub}$ of less than one pixel and one correction term $\varepsilon_1$ or $\varepsilon_2$ were determined by solving two equations (Equations (1) and (2) or Equations (4) and (5)). The disparity estimator 126 may calculate a deviation amount $d_{sub}$ of less than one pixel by further adding a number of equations. For example, regarding Equations (1) and (2), a further equation can be added in order to calculate a first cost value $c1_{min-1}$ corresponding to a deviation amount $d_{min-1}$, which is located in the vicinity of the deviation amount $d_{min}$. In that case, since the number of equations, i.e., 3, is greater than the total number of the variable $d_{sub}$ and the correction term $\varepsilon_1$, i.e., 2, the optimal solution may be calculated using the least-squares method or the like as a linear equation problem of an over-determined system in order to calculate a deviation amount $d_{sub}$ of less than one pixel.

<Disparity Calculating Method (2)>

The disparity estimator 126 can use Equations (1) and (2) or Equations (3) and (4), as equations including different correction terms, to estimate a deviation amount $d_{sub}$ of less than one pixel so that the sum of squares of the correction terms is minimized. In this case, the number of correction terms is greater than or equal to the number of integer deviation amounts d used to estimate a deviation amount $d_{sub}$ of less than one pixel.

For example, if Equations (1) and (2) corresponding to FIG. 17 have different correction terms $\varepsilon_3$ and $\varepsilon_4$, respectively, instead of $\varepsilon_1$, Equations (1) and (2) are transformed as follows.

$$c1_{min} = c2_{-1} \cdot d_{sub} + \varepsilon_3 \qquad (7)$$

$$c1_{min+1} = (1 - d_{sub})c2_{+1} + \varepsilon_4 \qquad (8)$$

The disparity estimator 126 determines a deviation amount $d_{sub}$ of less than one pixel so that the sum of squares of the correction terms $\varepsilon_3^2 + \varepsilon_4^2$ is minimized.

Similarly, if Equations (4) and (5) corresponding to FIG. 18 have different correction terms $\varepsilon_5$ and $\varepsilon_6$, respectively, instead of $\varepsilon_2$, Equations (4) and (5) are transformed as follows.

$$c1_{min-1} = c2_{-1} \cdot d_{sub} + \varepsilon_5 \qquad (9)$$

$$c1_{min} = (1 - d_{sub})c2_{+1} + \varepsilon_6 \qquad (10)$$

The disparity estimator 126 determines a deviation amount $d_{sub}$ of less than one pixel so that the sum of squares of the correction terms $\varepsilon_5^2 + \varepsilon_6^2$ is minimized.

The disparity estimator 126 can solve Equations (7) and (8), and Equations (9) and (10), using known methods such as Newton's method, for example. Out of the two obtained solutions, the disparity estimator 126 can determine that the deviation amount $d_{sub}$ of less than one pixel having the smaller sum of squares of the correction terms, i.e., $\varepsilon_3{}^2 + \varepsilon_4{}^2$ and $\varepsilon_5{}^2 + \varepsilon_6{}^2$, is correct.

The disparity estimator 126 may compare the sum of squares of the correction terms $\varepsilon_3{}^2 + \varepsilon_4{}^2$ or $\varepsilon_5{}^2 + \varepsilon_6{}^2$ corresponding to the deviation amount $d_{sub}$ of less than one pixel determined to be correct with a prescribed second threshold. If the sum of squares of the correction terms $\varepsilon_3{}^2 + \varepsilon_4{}^2$ or $\varepsilon_5{}^2 + \varepsilon_6{}^2$ is greater than the second threshold, the disparity estimator 126 may determine that estimation of a deviation amount $d_{sub}$ of less than one pixel has failed. As the second threshold, a suitable value for determining failure of estimating a deviation amount $d_{sub}$ of less than one pixel is set in advance. The disparity estimator 126 may determine that the estimation has failed when the absolute value of the estimated deviation amount $d_{sub}$ of less than one pixel is larger than the size of one pixel in the horizontal direction.

A method of estimating a deviation amount $d_{sub}$ of less than one pixel is not limited to the methods described above, and various methods can be employed.

<Processing Performed when Estimation Fails>

When the calculation of disparity of less than one pixel is determined to have failed, the disparity estimator 126 may estimate a deviation amount d that minimizes the first cost value $C_1$ (u, v, d) down to units of less than one pixel by using only the first cost value $c1_{min}$ corresponding to the first deviation amount $d_{min}$. For example, in Equation (1), the deviation amount $d_{sub}$ of less than one pixel can be calculated with $\varepsilon_1 = 0$. For example, in Equation (5), the deviation amount $d_{sub}$ of less than one pixel can be calculated with $\varepsilon_2 = 0$. In this case, the deviation amount $d_{sub}$ of less than one pixel can be calculated using either of the following Equations (11) and (12).

$$d_{sub} = c1_{min}/c2_{-1} \tag{11}$$

$$d_{sub} = 1 - c1_{min}/c2_{+1} \tag{12}$$

The disparity estimator 126 may use a deviation amount $d_{sub}$ of less than one pixel according to either Equation (11) or Equation (12) as an appropriate deviation amount $d_{sub}$ of less than one pixel.

The disparity estimator 126 may further determine whether or not a deviation amount $d_{sub}$ of less than one pixel calculated using Equation (11) or Equation (12) is appropriate. When the absolute value of the deviation amount $d_{sub}$ is greater than 1, the disparity estimator 126 may determine that the estimation process has failed again.

When the calculation of disparity of less than one pixel is determined to have failed, the disparity estimator 126 may calculate a deviation amount $d_{sub}$ of less than one pixel using only the first cost value $C_1$ (u, v, d). The disparity estimator 126 estimates a deviation amount $d_{sub}$ of less than one pixel using the first cost values $C_1$ (u, v, d) corresponding to the first deviation amount $d_{min}$ that gives the minimum value of $C_1$ (u, v, d) and the two adjacent deviation amounts $d_{min-1}$ and $d_{min+1}$ adjacent to the first deviation amount $d_{min}$. In this case, the disparity estimator 126 may estimate a deviation amount $d_{sub}$ of less than one pixel by fitting the distribution of the first cost values $C_1$ (u, v, d) with a known method using symmetrical functions such as isometric lines and parabolas.

The controller 122 can calculate the distance to the subject based on the disparity estimated by the disparity estimator 126. The image processing device 120 can transmit information regarding the distance to the subject to the ECU 40 inside the mobile object 150. The ECU 140 may control each part of the mobile object 150. For example, the ECU 140 may adjust the traveling speed of the mobile object 150 based on the information regarding the distance to the subject received from the image processing device 120. The ECU 140 may control braking, steering, and so on based on the information regarding the distance to the subject. The ECU 140 may present a warning, via images or sounds, to the user driving the mobile object 150 based on object detection information and information regarding the distance to the object.

(Disparity Calculation Processing Flow)

Figure 19:
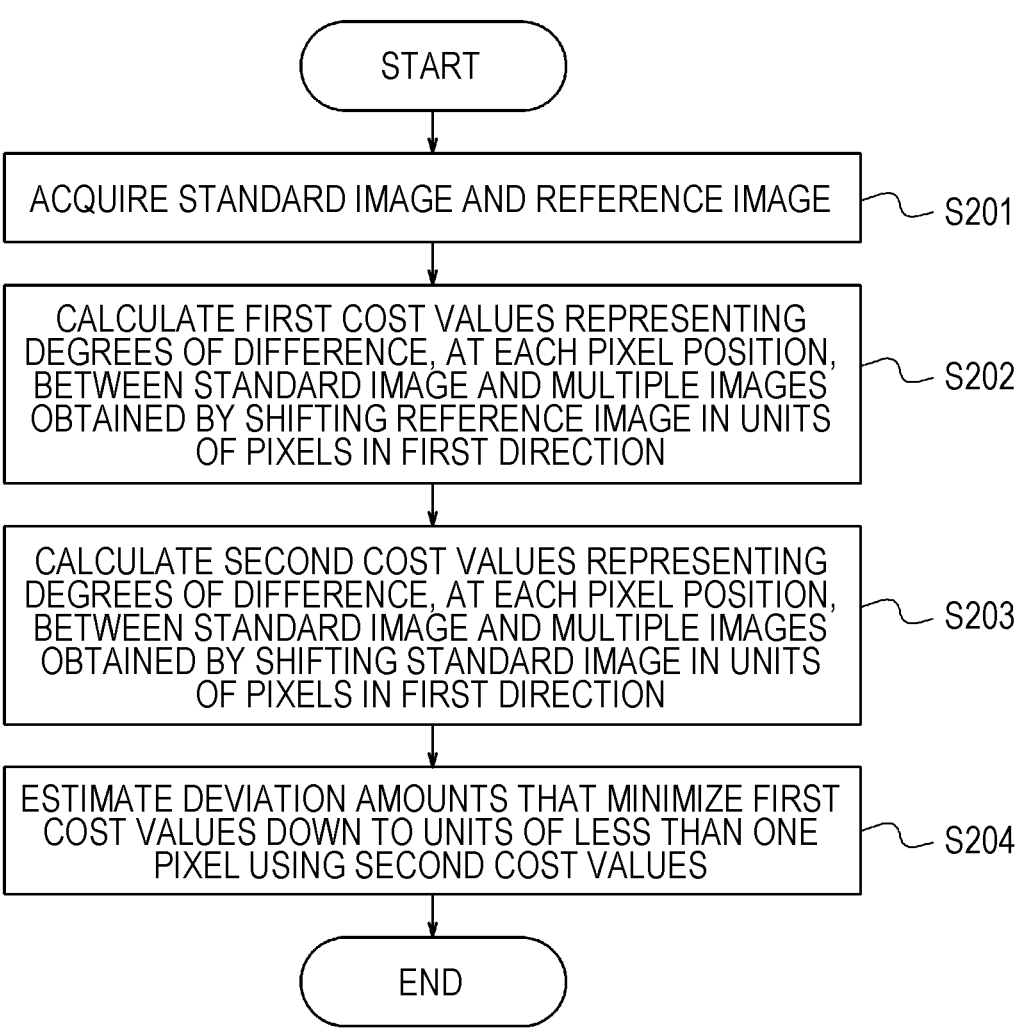
FIG. 19 is a flowchart of disparity calculation processing executed by the controller in FIG. 10.

Next, an outline of the processing flow of the disparity calculating method performed by the controller 122 of the image processing device 120 of the present disclosure will be described while referring to FIG. 19.

The image processing device 120 may be configured to implement the processing performed by the controller 122 described below by reading a program recorded on a non-transitory computer-readable medium. Non-transitory computer readable media include, but are not limited to, magnetic storage media, optical storage media, magneto-optical storage media, and semiconductor storage media. Magnetic storage media include magnetic disks, hard disks, and magnetic tapes. Optical storage media include optical discs such as compact discs (CDs), DVDs, and Blu-ray Discs (registered trademark). Semiconductor storage media include read only memories (ROMs), electrically erasable programmable read-only memories (EEPROMs), and flash memories.

First, the controller 122 acquires a first image, which is a standard image, and a second image, which is a reference image, captured by the stereo camera 110 via the communication unit 121 (Step S201).

The controller 122 calculates first cost values $C_1$ (u, v, d) (Step S202), which represent the degrees of difference at the individual pixel positions between the first image, which is the standard image, and each of multiple images obtained by displacing the second image, which is the reference image, in units of pixels in the first direction. The first direction is a direction corresponding to the baseline length of the stereo camera 110, as described above. The first direction may be a horizontal direction of the first image and the second image. Step S202 is processing performed by the difference calculator 124 of the controller 122.

The controller 122 calculates second cost values $C_2$ (u, v, d) (Step S203), which represent the degrees of difference at the individual pixel position between the first image, which is the standard image, and each of multiple images obtained by displacing the first image in units of pixels in the first direction. The controller 122 calculates the second cost values $C_2$ (u, v, d) between images displaced in increments of one pixel from zero pixels up to certain pixels close to zero pixels with the horizontal size of the pixels serving as a unit. The controller 122 may interpolate a second cost value $C_2$ (u, v, d) corresponding to non-integer deviation amount d based on second cost values $C_2$ (u, v, d) corresponding to integer deviation amounts d. The controller 122 may interpolate a second cost value $C_2$ (u, v, d) corresponding to a non-integer deviation amount d by using an asymmetric function. Asymmetric functions include linear functions and asymmetric parabolic functions. Step S202 is processing performed by the self-difference calculator 125 of the controller 122.

The controller 122 uses the distribution of the second cost values $C_2$ (u, v, d) to estimate a deviation amount d that minimizes the first cost value $C_1$ (u, v, d) down to units of less than one pixel (Step S204). The controller 122 can estimate a deviation amount $d_{suzb}$ of less than one pixel using the first cost values $C_1$ (u, v, d) corresponding to the first deviation amount $d_{min}$ that gives the minimum value of $C_1$ (u, v, d) and a neighboring deviation amount d. The controller 122 estimates a deviation amount $d_{sub}$ of less than one pixel by calculation so that the distribution of the first cost values $C_1$ (u, v, d) is closer to the distribution of the second cost values $C_2$ (u, v, d). Step S203 is processing performed by the disparity estimator 126 of controller 122.

As described above, the image processing device 120 of the Second Embodiment is able to estimate pixel deviation of the stereo camera 110 at long distances down to units of less than one pixel, thereby improving the resolution of distance measurement. The asymmetry of the distribution of cost values in the vicinity of a pixel of interest in the standard image is incorporated as the distribution of the second cost values $C_2$ (u, v, d), and therefore the occurrence of errors can be reduced. In particular, there is an effect that a pixel-locking phenomenon as in conventional sub-pixel estimation methods that use steep-slope isometric or parabolic functions for fitting is less likely to occur. In the pixel-locking phenomenon, estimated values are biased toward integer values.

Furthermore, according to the image processing device 120 of the Second Embodiment, the accuracy of estimation of the deviation amount d can be improved by including a correction term for correcting the calculation formula for the disparity estimation, as illustrated in the example. Furthermore, by setting a threshold for the size of the correction term, the success or failure of the disparity estimation can be determined.

Figure 21:
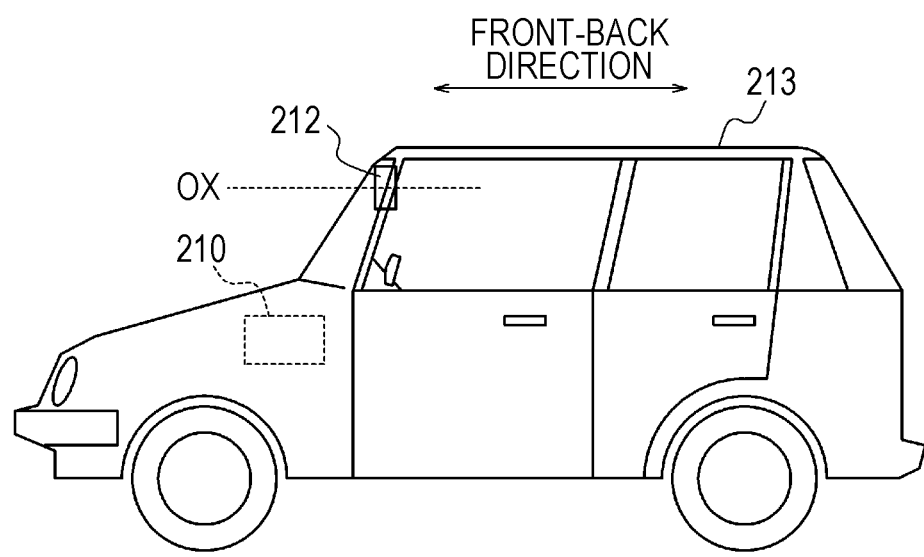
FIG. 21 is a side view conceptually illustrating the position of the stereo camera in FIG. 20 in a mobile object.

As illustrated in FIG. 20, a stereo camera device 211 including an image processing device 210 in a Third Embodiment includes a stereo camera 212 and the image processing device 210. As illustrated in FIG. 21, the stereo camera device 211 calculates the position, in a world coordinate system with respect to a mobile object 213, of a subject corresponding to a subject image in the stereo images based on the captured stereo images. As illustrated in FIG. 20, the stereo camera device 211 notifies an external device 214 of the position of the subject in the world coordinate system. Examples of the external device 214 includes driving assistance devices such as auto cruise control, driving assistance devices such as automatic braking devices, reporting devices that report the distance to a subject, and warning devices that issue alerts.

Examples of the mobile object 213 may include a vehicle, a ship, and an aircraft. Vehicles may include, for example, automobiles, industrial vehicles, rail vehicles, motorhomes, and fixed-wing aircraft that taxi along runways. Automobiles may include, for example, passenger cars, trucks, buses, motorcycles, and trolleybuses. Industrial vehicles may include, for example, industrial vehicles used in agriculture and construction. Industrial vehicles may include, for example, forklift trucks and golf carts. Industrial vehicles used in agriculture may include, for example, tractors, cultivators, transplanters, binders, combine harvesters, and lawn mowers. Industrial vehicles used in construction may include, for example, bulldozers, scrapers, excavators, cranes, dump trucks, and road rollers. Vehicles may include vehicles that are human powered. The categories of vehicles are not limited to the above examples. For example, automobiles may include industrial vehicles that can travel along roads. The same vehicles may be included in multiple categories. Ships may include, for example, jet skis, boats, and tankers. Examples of aircraft may include fixed-wing aircraft and rotary-wing aircraft.

The stereo camera 212 and the image processing device 210 can communicate with each other via wired or wireless communication. The stereo camera 212 and the image processing device 210 may communicate with each other via a network. Examples of the network may include a wired or wireless local area network (LAN) and a controller area network (CAN). The stereo camera 212 and the image processing device 210 may be integrated with each other and housed in the same housing. The stereo camera 212 and the image processing device 210 may be located inside the mobile object 213 and be configured so as to be able to communicate with an electronic control unit (ECU) inside the mobile object 213.

As illustrated in FIG. 21, the stereo camera device 211 is installed in the mobile object 213, for example. The stereo camera 212 is, for example, installed so as to capture images of the region in front of the mobile object 213. The stereo camera 212 is disposed so that, for example, an optical axis OX of at least one of the multiple cameras included in the stereo camera 212 is substantially parallel to the front-back direction of the mobile object 213, as described below.

The stereo camera 212 can be mounted in a variety of places in or on the mobile object 213. The stereo camera 212 is, for example, mounted inside the mobile object 213 and captures images of the region outside the mobile object 213 through the windshield. The stereo camera 212 is disposed in front of the rearview mirror or on the dashboard. The stereo camera 212 may be fixed to any out of a front bumper, a fender grille, a side fender, a light module, and a hood of the mobile object 213.

The stereo camera 212 includes multiple cameras that have disparity with respect to each other. As illustrated in FIG. 20, the stereo camera 212 includes, for example, a first camera 215 and a second camera 216. The stereo camera 212 is capable of capturing images of an object from multiple directions by making multiple cameras work together. The stereo camera 212 may include multiple cameras in a single housing. The stereo camera 212 may include two or more cameras that are independent of each other and positioned so as to be separated from each other. The stereo camera 212 does not have to consist of multiple cameras that are independent of each other. For example, in the present disclosure, a camera including an optical mechanism that directs light incident at two separate locations to a single light-receiving element can be employed as the stereo camera 212.

In the stereo camera 212, the first camera 215 and the second camera 216 are positioned so that their respective optical axes OX are oriented in directions that allow the cameras to capture images of the same subject as each other. The optical axes OX and positions of the first camera 215 and the second camera 216 are decided upon so that the captured images each at least contain the same subject image. The optical axes OX of the first camera 215 and the second camera 216 are parallel to each other, for example. The optical axes OX do not have to be perfectly parallel with each other, and misalignments occurring during assembly, misalignments occurring during installation, and misalignments of the optical axes OX occurring over time may be permitted. The optical axes OX of the first camera 215 and the second camera 216 do not have to be parallel with each other and may be oriented in different directions from each other.

Figure 22:
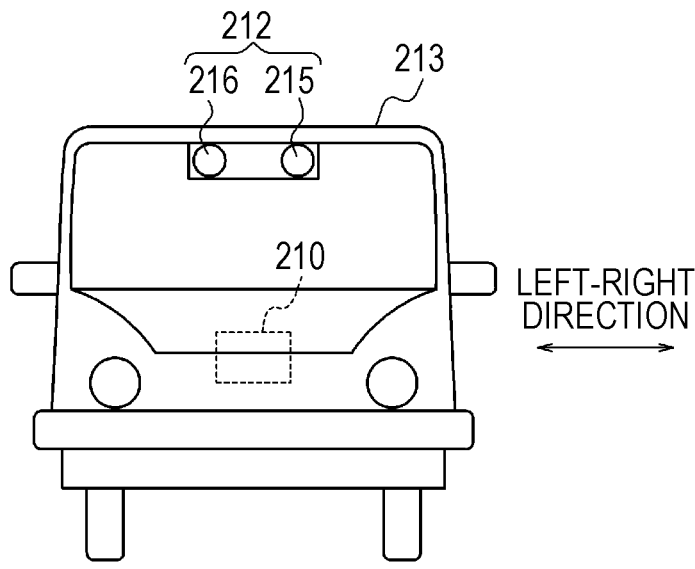
FIG. 22 is a front view conceptually illustrating the position of the stereo camera in FIG. 20 in the mobile object.

The first camera 215 and the second camera 216 are positioned so as to be spaced apart from each other in a direction intersecting the optical axes OX. As illustrated in FIG. 22, the first camera 215 and the second camera 216 are positioned along the left-right direction in a state determined prior to their attachment to the mobile object 213. Due to the different positions of the first camera 215 and the second camera 216, the corresponding positions of a subject in the two images captured by the cameras are different from each other. A standard image generated by the first camera 215 and a reference image generated by the second camera 216 are stereo images captured from different viewpoints. The first camera 215 and the second camera 216 capture a subject at a prescribed frame rate (for example, 30 fps).

The first camera 215 and the second camera 216 each include an optical system that defines the optical axis OX and an imaging element. The first camera 215 and the second camera 216 have different optical axes OX from each other. The optical systems each includes lenses or mirrors to form the subject image on the light-receiving surface of the imaging element. Examples of imaging elements include charge-coupled device (CCD) image sensors and complementary MOS (CMOS) image sensors. The respective imaging elements of the first camera 215 and the second camera 216 may lie on the same plane perpendicular to the optical axes OX of the cameras. The imaging elements of first camera 215 and the second camera 216 each include a plurality of pixels disposed in a matrix pattern. In the imaging elements of the first camera 215 and the second camera 216, a row direction of the pixels may be parallel to the baseline length direction of the stereo camera 212. The baseline length direction is the direction of a straight line passing through the intersection of the optical axis OX with the light-receiving surface of the imaging element of the first camera 215 and the intersection of the optical axis OX with the light-receiving surface of the imaging element of the second camera 216. The first camera 215 and second camera 216 generate images captured by their respective imaging elements as signals. The first camera 215 and the second camera 216 may perform any suitable image processing on the captured images, such as distortion correction, brightness adjustment, contrast adjustment, gamma correction, and so on.

As illustrated in FIG. 20, the image processing device 210 includes an acquiring unit 217, an output unit 218, a memory 219, and a controller 220. The image processing device 210 can be disposed at any suitable position inside the mobile object 213. For example, the image processing device 210 is disposed inside the dashboard of the mobile object 213.

The acquiring unit 217 is an input interface of the image processing device 210 that acquires information from the stereo camera 212 and external devices. A physical connector or a wireless communication device may be used as the acquiring unit 217. Examples of physical connectors include electrical connectors for transmission of electrical signals, optical connectors for transmission of optical signals, and electromagnetic connectors for transmission of electromagnetic waves. Examples of electrical connectors include connectors conforming to IEC60603, connectors conforming to the USB standards, connectors compatible with RCA terminals, connectors compatible with S terminals as specified in EIAJCP$_{-1}$211A, connectors compatible with D terminals as specified in EIAJRC-5237, connectors conforming to HDMI (registered trademark) standards, and connectors compatible with coaxial cables including BNC. Examples of optical connectors include a variety of connectors conforming to IEC61754. Examples of wireless communication devices include wireless communication devices conforming to various standards including Bluetooth (registered trademark) and IEEE802.11. The wireless communication device includes at least one antenna.

The acquiring unit 217 acquires a standard image and a reference image generated through image capturing performed by the stereo camera 212 as signals. The acquiring unit 217 passes the acquired standard image and reference image to the controller 220. The acquiring unit 217 may support the transmission method of the image signals of stereo camera 212. The acquiring unit 217 may be connected to an output interface of the stereo camera 212 via a network.

The output unit 218 is an output interface of the image processing device 210 that can output the position, in the world coordinate system, of the subject calculated by the image processing device 210 to another device inside the mobile object 213 or to the external device 214 outside the mobile object 213 such as another mobile object or a roadside machine.

Similarly to the acquiring unit 217, examples of the output unit 218 include various interfaces for wired and wireless communication. The output unit 218, for example, includes a CAN interface and communicates with other devices inside the mobile object 213.

The memory 219 includes any suitable storage device such as a random access memory (RAM) and a read only memory (ROM). The memory 219 stores various programs that allow the controller 220 to function and various kinds of information used by the controller 220.

The controller 220 includes one or more processors and memories. Such processors may include general-purpose processors into which specific programs are loaded to perform specific functions, and dedicated processors dedicated to specific processing. Dedicated processors may include an application specific integrated circuit (ASIC). Processors may include programmable logic devices (PLDs). PLDs may include field-programmable gate arrays (FPGAs). The controller 220 may be either a system-on-a-chip (SoC) or a system in a package (SiP), in which one or more processors work together.

The controller 220 creates a first fitting function and a second fitting function as described below.

A method of creating the first fitting function is described below. The controller 220 specifies any area within the standard image as a search area. For example, the controller 220 specifies any one pixel as a pixel of interest and specifies a region of a prescribed size that includes the pixel of interest as the search area. The search area may be, for example, an area the size of m rows and n columns (m and n are natural numbers) centered on the pixel of interest.

The controller 220 specifies, within the reference image, an area that is displaced in units of pixels along the baseline length direction from the position of the search area as a comparison area. The controller 220 specifies multiple comparison areas each displaced one pixel at a time in both directions along the baseline length direction.

The controller 220 calculates the degree of difference between partial images included in the search area and comparison areas. The degree of difference is an index that varies in accordance with the difference between pixel values of the pixels of the partial images such as the sum of absolute difference (SAD), sum of squared difference (SSD), and so on. The controller 220 calculates multiple degrees of difference for each displaced position.

Figure 23:
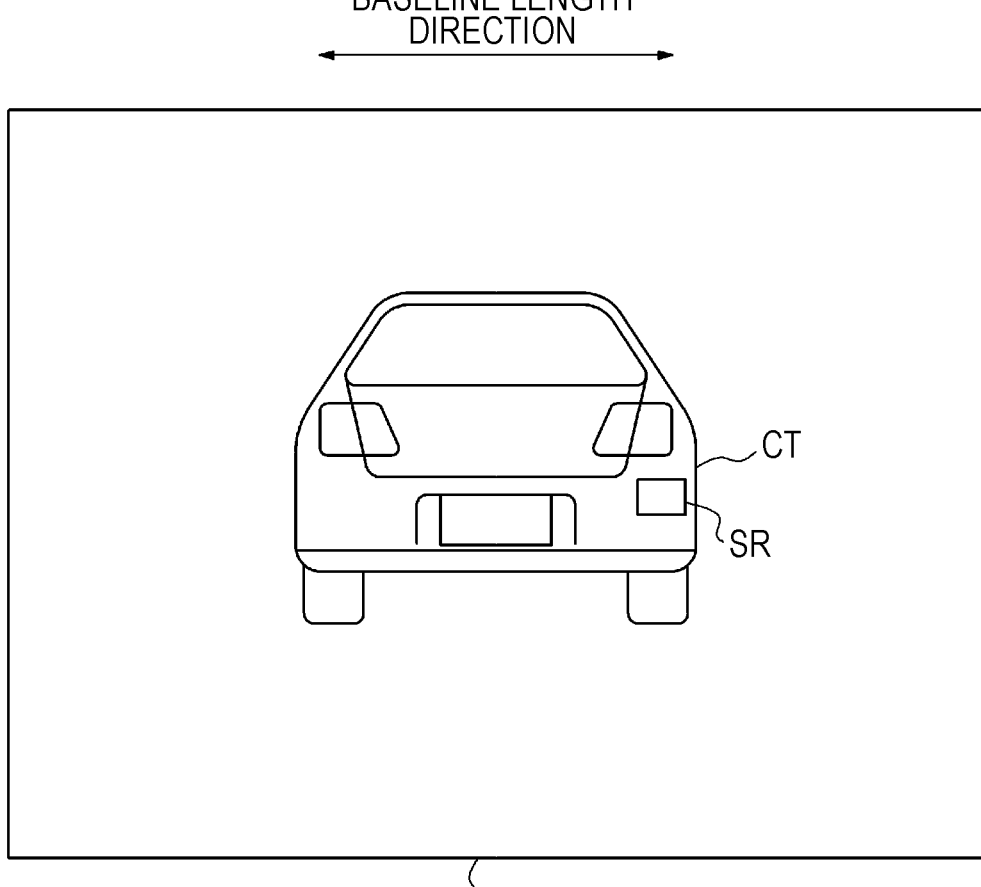
FIG. 23 is a diagram illustrating a search area in a standard image and contours of a subject image in the vicinity of the search area.
Figure 24:
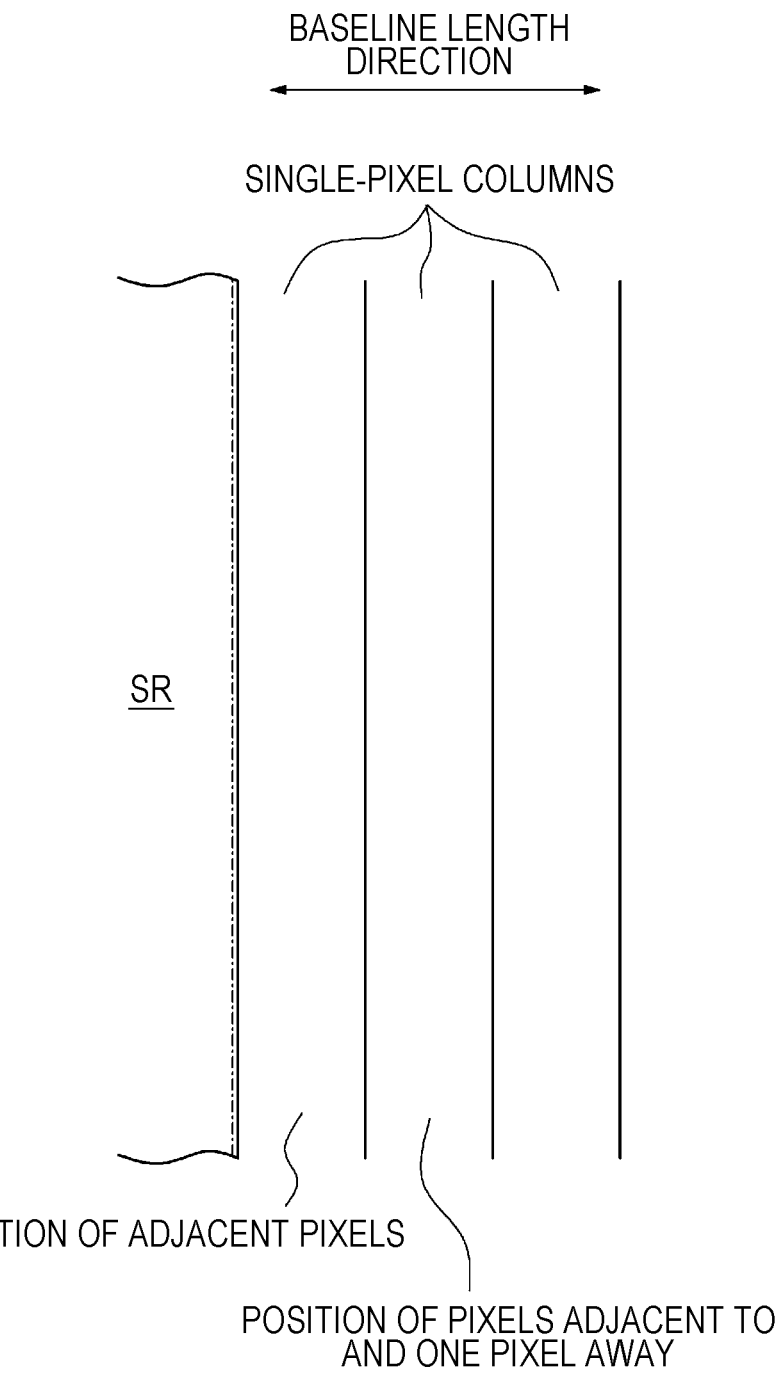
FIG. 24 is a diagram illustrating specific positions near a boundary.

As illustrated in FIG. 23, the controller 220 determines whether or not a contour CT that intersects the baseline length direction is present near a boundary of a search area SR on a baseline length direction side in a standard image SI. The controller 220 may, for example, use a Sobel filter to determine the presence or absence of a contour CT that intersects the baseline length direction. In FIG. 23, for ease of understanding, the search area SR is drawn so as to be large relative to the standard image SI, but in reality the search area SR may be small. As illustrated in FIG. 24, "near a boundary" refers to, for example, the position of pixels adjacent to and outside a boundary, which is on a baseline length direction side of the search area SR, and the position of pixels close to but one pixel away from the boundary. A contour CT intersecting the baseline length direction may be, for example, a contour CT perpendicular to the baseline length direction.

When a contour CT that intersects the baseline length direction is present near a boundary of the search area SR on a baseline length direction side, the controller 220 calculates the movement amount that would cause the contour CT to be present at the boundary in the reference image. "The contour CT is present at the boundary" means, for example, that the contour CT is present at pixels adjacent to the boundary inside the boundary on the side of the search area SR where the contour CT is present.

In general, comparison areas where the degrees of difference have extreme values will be the most similar to the search area SR among the comparison areas for which degrees of difference have been calculated. An extreme value of a degree of difference is a minimum value in cases where the degree of difference increases as the difference between the search area SR and a comparison area increases such as in SAD and SSD. An extreme value of a degree of difference is a maximum value in cases where the degree of difference decreases as the difference between the search area SR and a comparison area increases. Therefore, a contour CT of a subject image that intersects the baseline length direction is present near the boundary on a baseline length direction side in a comparison area where the degree of difference has an extreme value. Therefore, for example, the controller 220 calculates the movement amount that would cause the contour CT to be present at the boundary in the reference image by adding the distance between the boundary and the contour CT detected near the boundary on a baseline length direction side of the comparison area to the movement amount of a comparison area where the degree of difference has an extreme value.

The controller 220 creates the first fitting function by excluding a degree of difference of a comparison area at a movement amount that would cause the contour CT to be present at the boundary in the reference image, from among the degrees of difference calculated for the multiple comparison areas described above. The first fitting function is a function representing the relationship between the degree of difference and the movement amount of a comparison area relative to the search area SR in the baseline length direction. The first fitting function is created by performing parabolic fitting or the like through the degrees of difference corresponding to the above-mentioned movement amounts.

Figure 25:
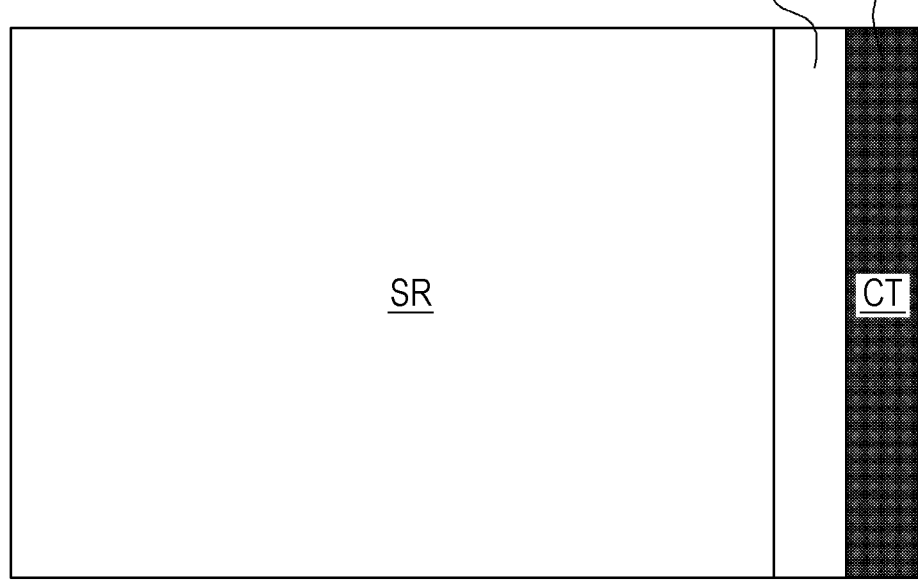
FIG. 25 is a diagram illustrating an example of a search area in which a vertical direction contour exists near a boundary on a side in a baseline length direction.
Figure 26:
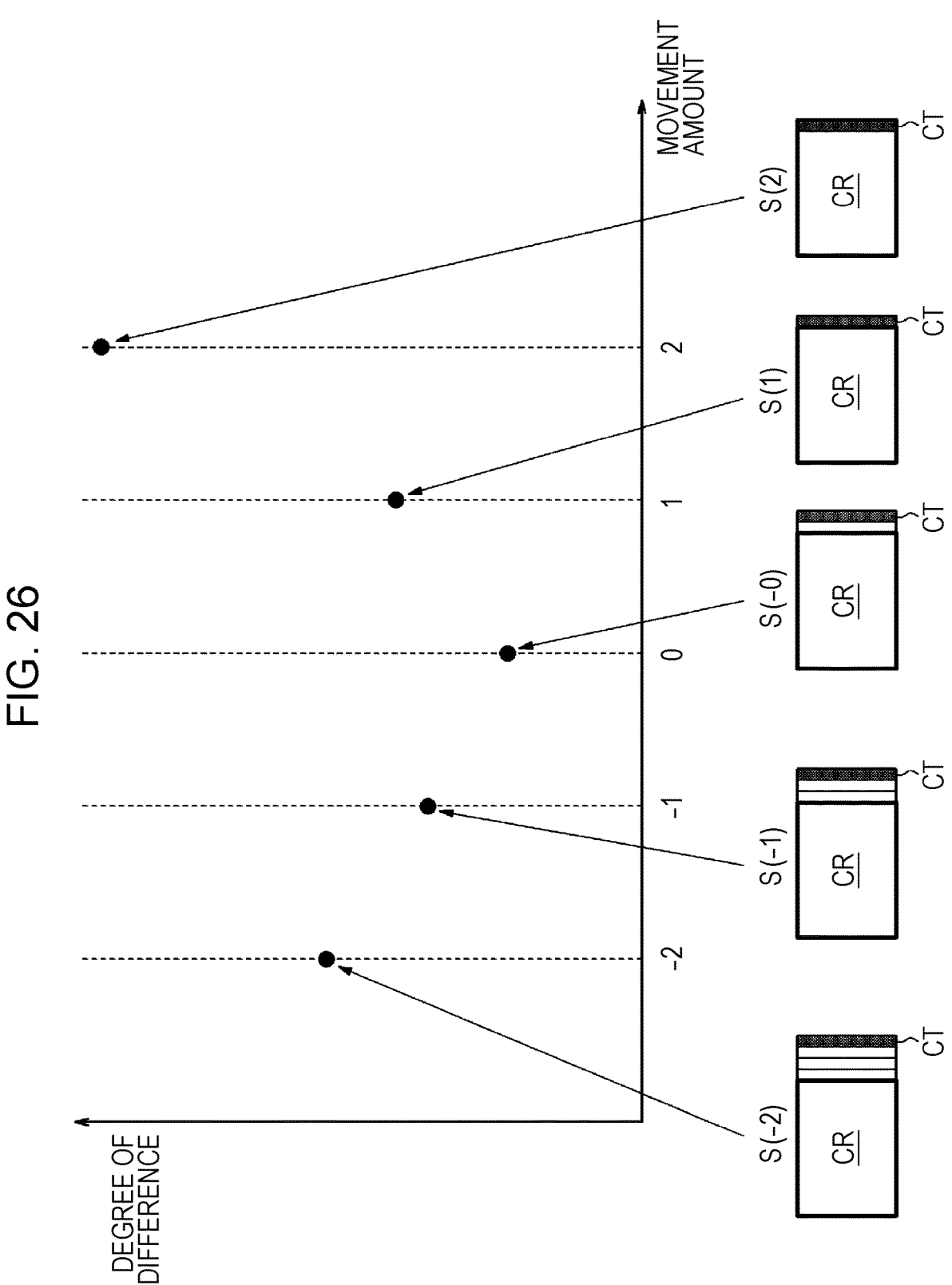
FIG. 26 is a graph plotting the degrees of difference between the search area in FIG. 25 and a comparison area moved in the vicinity of a movement amount where the degree of difference is smallest.

For example, as illustrated in FIG. 25, the creation of a first fitting function for a search area SR for which a contour CT exists in the vertical direction at pixels close to but one pixel away from the boundary on one side (right side in drawing) in the baseline length direction will be described. If S(x) represents the degree of difference, with respect to the search area SR, of a comparison area moved x pixels in the baseline length direction with reference to a comparison area where the degree of difference is the minimum value, then the degree of difference s(x) with respect to discrete movement amounts of the comparison area CR is plotted as a graph as illustrated in FIG. 26. The degree of difference for a comparison area CR with a movement amount of 2 for which the contour CT is present at the boundary is greater than the degrees of difference for comparison areas CR with movement amounts of −2 to 1 for which the contour CT is not present at the boundary. The first fitting function is created by excluding S(2) and finding the curve that passes through S(−2) to S(1).

If a contour CT exists near a boundary only on one side in the baseline length direction, the controller 220 may create the first fitting function without excluding the above-described degree of difference. However, when the controller 220 creates the first fitting function without excluding this degree of difference, the controller 220 may define the direction of displacement when creating the second fitting function, described below, to be towards the opposite side from that one side.

A method of creating the second fitting function is described below. The controller 220 displaces one out of the standard image SI and the reference image by 0.5 pixels in the baseline length direction. "Displaces by 0.5 pixels" means, for example, performing pixel interpolation on pixels making up the image by averaging values of pixels adjacent to each other along the displacement direction, and calculating the pixel value at a position having a displacement of 0.5 pixels. If a contour CT is present near a boundary only on one side in the baseline length direction as described above, a "displacement of 0.5 pixels" may be in a direction towards the opposite side from the one side. The displacement of one out of the standard image SI and the reference images may be in the vicinity of the search area SR and comparison area CR, where the disparity is calculated, rather than in the entire image.

In a state where one out of the standard image SI and the reference image is displaced by 0.5 pixels in the baseline length direction, the controller 220 specifies an area having the same position and the same size in the whole image at the time of creating the first fitting function as the search area SR. The size of the search area SR is the same as that of the search area SR used when creating the first fitting function.

In a state where one out of the standard image SI and the reference image is displaced by 0.5 pixels in the baseline length direction, the controller 220 specifies the comparison area CR as an area, within the reference image, that has been displaced in units of pixels along the baseline length direction from the position of the search area SR. The controller 220 calculates the degree of difference between partial images included in the search area SR and the comparison area CR in a state where one out of the standard image SI and the reference image has been displaced by 0.5 pixels in the baseline length direction.

In a state where one out of the standard image SI and the reference image has been displaced by 0.5 pixels in the baseline length direction, the controller 220 determines whether or not a contour CT that intersects the baseline length direction is present near a border of the search area SR on a baseline length direction side in the standard image SI. Ina state where one out of the standard image SI and the reference image has been displaced by 0.5 pixels in the baseline length direction and a contour CT that intersects the baseline length direction is present near the boundary of the search area SR on a baseline length direction side, the controller 220 calculates the movement amount that would cause the contour CT to be present at the boundary in the reference image.

In a state where one out of the standard image SI and the reference image has been displaced by 0.5 pixels in the baseline length direction, the controller 220 creates the second fitting function by excluding the degree of difference of the comparison area CR having a movement amount that causes the contour CT to be present at the boundary in the reference image from the degrees of difference calculated for the multiple comparison areas CR described above. The second fitting function is a function representing the relationship between the degree of difference and the movement amount of a comparison area CR relative to the search area SR in the baseline length direction. The controller 220 creates the second fitting function using the same method as that used to calculate the first fitting function among methods such as parabolic fitting.

Figure 27:
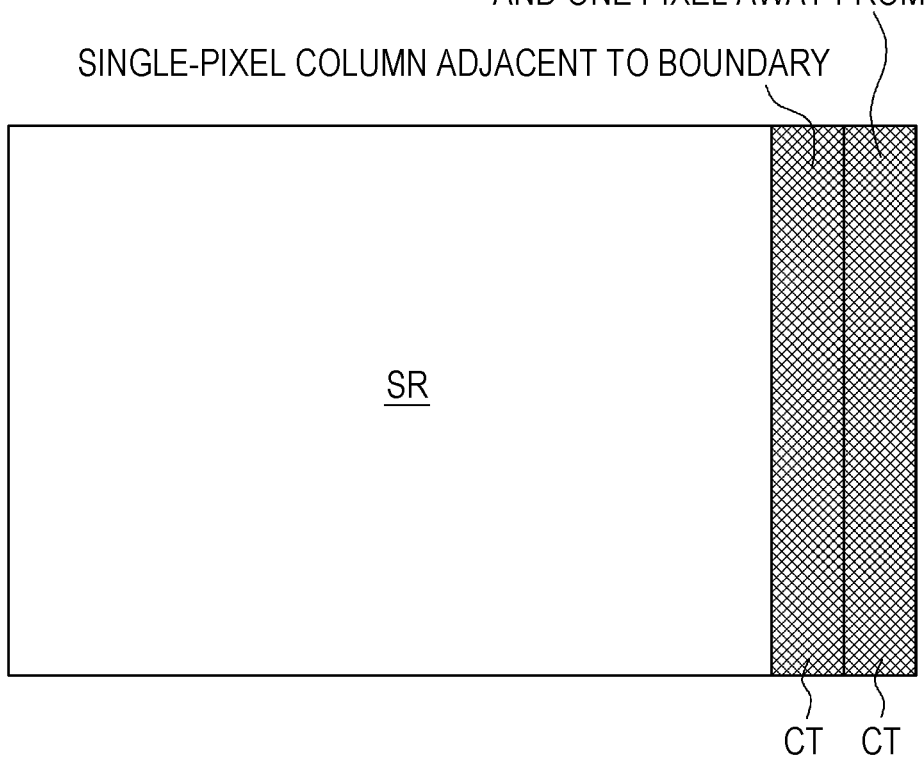
FIG. 27 is a diagram illustrating an example of a search area in which a vertical direction contour exists near a boundary in the baseline length direction in an image displaced by 0.5 pixels in the baseline length direction relative to a standard image.

For example, the creation of the second fitting function for a search area SR for which a contour CT is present in the vertical direction at pixels close to but one pixel away from the boundary on one side (right side in drawing) along the baseline length direction will be described. If the standard image SI is displaced by 0.5 pixels in the direction in which the contour CT is present, the contour CT can be present at the position of pixels adjacent to and outside the boundary of the search area SR on a baseline length direction side and at the position of pixels close to but one pixel away from the boundary, as illustrated in FIG. 27. As mentioned above, the pixel value resulting from a displacement of 0.5 pixels is calculated by averaging the values of pixels that are adjacent to each other. Therefore, a contour CT can be present at pixels adjacent to pixels where a contour CT is detected prior to the displacement.

Figure 28:
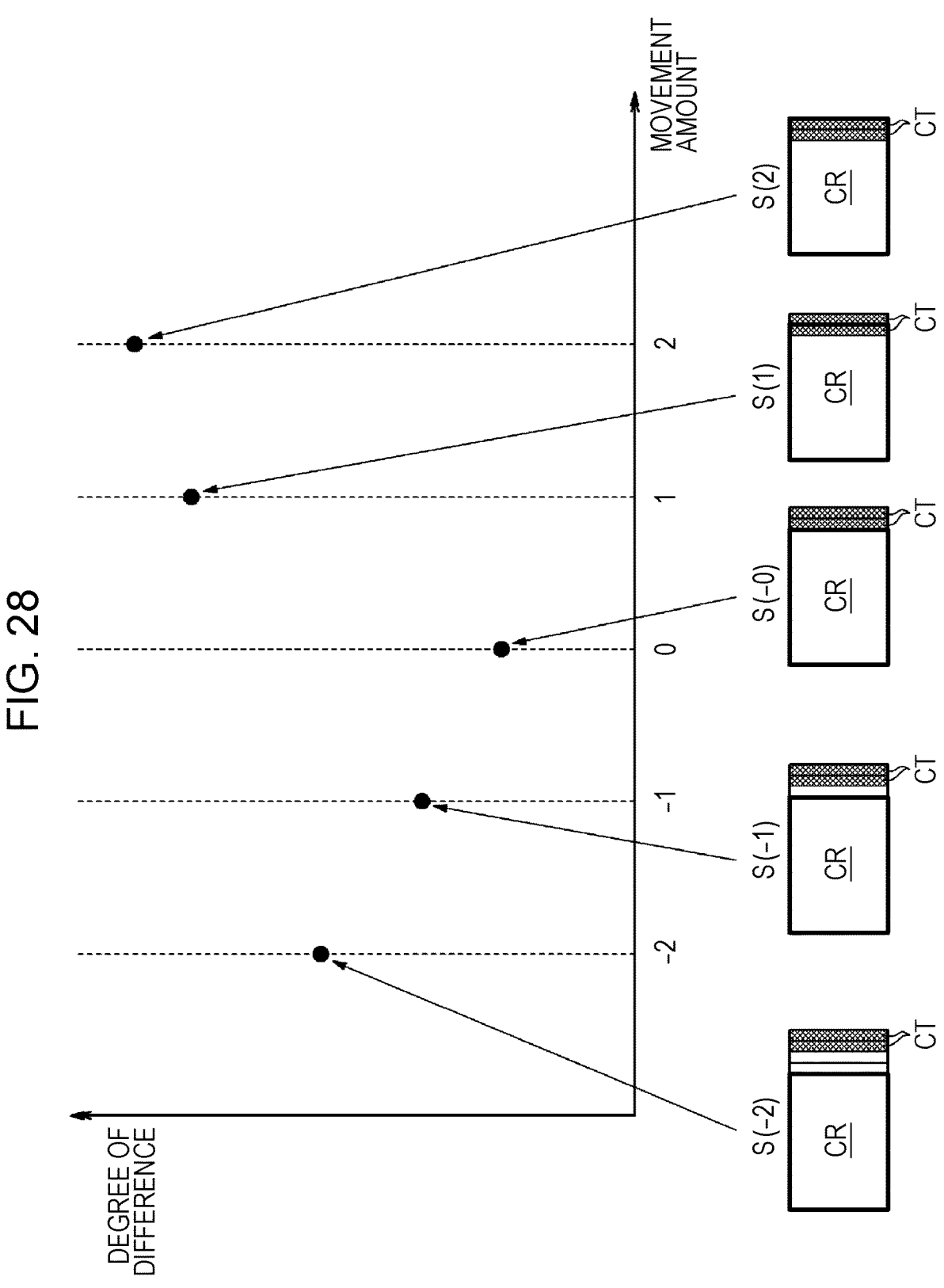
FIG. 28 is a graph plotting the degrees of difference between the search area in FIG. 27 and a comparison area moved in the vicinity of an amount of movement where the degree of difference is smallest.

If $S(x)$ represents the degree of difference, with respect to the search area SR, of a comparison area CR moved x pixels in the baseline length direction with reference to the comparison area CR where the degree of difference is the minimum value, then the degree of difference $s(x)$ with respect to discrete movement amounts of the comparison area CR is plotted as a graph as illustrated in FIG. 28. The degree of difference for a comparison area CR with a movement amount of 1 or 2 for which a contour CT is present at the boundary is greater than the degrees of difference for comparison areas CR with movement amounts of −2 to 0 for which the contour CT is not present at the boundary. The second fitting function is created by excluding $S(1)$ and $S(2)$ and finding the curve that passes through $S(−2)$ to $S(0)$.

The controller 220 calculates the disparity of the subject image in the search area SR based on the first fitting function and the second fitting function. More specifically, the controller 220 calculates the disparity as the movement amount for which the degree of difference is the smallest in a fitting function obtained by summing or averaging degrees of difference having the same movement amounts in the first fitting function and the second fitting function.

The controller 220 may calculate the position, in the world coordinate system, of a subject corresponding to the subject image within the search area SR based on the calculated disparity and external and internal orienting elements. The controller 220 may control the output unit 218 to output the calculated world coordinate system position of the subject to the external device 214. The controller 220 may specify a portion of the standard image SI or the entirety of the standard image SI as the comparison area CR in a sequential manner and calculate the position of the subject pixel by pixel.

Next, position calculation processing executed by the controller 220 in this embodiment will be described using the flowchart in FIG. 29. Position calculation processing starts each time one frame of the standard image SI and the reference image are acquired from the stereo camera 212.

In Step S300, the controller 220 specifies a search area SR from among areas that are to be specified in the standard image SI but have not yet been specified. The controller 220 specifies multiple comparison areas CR in the reference image. After the specifying, the process proceeds to Step S301.

In Step S301, the controller 220 determines whether or not a contour CT is present near a boundary of the search area SR specified in Step S300 on a baseline length direction side. When no contour CT is present, the process proceeds to Step S302. When a contour CT is present, the process proceeds to Step S305.

In Step S302, the controller 220 determines one direction along the baseline length direction as a displacement direction. After the determination, the process proceeds to Step S303.

In Step S303, the controller 220 displaces one out of the standard image SI and the reference image by a movement amount of 0.5 pixels in the displacement direction determined in Step S302. After the displacement, the process proceeds to Step S304.

In Step S304, the controller 220 specifies a search area SR for the standard image SI and multiple comparison areas CR for the reference image with the displacement in Step S303. After the specifying, the process proceeds to Step S312.

In Step S305, the controller 220 determines whether the contour CT whose presence was determined in Step S301 is present only on one side in the baseline length direction. When a contour is present only on one side, the process proceeds to Step S306. If a contour is present on both sides, the process proceeds to Step S307.

In Step S306, the controller 220 determines the displacement direction to be towards the opposite side from the one side where the presence of the contour CT was determined in Step S305. After the determination, the process proceeds to Step S308.

In Step S307, the controller 220 determines one direction along the baseline length direction as the displacement direction. After the determination, the process proceeds to Step S308.

In Step S308, the controller 220 displaces one out of the standard image SI and the reference image by a movement amount of 0.5 pixels in the displacement direction determined in Step S306 or S307. After the displacement, the process proceeds to Step S309.

In Step S309, the controller 220 specifies a search area SR for the standard image SI and multiple comparison areas CR for the reference image with the displacement as in Step S308. After the specifying, the process proceeds to Step S310.

In Step S310, the controller 220 calculates the movement amount that would cause the same contour CT as that positioned near the boundary of the search area SR specified in Step S300 to be present at the boundary in the reference image. With the image displaced as in Step S308, the controller 220 calculates the movement amount that would cause the same contour CT as that located near the boundary of the search area SR specified in Step 309 to be present at the boundary in the reference image. After the calculation, the process proceeds to Step S311.

In Step S311, the controller 220 excludes the comparison area CR corresponding to the movement amount calculated in Step S310 from among the comparison areas CR used to calculate the degrees of difference. After the exclusion, the process proceeds to Step S312.

In Step S312, the controller 220 calculates the degrees of difference between the search area SR specified in Step S300 and the comparison areas CR specified in Step S300 or the comparison areas CR after exclusion if a comparison area CR was excluded in Step S311. The controller 220 also calculates the degree of differences between the search area SR specified in Step S306 or Step S309 and the comparison areas CR specified in Step S306 or Step S309 or comparison areas CR after exclusion if a comparison area CR was excluded in Step S311. After the calculation, the process proceeds to Step S313.

In Step S313, the controller 220 creates the first fitting function and the second fitting function based on the degrees of difference calculated in Step S312. After the creation, the process proceeds to Step S314.

In Step S314, the controller 220 calculates disparity based on the first fitting function and second fitting function created in Step S313. After calculating the disparity, the process proceeds to Step S315.

In Step S315, the controller 220 calculates the position of the subject corresponding to the subject image included in the search area SR specified in Step S300 based on the disparity calculated in Step S314 and external and internal orienting elements. After the calculation, the process proceeds to Step S316.

In Step S316, the controller 220 controls the output unit 218 to output the position calculated in Step S315 to the external device 214. After the outputting, the process proceeds to Step S317.

In Step S317, the controller 220 determines whether all areas to be specified in the standard image SI have been specified as the search area SR. When some have not been specified, the process returns to Step S300. When all areas to be specified have been specified, the position calculation processing ends.

The thus-configured image processing device 210 of the Third Embodiment calculates the disparity of the subject image within the search area SR based on the first fitting function and the second fitting function. The first fitting function is based on multiple degrees of difference between the search area SR in the standard image SI and the comparison areas CR in the reference image displaced in units of pixels. The second fitting function is based on multiple degrees of difference between the search area SR in the standard image SI and the comparison areas CR in the reference image displaced in units of pixels with one out of the standard image SI and the reference image having been displaced by 0.5 pixels in the baseline length direction. This configuration, in other words, the EEC method, enables the image processing device 210 to reduce systematic errors in sub-pixel estimation.

The image processing device 210 of the Third Embodiment creates the first fitting function by excluding the degree of difference of a comparison area CR, which has a movement amount to the position where a contour CT exists, when a contour CT intersecting the baseline length direction is present near the boundary of the search area SR on a baseline length direction side. The image processing device 210 of the Third Embodiment creates the second fitting function by excluding the degree of difference of a comparison area CR, which has a movement amount to the position where a contour CT is present, when a contour CT intersecting the baseline length direction is present near the boundary on a baseline length direction side of the search area SR, in a state where one out of the standard image SI and the reference image has been displaced by 0.5 pixels in the baseline length direction. In a state where a contour CT intersecting the baseline length direction is located at a boundary of the comparison area CR, it is common for the degree of difference to diverge from the visual difference. Therefore, in a configuration where disparity is calculated based on the relationship between the degree of difference and the movement amount of the comparison area CR relative to the search area SR, errors tend to occur when a degree of difference that deviates from the visual difference is used in the creation of the relationship. In particular, since the movement amount at which the degree of difference has an extreme value corresponds to the disparity, the error in disparity becomes large when the degree of difference around an extreme value among multiple discrete degrees of difference corresponding to movement amounts displaced in units of pixels deviates from the actual difference. In such a situation, the image processing device 210 having the configuration described above creates the first fitting function and the second fitting function by excluding the degree of difference of a comparison area CR having a movement amount to the position where the contour CT exists. Therefore, the image processing device 210 can further reduce sub-pixel errors since the first fitting function and the second fitting function reflect visual differences.

In addition, when a contour CT exists near a boundary of the search area SR on one side along the baseline length direction in a state where one out of the standard image SI and the reference image has been displaced by 0.5 pixels in the baseline length direction, the image processing device 210 of the Third Embodiment creates the second fitting function based on the degree of difference between the search area SR of the standard image SI and the comparison area CR displaced in units of pixels along the baseline length direction within the reference image in a state where one out of the standard image SI and the reference image has been displaced in the opposite direction from the one side. This configuration enables the image processing device 210 to reduce the degrees of difference to be excluded for creating the second fitting function, since the displacement direction is towards the opposite side from the side where the contour CT is located along the baseline length direction. Therefore, the image processing device 210 can use many degrees of difference when creating the second fitting function and therefore the accuracy with which the second fitting function is created can be improved. As a result, the image processing device 210 can further improve sub-pixel errors for disparity.

Figure 30:
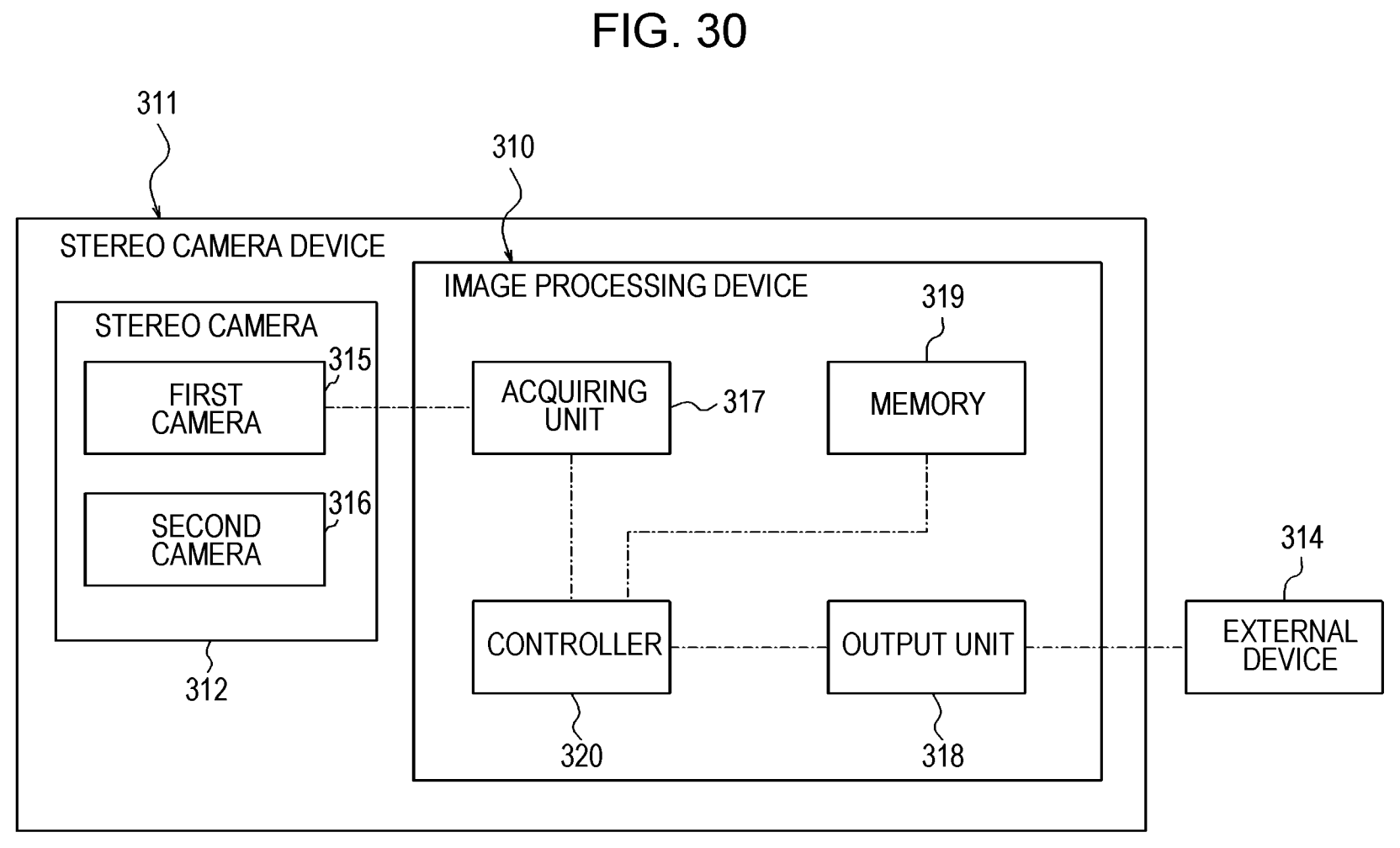
Figure 31:
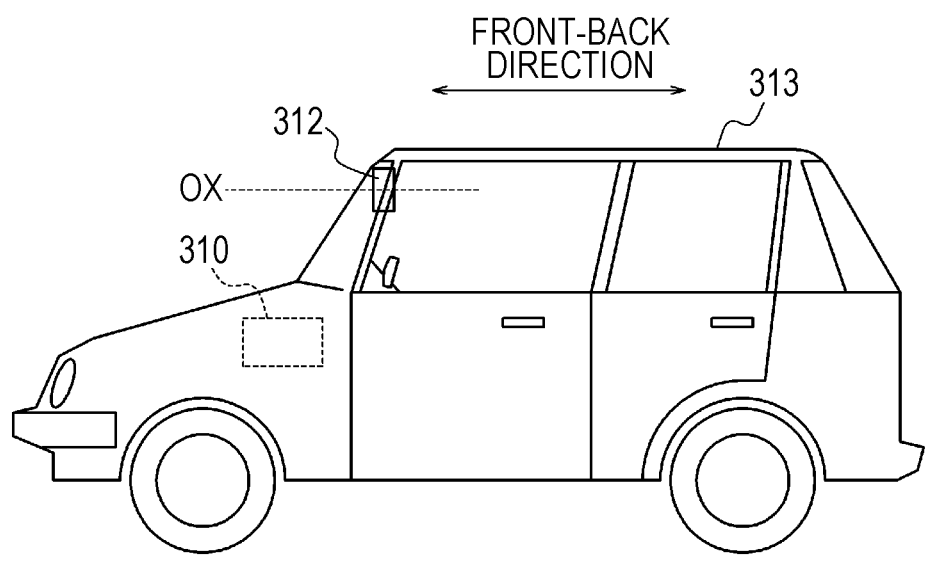
FIG. 31 is a side view conceptually illustrating the position of the stereo camera in FIG. 30 in a mobile object.

As illustrated in FIG. 30, a stereo camera device 311 including an image processing device 310 of a Fourth Embodiment includes a stereo camera 312 and the image processing device 310. As illustrated in FIG. 31, the stereo camera device 311 calculates the position, in a world coordinate system with respect to a mobile object 313, of a subject corresponding to a subject image in stereo images based on captured stereo images. As illustrated in FIG. 30, the stereo camera device 311 notifies an external device 314 of the position of the subject in the world coordinate system. Examples of the external device 314 includes driving assistance devices such as auto cruise control, driving assistance devices such as automatic braking devices, reporting devices that report the distance to a subject, and warning devices that issue alerts.

Examples of the mobile object 313 may include a vehicle, a ship, and an aircraft. Vehicles may include, for example, automobiles, industrial vehicles, rail vehicles, motorhomes, and fixed-wing aircraft that taxi along runways. Automobiles may include, for example, passenger cars, trucks, buses, motorcycles, and trolleybuses. Industrial vehicles may include, for example, industrial vehicles used in agriculture and construction. Industrial vehicles may include, for example, forklift trucks and golf carts. Industrial vehicles used in agriculture may include, for example, tractors, cultivators, transplanters, binders, combine harvesters, and lawn mowers. Industrial vehicles used in construction may include, for example, bulldozers, scrapers, excavators, cranes, dump trucks, and road rollers. Vehicles may include vehicles that are human powered. The categories of vehicles are not limited to the above examples. For example, automobiles may include industrial vehicles that can travel along roads. The same vehicles may be included in multiple categories. Ships may include, for example, jet skis, boats, and tankers. Examples of aircraft may include fixed-wing aircraft and rotary-wing aircraft.

The stereo camera 312 and the image processing device 310 can communicate with each other via wired or wireless communication. The stereo camera 312 and the image processing device 310 may communicate with each other via a network. Examples of the network may include a wired or wireless local area network (LAN) and a controller area network (CAN). The stereo camera 312 and the image processing device 310 may be integrated with each other and housed in the same housing. The stereo camera 312 and the image processing device 310 may be located inside the mobile object 313 and configured so as to be able to communicate with an electronic control unit (ECU) inside the mobile object 313.

As illustrated in FIG. 31, the stereo camera device 311 is installed in the mobile object 313, for example. The stereo camera 312 is, for example, installed so as to capture images of the region in front of the mobile object 313. The stereo camera 312 is disposed so that, for example, an optical axis OX of at least one of the multiple cameras included in the stereo camera 312 is substantially parallel to the front-back direction of the mobile object 313, as described below.

The stereo camera 312 can be mounted in a variety of places in or on the mobile object 313. The stereo camera 312, for example, is mounted inside the mobile object 313 and captures images of the region outside the mobile object 313 through the windshield. The stereo camera 312 is disposed in front of the rearview mirror or on the dashboard. The stereo camera 312 may be fixed to any out of a front bumper, a fender grille, a side fender, a light module, and a hood of the mobile object 313.

The stereo camera 312 includes multiple cameras that have disparity with respect to each other. As illustrated in FIG. 30, the stereo camera 312 includes, for example, a first camera 315 and a second camera 316. The stereo camera 312 is capable of capturing images of an object from multiple directions by making multiple cameras work together. The stereo camera 312 may include multiple cameras in a single housing. The stereo camera 312 may include two or more cameras that are independent of each other and positioned so as to be separated from each other. The stereo camera 312 does not have to consist of multiple cameras that are independent of each other. For example, in the present disclosure, a camera including an optical mechanism that directs light incident at two separate locations to a single light-receiving element can be employed as the stereo camera 312.

In the stereo camera 312, the first camera 315 and the second camera 316 are positioned so that their respective optical axes OX are oriented in directions that allow the cameras to capture images of the same subject as each other. The optical axes OX and positions of the first camera 315 and the second camera 316 are decided upon so that the captured images each at least contain the same subject image. The optical axes OX of the first camera 315 and the second camera 316 are parallel to each other, for example. The optical axes OX do not have to be perfectly parallel with each other, and misalignments occurring during assembly, misalignments occurring during installation, and misalignments of the optical axes OX occurring over time may be permitted. The optical axes OX of the first camera 315 and the second camera 316 do not have to be parallel with each other and may be oriented in different directions from each other.

Figure 32:
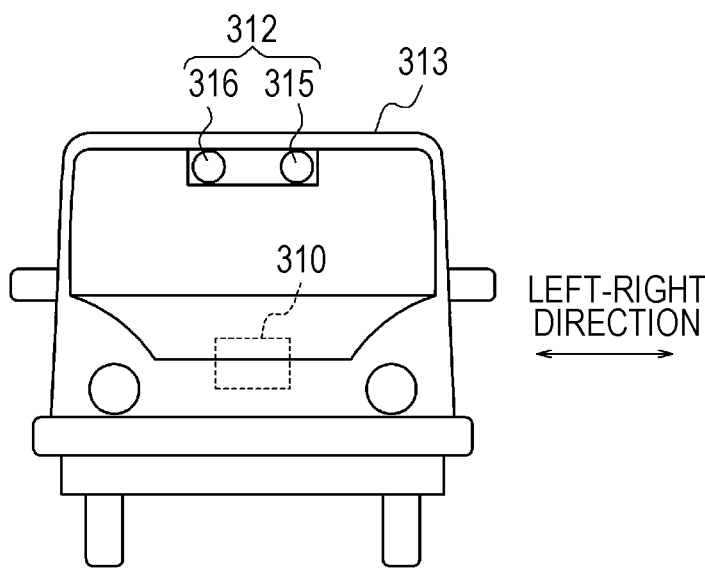
FIG. 32 is a front view conceptually illustrating the position of the stereo camera in FIG. 30 in the mobile object.

The first camera 315 and the second camera 316 are positioned so as to be spaced apart from each other in a direction intersecting the optical axes OX. As illustrated in FIG. 32, the first camera 315 and the second camera 316 are positioned along the left-right direction in a state determined prior to their attachment to the mobile object 313. Due to the different positions of the first camera 315 and the second camera 316, the corresponding positions of a subject in the two images captured by the cameras are different from each other. A standard image generated by the first camera 315 and a reference image generated by the second camera 316 are stereo images captured from different viewpoints. The first camera 315 and the second camera 316 capture the subject at a prescribed frame rate (for example, 30 fps).

The first camera 315 and the second camera 316 each include an optical system that defines the optical axis OX and an imaging element. The first camera 315 and the second camera 316 have different optical axes OX from each other. The optical systems each includes lenses or mirrors to form the subject image on the light-receiving surface of the imaging element. Examples of imaging elements include charge-coupled device (CCD) image sensors and complementary MOS (CMOS) image sensors. The respective imaging elements of the first camera 315 and the second camera 316 may lie on the same plane perpendicular to the optical axes OX of the cameras. The imaging elements of first camera 315 and the second camera 316 each include a plurality of pixels disposed in a matrix pattern. In the imaging elements of the first camera 315 and the second camera 316, a row direction of the pixels may be parallel to the baseline length direction of the stereo camera 312. The baseline length direction is the direction of a straight line passing through the intersection of the optical axis OX with the light-receiving surface of the imaging element of the first camera 315 and the intersection of the optical axis OX with the light-receiving surface of the imaging element of the second camera 316. The first camera 315 and second camera 316 generate images captured by their respective imaging elements as signals. The first camera 315 and the second camera 316 may perform any suitable image processing on the captured images, such as distortion correction, brightness adjustment, contrast adjustment, gamma correction, and so on.

As illustrated in FIG. 30, the image processing device 310 includes an acquiring unit 317, an output unit 318, a memory 319, and a controller 320. The image processing device 310 can be disposed at any suitable position inside the mobile object 313. For example, the image processing device 310 is disposed inside the dashboard of the mobile object 313.

The acquiring unit 317 is an input interface of the image processing device 310 that acquires information from the stereo camera 312 and external devices. A physical connector or a wireless communication device may be used as the acquiring unit 317. Examples of physical connectors include electrical connectors for transmission of electrical signals, optical connectors for transmission of optical signals, and electromagnetic connectors for transmission of electromagnetic waves. Examples of electrical connectors include connectors conforming to IEC60603, connectors conforming to the USB standards, connectors compatible with RCA terminals, connectors compatible with S terminals as specified in EIAJCP_₁211A, connectors compatible with D terminals as specified in EIAJRC-5237, connectors conforming to HDMI (registered trademark) standards, and connectors compatible with coaxial cables including BNC. Examples of optical connectors include a variety of connectors conforming to IEC61754. Examples of wireless communication devices include wireless communication devices conforming to various standards including Bluetooth (registered trademark) and IEEE802.11. The wireless communication device includes at least one antenna.

The acquiring unit 317 acquires a standard image and a reference image generated through image capturing performed by the stereo camera 312 as signals. The acquiring unit 317 passes the acquired standard image and reference image to the controller 320. The acquiring unit 317 may support the transmission method of the image signals of stereo camera 312. The acquiring unit 317 may be connected to an output interface of the stereo camera 312 via a network.

The output unit 318 is an output interface of the image processing device 310 that can output the position, in the world coordinate system, of the subject calculated by the image processing device 310 to another device inside the mobile object 313 or to the external device 314 outside the mobile object 313 such as another mobile object or a roadside machine. Similarly to the acquiring unit 317, examples of the output unit 318 include various interfaces for wired and wireless communication. The output unit 318, for example, includes a CAN interface and communicates with other devices inside the mobile object 313.

The memory 319 includes any suitable storage device such as a random access memory (RAM) and a read only memory (ROM). The memory 319 stores various programs that allow the controller 320 to function and various kinds of information used by the controller 320.

The controller 320 includes one or more processors and memories. Such processors may include general-purpose processors into which specific programs are loaded to perform specific functions, and dedicated processors dedicated to specific processing. Dedicated processors may include an application specific integrated circuit (ASIC). Processors may include programmable logic devices (PLDs). PLDs may include field-programmable gate arrays (FPGAs). The controller 320 may be either a system-on-a-chip (SoC) or a system in a package (SiP), in which one or more processors work together.

The controller 320 creates at least the first fitting function, as described below. The controller 320 specifies any area within the standard image as a search area. For example, the controller 320 specifies any one pixel as a pixel of interest and specifies a region of a prescribed size that includes the pixel of interest as the search area. The search area may be, for example, an area the size of m rows and n columns (m and n are natural numbers) centered on the pixel of interest.

The controller 320 specifies an area within the reference image that is displaced in units of pixels along the baseline length direction from the position of the search area as a comparison area. The controller 320 specifies multiple comparison areas by displacing an area one pixel at a time in both directions along the baseline length direction.

The controller 320 calculates the degree of difference between partial images included in the search area and comparison areas. The degree of difference is an index that varies in accordance with the difference between pixel values of the pixels of the partial images such as the sum of absolute difference (SAD), sum of squared difference (SSD), and so on. The controller 320 calculates the multiple degrees of difference for each displaced position. In this embodiment, the degree of difference increases as the visual difference between the search area and the comparison area increases, as in SAD and SSD.

In general, comparison areas where the degrees of difference have extreme values are the most similar to the search area among the comparison areas for which degrees of difference have been calculated. In this embodiment, an extreme value of a degree of difference is the minimum value in methods in which the degree of difference increases as the visual difference between the search area and the comparison area increases such as SAD and SSD.

The controller 320 creates the first fitting function based on the degrees of difference calculated for the multiple comparison areas. The first fitting function is a function representing the relationship between the degree of difference and the movement amount of the comparison area relative to the search area in the baseline length direction.

The controller 320 may create at least one out of a first coarse function and a first fine function as the first fitting function. The first coarse function may be a function in which two degrees of difference of adjacent movement amounts are connected to each other by a line segment. The first fine function is created by performing isometric linear fitting, parabolic fitting, or the like through the degrees of difference corresponding to the aforementioned movement amounts.

The controller 320 may further create a second fitting function, as described below. The controller 320 displaces one out of the standard image SI and the reference image by 0.5 pixels in the baseline length direction. "Displaces by 0.5 pixels" means, for example, performing pixel interpolation on pixels making up the image by averaging values of pixels adjacent to each other along the displacement direction, and calculating the pixel value at a position having a displacement of 0.5 pixels. The displacement of one out of the standard image and the reference images may be in regions around the search area and comparison area, where the disparity is calculated, rather than the entire image. The direction of displacement may be in the negative direction by −0.5 pixels.

In a state where one out of the standard image and the reference image is displaced by 0.5 pixels in the baseline length direction, the controller 320 specifies an area having the same position and the same size in the whole image at the time of creating the first fitting function as a search area. The size of the search area is the same as that of the search area when creating the first fitting function.

In a state where one out of the standard image SI and the reference image is displaced by 0.5 pixels in the baseline length direction, the controller 320 specifies the comparison area as an area in the reference image that has been displaced in units of pixels along the baseline length direction from the position of the search area. The controller 320 calculates the degree of difference between partial images included in the search area and the comparison area in a state where one out of the standard image and the reference image has been displaced by 0.5 pixels along the baseline length direction.

The controller 320 creates a second fitting function based on the degree of differences calculated for multiple comparison areas described above in a state where one out of the standard image and the reference image has been displaced by 0.5 pixels in the baseline length direction. The second fitting function is a function representing the relationship between the degrees of difference and the movement amounts of the comparison areas relative to the search area in the baseline length direction.

The controller 320 may create at least one out of a second coarse function and a second fine function as the second fitting function. The second coarse function may be a function in which two degrees of difference of adjacent movement amounts are connected to each other by a line segment. The second fine function is created by performing isometric linear fitting, parabolic fitting, or the like through the degrees of difference corresponding to the aforementioned movement amounts.

The controller 320 calculates the disparity based on the created first fitting function. More specifically, the controller 320 may calculate the movement amount that minimizes the degree of difference in the first fitting function as the disparity. The first fitting function for calculating disparity may be either the first coarse function or the first fine function. In this embodiment, the first fitting function for calculating disparity is the first fine function.

In a configuration where the controller 320 further creates a second fitting function, the controller 320 may calculate the disparity based on the created first fitting function and second fitting function. More specifically, the controller 320 may calculate the disparity as the movement amount for which the degree of difference is the smallest in a fitting function obtained by summing or averaging degrees of difference having the same movement amounts in the first fitting function and the second fitting function.

The controller 320 also calculates disparity using dynamic programming, or in other words, a semi-global matching (SGM) method. The SGM method is briefly described below. In the SGM method, the disparity is calculated as the deviation amount of a pixel with respect to a minimum composite cost S (p, d), which is determined by Equation (13).

[Math. 1]

$$S(p, d) = \sum_{r} L_r(p, d) \qquad (13)$$

In Equation (13), p is a pixel of interest, d is a shift amount, and Lr(p, d) is a path cost value in a direction r for the shift amount d of the pixel of interest p, as determined by Equation (14).

[Math. 2]

$$L_r(p, d) = C(p, d) + \min\Big\{ L_r(p - \hat{r}, d),$$
$$L_r(p - \hat{r}, d - 1) + P_1, L_r(p - \hat{r}, d + 1) + P_1, \min_i L_r(p - \hat{r}, i) + P_2 \Big\} \qquad (14)$$

In Equation (14), C (p, d) is the cost at the time of the shift amount d, r hat is the pixel one pixel before the pixel of interest p in the direction r, Lr(p−r, d) is a path cost value in the direction r for the shift amount d of the pixel one pixel before the pixel of interest p on a path in the direction r, i is a variable, and $P_1$ and $P_2$ are penalty values where $P_2 > P_1$ holds true.

Based on at least one out of an extreme value of the first fitting function and the slope near the extreme value, the controller 320 selects either a disparity calculated based on the first fitting function or a disparity calculated using dynamic programming as the disparity of the subject image in the search area. The controller 320 may further select either of two disparities based on at least one out of an extreme value of the second fitting function and the slope near the extreme value.

First, selection of a disparity based on at least one out of an extreme value of the first fitting function and the slope near the extreme value (hereinafter also referred to as "selection of disparity based on first fitting function") will be described.

In this embodiment, the controller 320 may select a disparity calculated based on the first fitting function when the minimum value of the first fitting function is greater than or equal to a first minimum threshold and the slope near that minimum value is greater than or equal to a first slope threshold. The slope near the minimum value is, for example, the maximum value out of the absolute value of the slope between the movement amount that is the minimum value and the integer movement amount adjacent to that movement amount in the positive direction and the absolute value of the slope between the movement amount that is the minimum value and the integer movement amount adjacent to that movement amount in the negative direction. When the minimum value of the first fitting function is less than of the first minimum threshold and the slope near the minimum value is less than or the first slope threshold, the controller 320 selects a disparity calculated using dynamic programming.

The first fitting function for selecting the disparity may be either the first coarse function or the first fine function. In this embodiment, the first fitting function for selecting the disparity is the first coarse function.

In this embodiment, the controller 320 may select the disparity calculated based on the first fitting function when either the minimum value of the first fitting function is greater than or equal to the first minimum threshold or the slope near the minimum value is greater than or equal to the first slope threshold. In other words, the controller 320 may select the disparity calculated based on the first fitting function unless the minimum value of the first fitting function is less than the first minimum threshold and the slope near that minimum value is less than the first slope threshold.

In this embodiment, the controller 320 may also select the disparity calculated using dynamic programming when either the minimum value of the first fitting function is less than or equal to a second minimum threshold or the slope near the minimum value is less than or equal to a second slope threshold. The second minimum threshold is less than the first minimum threshold. The second slope threshold is less than the first slope threshold.

Next, selection of disparity based on at least one out of an extreme value of the first fitting function and the slope near the extreme value, and at least one out of an extreme value of the second fitting function and the slope near the extreme value (hereinafter also referred to as "selection of disparity based on first fitting function and second fitting function") will be described.

In this embodiment, the controller 320 may perform disparity selection by using the largest value out of the minimum value of the first fitting function and the minimum value of the second fitting function (hereinafter also referred to as the "largest minimum value") instead of the minimum value of the first fitting function in the selection of disparity based on the first fitting function. The controller 320 may perform disparity selection by using the maximum value out of the slope of the first fitting function and the slope of the second fitting function (also referred to as the "maximum slope") instead of the slope near the minimum value of the first fitting function in disparity selection based on the first fitting function.

More specifically, when the largest minimum value is greater than or equal to the first minimum threshold and the maximum slope is greater than or equal to the first slope threshold, the controller 320 selects the disparity calculated based on the first fitting function and the second fitting function as the disparity of the subject image in the search area. When the largest minimum value is less than the first minimum threshold and the maximum slope is less than the first slope threshold, the controller 320 selects the disparity calculated using dynamic programming.

Furthermore, the controller 320 may select the disparity calculated based on the first fitting function and the second fitting function when either the largest minimum value is greater than or equal to the first minimum threshold or the maximum slope is greater than or equal to the first slope threshold. Alternatively, the controller 320 may select the disparity calculated using dynamic programming when either the largest minimum value is less than or equal to the second minimum threshold or the maximum slope is less than or equal to the second slope threshold.

The controller 320 may calculate the position, in the world coordinate system, of a subject corresponding to the subject image within the search area based on the selected disparity and external and internal orienting elements. The controller 320 may control the output unit 318 to output the calculated world coordinate system position of the subject to the external device 314. The controller 320 may specify a portion of the standard image or the entirety of the standard image as a comparison area in a sequential manner and calculate the position of the subject pixel by pixel.

Figure 33:
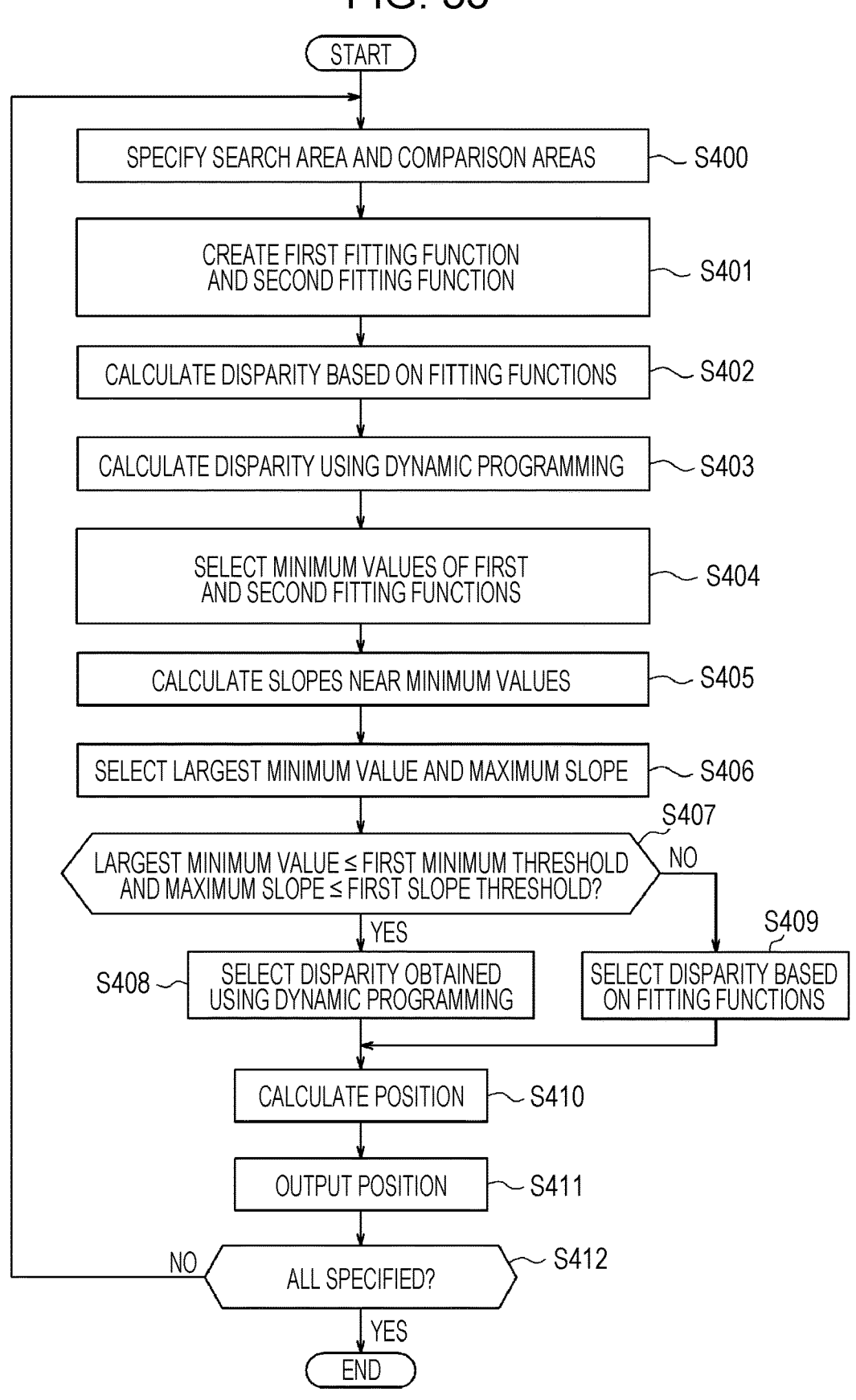
FIG. 33 is a flowchart for describing position calculation processing executed by a controller in FIG. 30.

Next, position calculation processing executed by the controller 320 in this embodiment will be described using the flowchart in FIG. 33. The position calculation processing begins each time a single frame of the standard image and reference image is acquired from the stereo camera 312.

In Step S400, the controller 320 specifies the search area from among the areas that are to be specified for the standard image but have not yet been specified. The controller 320 specifies multiple comparison areas for the reference image. After the specifying, the process proceeds to Step S401.

In Step S401, the controller 320 creates the first fitting function and second fitting function based on the degrees of difference between the search area specified in Step S400 and the multiple comparison areas. After the creation, the process proceeds to Step S402.

In Step S402, the controller 320 calculates disparity based on the first fitting function and second fitting function. After the calculation, the process proceeds to Step S403.

In Step S403, the controller 320 calculates disparity using dynamic programming.

After the calculation, the process proceeds to Step S404.

In Step S404, the controller 320 selects the minimum values of the first fitting function and second fitting function. After the selection, the process proceeds to Step S405.

In Step S405, the controller 320 calculates the slopes near the minimum values of the first fitting function and second fitting function selected in Step S404. After the calculation, the process proceeds to Step S406.

In Step S406, the controller 320 selects the largest minimum value out of the minimum values of the first fitting function and second fitting function selected in Step S404. The controller 320 selects the maximum slope among the slopes near the minimum values of the first fitting function and second fitting function calculated in Step S405. After the selection, the process proceeds to Step S407.

In Step S407, the controller 320 determines whether the largest minimum value selected in Step S406 is less than the first minimum threshold and the maximum slope selected in Step S406 is less than the first slope threshold. When the largest minimum value is less than the first minimum threshold and the maximum slope is less than the first slope threshold, the process proceeds to Step S408. Unless the largest minimum value is less than the first minimum threshold and the maximum slope is less than the first slope threshold, the process proceeds to Step S409.

In Step S408, the controller 320 selects the disparity calculated in Step S403 using dynamic programming as the disparity of the subject image in the search area specified in Step S400. After the selection, the process proceeds to Step S410.

In Step S409, the controller 320 selects the disparity calculated in Step S402 based on the first fitting function and second fitting function as the disparity of the subject image in the search area specified in Step S400. After the selection, the process proceeds to Step S410.

In Step S410, the controller 320 calculates the position of the subject corresponding to the subject image included in the search area specified in Step S400 based on the disparity selected in Step S408 or Step S409 and external and internal orienting elements. After the calculation, the process proceeds to Step S411.

In Step S411, the controller 320 controls the output unit 318 to output the position calculated in Step S410 to the external device 314. After the outputting, the process proceeds to Step S412.

In Step S412, the controller 320 determines whether all areas to be specified in the standard image have been specified as the search area. When some have not been specified, the process returns to Step S400. When all areas to be specified have been specified, the position calculation processing ends.

The thus-configured image processing device 310 of the Fourth Embodiment creates, based on multiple degrees of difference between a search area within a standard image and a comparison area in a reference image that is displaced in units of pixels along the baseline length direction of the stereo camera 312, the first fitting function representing the relationship between degrees of difference between the search area and the comparison area, and a movement amount by which the comparison area is displaced along the baseline length direction, and selects either a disparity calculated based on the first fitting function or a disparity calculated using dynamic programming as the disparity of a subject image in the search area based on at least one out of an extreme value of the first fitting function and the slope near the extreme value. In general, if the search area and areas near the search area are similar, such as within a textureless area, the degree of difference between multiple comparison areas in the vicinity of an extreme value is small. A small difference between degrees of difference indicates that visual differences between the multiple comparison areas are very small. Therefore, in such cases, the accuracy of the disparity calculated by performing block matching using a fitting function is reduced. On the other hand, even when the search area and areas near the search area are similar, the accuracy of disparity calculated using dynamic programming is higher than the accuracy of disparity calculated using block matching. Therefore, the image processing device 310 having the above-described configuration can select a more accurate disparity based on at least one out of the extreme value of the first fitting function and the slope near the extreme value, which can change in accordance with visual differences between the search area and areas near the search area. Thus, the accuracy of the disparity used to calculate the position of the subject is improved in the image processing device 310.

In the image processing device 310 of the Fourth Embodiment, the degree of difference increases as the visual difference between the search area and the comparison area increases. The controller 320 selects a disparity calculated based on the first fitting function when the minimum value of the first fitting function is greater than or equal to the first minimum threshold and the slope near the minimum value is greater than or equal to the first slope threshold. The controller 320 selects a disparity calculated using dynamic programming when the minimum value of the first fitting function is less than the first minimum threshold and the slope is less than the first slope threshold. In general, when there are not many features in the search area, the degree of difference between the search area and the comparison area is relatively small. In general, when there are not many features in the search area, the change in the degree of difference with respect to the movement amount, or in other words, the slope, is relatively small. Therefore, the thus-configured image processing device 310 can select a disparity calculated by block matching for search areas that are likely to have many features, and can select a disparity calculated using dynamic programming for search areas that are likely to not have many features.

The image processing device 310 of the Fourth Embodiment selects a disparity calculated based on the first fitting function when either the minimum value is greater than or equal to the first minimum threshold or the slope is greater than or equal to the first slope threshold. With this configuration, the image processing device 310 can select a disparity calculated using block matching when the minimum value is not less than the first minimum threshold and the slope is not less than the first slope threshold. Therefore, the image processing device 310 can select a disparity calculated using block matching except when it is likely that the accuracy of a disparity calculated using block matching would be decreased. As a result, the image processing device 310 can select disparities calculated using dynamic programming only for search areas where the accuracy of disparities calculated using dynamic programming is likely to be higher than disparities calculated using block matching. Thus, the accuracy of disparities used to calculate the position of the subject is improved in the image processing device 310.

Figure 34:
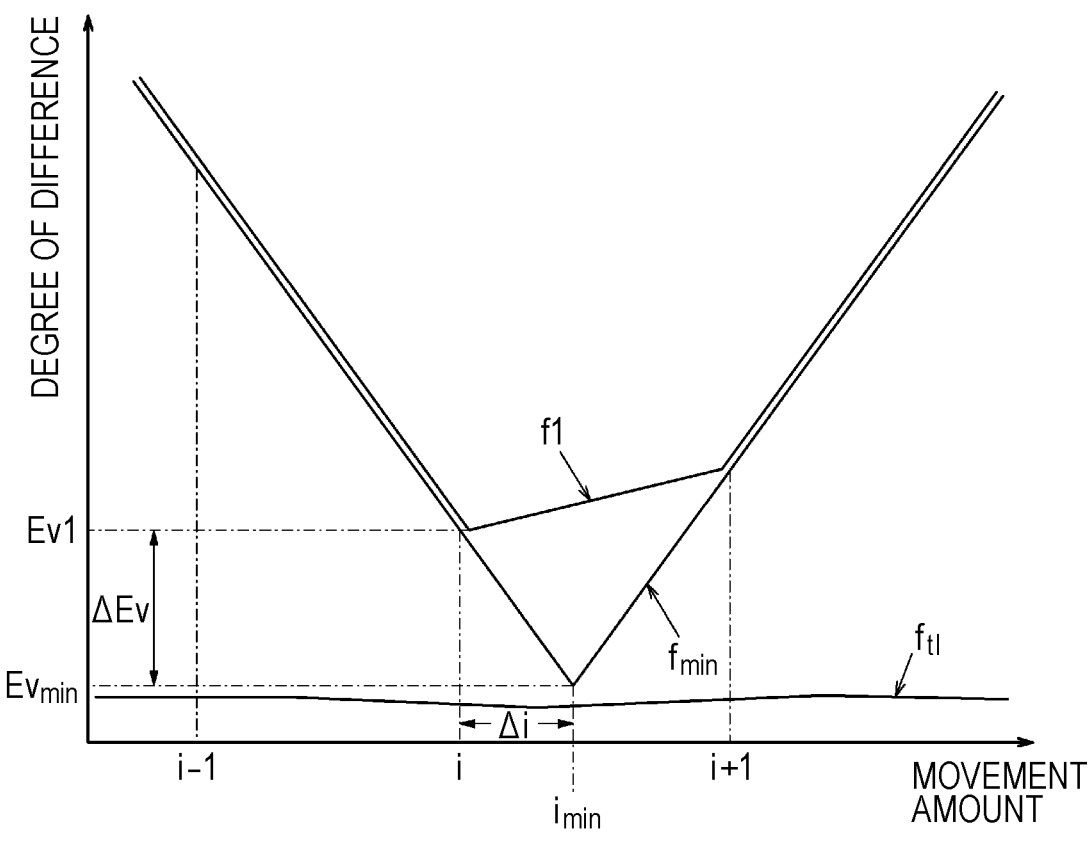
FIG. 34 is a graph illustrating a case where there is a relatively large deviation between the movement amount of an extreme value of a first fitting function and a movement amount of an extreme value of a fitting function in which the movement amount is infinitely small.
Figure 35:
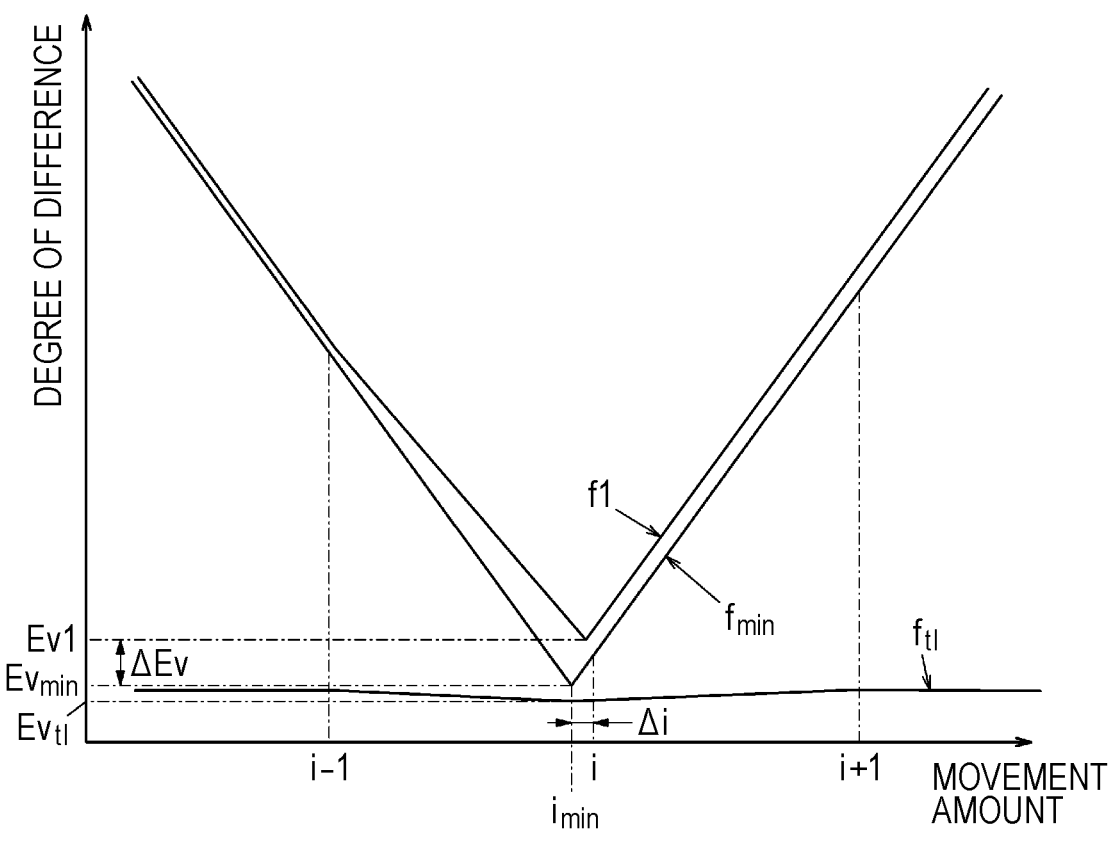
FIG. 35 is a graph illustrating a case where there is a relatively small deviation between the movement amount of an extreme value of a first fitting function and a movement amount of an extreme value of the fitting function when the movement amount is infinitely small.
Figure 36:
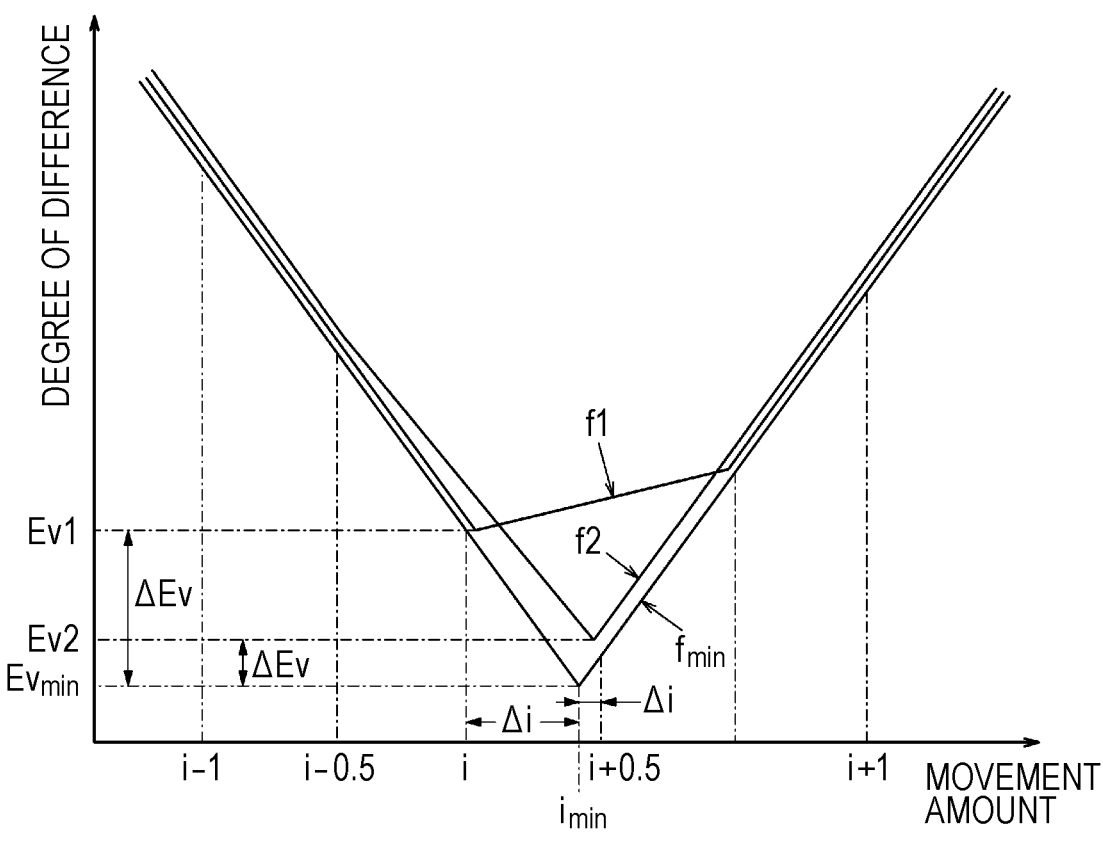
FIG. 36 is a graph illustrating the relationship between movement amount deviation of each of a first fitting function and a second fitting function and their respective extreme values.

The image processing device 310 of the Fourth Embodiment creates, based on multiple degrees of difference between a search area of a standard image and a comparison area of a reference image displaced along the baseline length direction in units of pixels in a state where one out of the standard image and the reference image is displaced by 0.5 pixels in the baseline length direction, the second fitting function representing the relationship between the degree of difference between the search area and the comparison area, and movement amounts of the comparison area displaced along the baseline length direction, and selects the disparity of the subject image in the search area based on at least one out of an extreme value of the second fitting function and the slope near the extreme value. The first fitting function is created based on degrees of difference with respect to movement amounts in units of pixels. Therefore, as illustrated in FIG. 34, a deviation amount $\Delta i$ (hereinafter may be referred to as "movement amount deviation") may occur between a movement amount imin corresponding to an extreme value $Ev_{min}$ of a fitting function $f_{min}$ in which the unit movement amount is infinitely small and a movement amount i corresponding to an extreme value Ev1 of the first fitting function f1. It is generally the case that the movement amount deviation $\Delta i$ has a certain size and the extreme value Ev1 of the first fitting function f1 can indicate that there is a small visual difference between the comparison area and the search area at the movement amount i corresponding to the extreme value Ev1. However, as illustrated in FIG. 35, when the movement amount deviation $\Delta i$ is small, the extreme value Ev1 of the first fitting function f1 may be as large as an extreme value Evti of a fitting function fti when the search area and an area near the search area are similar to each other, and the visual difference between the comparison area at the movement amount i corresponding to the extreme value Ev1 and the search area may be very small. Therefore, when the movement amount deviation $\Delta i$ is small, the accuracy of disparity selection is improved when the selection is made using an extreme value of another fitting function having a larger movement amount deviation compared to an extreme value of the first fitting function f1. In general, as illustrated in FIG. 36, out of movement amount deviations Ai for a movement amount i corresponding to the extreme value Ev1 of the first fitting function f1 and a movement amount i+0.5 or i−0.5 corresponding to an extreme value Ev2 of the second fitting function f2, one may be larger than the other. Therefore, based on the respective extreme values Ev1 and Ev2 of the first fitting function f1 and the second fitting function f2, the thus-configured image processing device 310 can select either the disparity calculated based on the first fitting function or the disparity calculated using dynamic programming. Therefore, the accuracy of the disparity can be further improved. As illustrated in FIGS. 34 and 35, when the movement amount deviation $\Delta i$ becomes large, the deviation amount $\Delta Ev$ between the extreme value $Ev_{min}$ of the fitting function $f_{min}$ in which the unit movement amount is infinitely small and the extreme value Ev1 of the first fitting function f1 (hereinafter sometimes referred to as "extreme value deviation") may become large. Therefore, as illustrated in FIG. 34, as the extreme value deviation $\Delta Ev$ increases, the slope near the extreme value Ev1 can approach the slope near the extreme value of the fitting function $f_{ti}$ when the search area and the area near the search area are similar. Hence, when the movement amount deviation $\Delta i$ is large, the accuracy of disparity selection is improved by making the selection using the slope of another fitting function having a smaller extreme value deviation $\Delta Ev$ compared with the slope near the extreme value Ev1 of the first fitting function f1. In general, as illustrated in FIG. 36, either the extreme value Ev1 of the first fitting function f1 or the extreme value Ev2 of the second fitting function f2 may have a large extreme value deviation $\Delta Ev$. Therefore, based on the slopes near the respective extreme values Ev1 and Ev2 of the first fitting function f1 and the second fitting function f2, the thus-configured image processing device 310 can select at least either the disparity calculated based on the first fitting function or the disparity calculated using dynamic programming. Therefore, the accuracy of the disparity can be further improved.

The image processing device 310 of the Fourth Embodiment also calculates the disparity as the movement amount for which the degree of difference is the smallest in a fitting function obtained by summing or averaging degrees of difference having the same movement amounts in the first fitting function f1 and the second fitting function f2. This configuration, in other words, the EEC method, enables the image processing device 310 to reduce systematic errors in subpixel estimation.

Embodiments of the present disclosure have been described based on the drawings and examples, but it should be noted that a variety of variations and amendments may be easily made by one skilled in the art based on the present disclosure. Therefore, it should be noted that such variations and amendments are included within the scope of the present disclosure. For example, the functions and so forth included in each component or step can be rearranged in a logically consistent manner, and a plurality of components or steps can be combined into a single component or step or a single component or step can be divided into a plurality of components or steps. Although embodiments of the present disclosure have been described while focusing on devices, the embodiments of the present disclosure can also be realized as a method including steps executed by individual component of the device. The embodiments of the present disclosure can also be realized as a method executed by a processor included in a device, a program, or a storage medium recording the program. It is to be understood that the scope of the present disclosure also includes these forms.

For example, in the Fourth Embodiment, the degree of difference increases as the visual difference between the search area and the comparison area increases, but the degree of difference may instead decrease. In this configuration, the extreme value of degree of difference is the maximum value. In this configuration, the maximum value of the first fitting function is used to select a disparity based on the first fitting function, and the comparison between the maximum value and the threshold is the opposite. In this configuration, the maximum values of the first fitting function and the second fitting function are used to select a disparity based on the first fitting function and second fitting function, and the comparison between the maximum value and the threshold is the opposite.

REFERENCE SIGNS

1, 101 stereo camera system
10, 110, 212, 312 stereo camera
11, 111, 215, 315 first camera
12, 112, 216, 316 second camera
20, 120, 210, 310 image processing device
21, 121 communication unit (acquiring unit)
22, 122, 220, 320 controller (processor)
23, 123, 219, 319 memory
24 search range setting unit
25 pixel interpolator
26 difference calculator
27 difference aggregator
28, 126 disparity estimator
30, 130 in-vehicle network
40, 140 ECU
50, 150, 213, 313 mobile object
124 difference calculator
125 self-difference calculator
211, 311 stereo camera device
214, 314 external device
217, 317 acquiring unit
218, 318 output unit
CR comparison area
CT contour
$DIM_1$ to $DIM_4$ difference image
P pixel
SR search area
SI standard image

52

The invention claimed is:

1. An image processing device comprising:
an acquiring unit configured to acquire a standard image and a reference image captured by a stereo camera; and
a processor configured to calculate disparity based on the standard image and the reference image,
wherein the processor
calculates, for each pixel position, a first cost value representing a degree of difference for each pixel position between the standard image and each of multiple images obtained by displacing the reference image by multiple different reference deviation amounts, in units of pixels, in a first direction corresponding to a baseline length direction of the stereo camera,
calculates, for each pixel position, a second cost value representing a degree of difference for each pixel position between the standard image and each of multiple images obtained by displacing the standard image by multiple different standard deviation amounts in the first direction, and
uses the second cost values to calculate a disparity for each pixel position by estimating a correction deviation amount that adjusts a reference deviation amount among the reference deviation amounts to a deviation amount which minimizes a cost value representing a degree of difference for each pixel position between the standard image and an image obtained by displacing the reference image in a first direction down to units of less than one pixel.

2. The image processing device according to claim 1, wherein the processor selects, from among the first cost values, a smallest first cost value calculated in accordance with the multiple different reference deviation amounts and one or more first cost values calculated in accordance with the reference deviation amounts including a first deviation amount that gives the smallest first cost value out of the multiple different reference deviation amounts and the reference deviation amounts near the first deviation amount, and uses the selected first cost values to estimate the correction deviation amount down to units of less than one pixel.

3. The image processing device according to claim 2, wherein the processor calculates the second cost values representing degrees of difference between the standard image and multiple images obtained by displacing the standard image by integer numbers of pixels at and near zero towards positive and negative sides along the first direction, and uses the calculated second cost values to estimate the correction deviation amount down to units of less than one pixel.

4. The image processing device according to claim 3, wherein the processor estimates the correction deviation amount down to units of less than one pixel by interpolating the second cost values for the standard deviation amounts, respectively, using a prescribed function and displacing the prescribed function in units of less than one pixel.

5. The image processing device according to claim 4, wherein the prescribed function is a linear function or a parabolic function.

6. The image processing device according to claim 2, wherein the processor estimates the correction deviation amount down to units of less than one pixel using only the first cost value corresponding to the first deviation amount as the first cost value.

7. The image processing device according to claim 2, wherein the processor estimates the correction deviation amount by using multiple cost values corresponding to multiple reference deviation amounts as the first cost values and solving simultaneous equations consisting of multiple equations in which each of the multiple cost values is represented by an equation including a corresponding the correction deviation amount.

8. The image processing device according to claim 7, wherein the multiple equations include a uniform correction term and the multiple reference deviation amounts consist of two deviation amounts.

9. The image processing device according to claim 8, wherein the processor determines that estimation of the correction deviation amount has failed when an absolute value of the correction term is greater than or equal to a first threshold.

10. The image processing device according to claim 7, wherein the multiple equations include different correction terms, the number of correction terms is greater than or equal to the number of the multiple reference deviation amounts, and the processor estimates the correction deviation amount so that a sum of squares of the correction terms is minimized.

11. The image processing device according to claim 10, wherein the processor determines that estimation of the correction deviation amount has failed when the sum of squares of the correction terms is greater than or equal to a second threshold.

12. The image processing device according to claim 1, wherein the processor determines that estimation of the correction deviation amount has failed when the estimated deviation amount is larger than a size of one pixel.

* * * * *